US012746897B2

(12) United States Patent
Shigematsu et al.

(10) Patent No.: US 12,746,897 B2
(45) Date of Patent: Sep. 29, 2026

(54) PEDAL DEVICE

(71) Applicant: DENSO CORPORATION, Kariya-city (JP)

(72) Inventors: Makoto Shigematsu, Kariya-city (JP); Daisuke Hokuto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/909,781

(22) Filed: Oct. 8, 2024

(65) Prior Publication Data

US 2025/0026322 A1 Jan. 23, 2025

Related U.S. Application Data

(63) Continuation of application No. PCT/JP2023/016166, filed on Apr. 24, 2023.

(30) Foreign Application Priority Data

Apr. 29, 2022 (JP) ................................ 2022-075566
Aug. 11, 2022 (JP) ................................ 2022-128555

(51) Int. Cl.
*B60T 7/06* (2006.01)
*B60T 7/04* (2006.01)

(52) U.S. Cl.
CPC ................ *B60T 7/06* (2013.01); *B60T 7/042* (2013.01)

(58) Field of Classification Search
CPC .............................. B60K 26/021; F16F 1/046
See application file for complete search history.

(56) References Cited

U.S. PATENT DOCUMENTS 5,954,407 A 9/1999 Schramm et al.
7,750,258 B2 * 7/2010 Lee ..................... B60K 26/021 200/86.5
2002/0056337 A1 * 5/2002 Sundaresan .............. G05G 1/30 74/513

(Continued)

FOREIGN PATENT DOCUMENTS

DE 102013106655 A1 1/2015
DE 102020205375 A1 10/2021

(Continued)

OTHER PUBLICATIONS

U.S. Appl. No. 18/911,761 to Daisuke Hokuto, filed Oct. 10, 2024 (134 pages).

(Continued)

*Primary Examiner* — Daniel D Yabut
(74) *Attorney, Agent, or Firm* — Nixon & Vanderhye P.C.

(57) ABSTRACT

In a pedal device, a first elastic member is deformed in accordance with a sliding operation of a first guide of a first holder in a vehicle longitudinal direction with a second guide of a second holder by a force from a pedal when the pedal rotates. Further, due to the force from the pedal when the pedal rotates, a second elastic member is deformed in accordance with a sliding operation of the second guide in the vehicle longitudinal direction with a third guide of a guide member. Further, the first guide and the second guide are made to restrict movement in a vehicle vertical direction. In addition, the second holder and the third guide are made to mutually restrict movement in the vehicle vertical direction.

6 Claims, 44 Drawing Sheets

(56) References Cited

U.S. PATENT DOCUMENTS

| | | | | |
|---|---|---|---|---|
| 2002/0100341 | A1* | 8/2002 | Kumamoto .............. | G05G 1/30<br>74/512 |
| 2014/0117602 | A1 | 5/2014 | Jeon | |
| 2014/0130633 | A1 | 5/2014 | Kumamoto et al. | |
| 2017/0021725 | A1 | 1/2017 | Heipel et al. | |
| 2018/0274998 | A1 | 9/2018 | Sumi et al. | |
| 2020/0001711 | A1* | 1/2020 | Burke ...................... | G05G 5/05 |
| 2022/0297645 | A1 | 9/2022 | Yanagida et al. | |
| 2023/0018082 | A1 | 1/2023 | Huge et al. | |
| 2023/0393607 | A1 | 12/2023 | Yamamoto et al. | |

FOREIGN PATENT DOCUMENTS

| | | | | |
|---|---|---|---|---|
| JP | 2007102393 A | | 4/2007 | |
| JP | 2010-925 | | 1/2010 | |
| JP | 2014021791 A | | 2/2014 | |
| JP | 6148642 B2 | | 5/2017 | |
| JP | 06747282 B2 | | 8/2020 | |
| JP | 2021029092 A | | 2/2021 | |
| WO | WO-2018158703 A1 | * | 9/2018 | ............. B60K 23/02 |

OTHER PUBLICATIONS

U.S. Appl. No. 18/909,341 to Daisuke Hokuto, filed Oct. 8, 2024 (89 pages).

* cited by examiner

PEDAL DEVICE

CROSS REFERENCE TO RELATED APPLICATION

The present application is a continuation application of International Patent Application No. PCT/JP2023/016166 filed on Apr. 24, 2023, which designated the U.S. and claims the benefit of priority from Japanese Patent Application No. 2022-075566 filed on Apr. 29, 2022 and Japanese Patent Application No. 2022-128555 filed on Aug. 11, 2022. The entire disclosures of all of the above applications are incorporated herein by reference.

TECHNICAL FIELD

The present disclosure relates to a pedal device.

BACKGROUND

Conventionally, a pedal simulator is known, which includes a brake pedal, an actuation rod, a cylinder, a piston, a plurality of springs, and a plurality of spring seats. The actuation rod is connected to the brake pedal. The actuation rod is inserted into the cylinder. The piston is provided within the cylinder to receive the force of the actuation rod. The plurality of springs are connected and arranged in series in multiple stages within the cylinder to support the piston. The plurality of spring seats are arranged to respectively support the plurality of springs within the cylinder.

SUMMARY

According to one aspect of the present disclosure, a pedal device includes: a pedal configured to rotate about a rotation axis in accordance with a pedaling operation of an operator; a first elastic member configured to be deformed by a pedaling force from the pedal as the pedal rotates, and to generate a reaction force against the pedaling force of the operator; a second elastic member configured to be deformed by a pedaling force from the pedal as the pedal rotates, and to generate a reaction force against the pedaling force of the operator; a first holder including a first support that is arranged adjacent to the pedal and supports one end of the first elastic member, and a first guide that extends from the first support in a deformation direction of the first elastic member; a second holder including a second support that supports an another end of the first elastic member, a second guide that extends in the deformation direction of the first elastic member, and a third support that supports one end of the second elastic member; a fourth support supporting an another end of the second elastic member; and a third guide extending from the fourth support in a deformation direction of the second elastic member. The first guide moves in the deformation direction of the first elastic member relative to the second guide and slides with the second guide in the deformation direction of the first elastic member, to deform the first elastic member, in accordance with the pedaling force from the pedal as the pedal rotates. The second holder moves in the deformation direction of the second elastic member relative to the third guide, and slides with the third guide in the deformation direction of the second elastic member, to deform the second elastic member, in accordance with the pedaling force from the pedal as the pedal rotates. In addition, the first guide and the second guide are disposed to be restricted with each other in a movement on a direction perpendicular to the deformation direction of the first elastic member, and the second holder and the third guide are disposed to be restricted with each other in a movement on a direction perpendicular to the deformation direction of the second elastic member.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
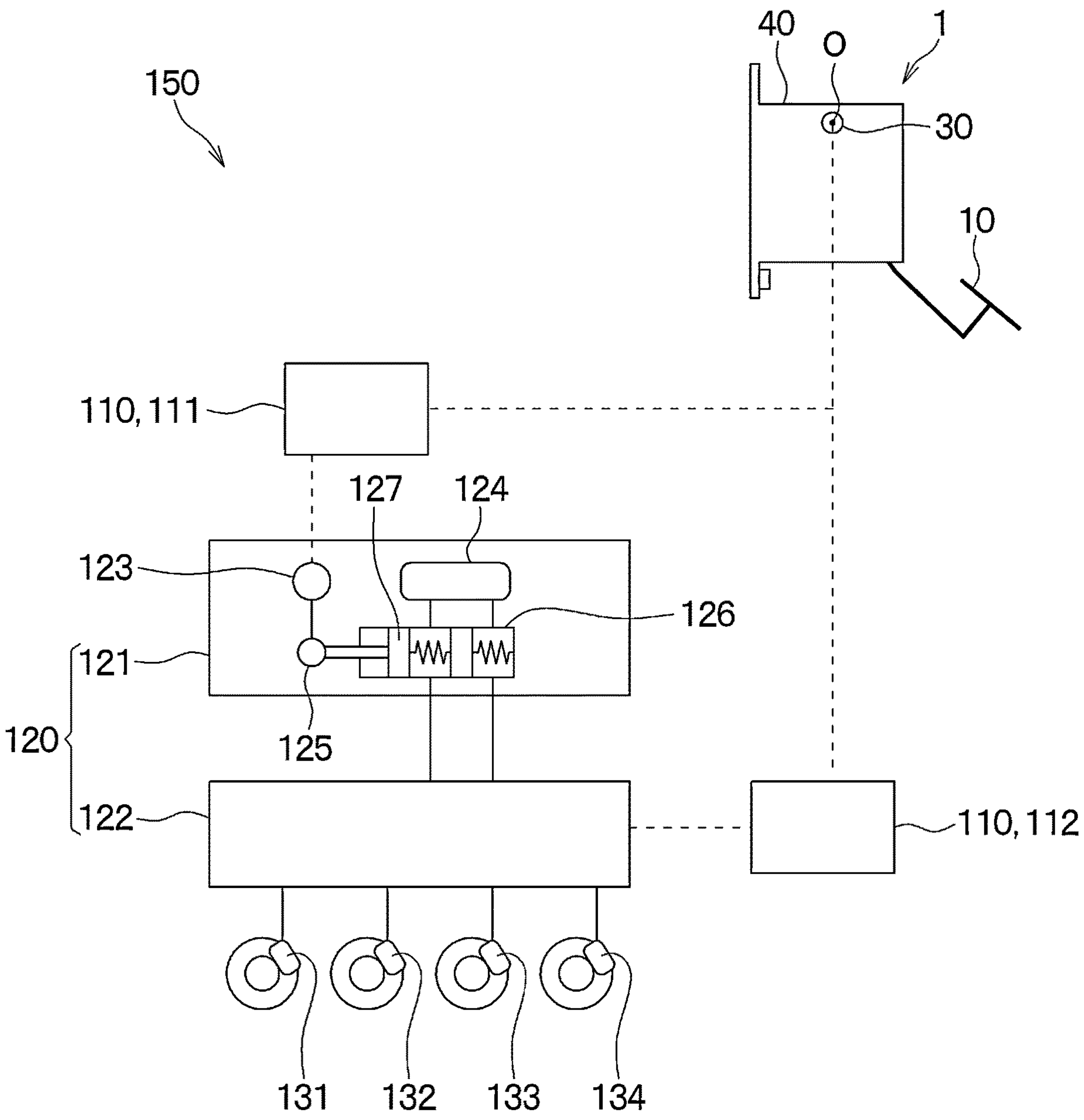
FIG. 1 is a configuration diagram of a brake-by-wire system in which a pedal device according to a first embodiment is used.

According to studies by the inventors of the present application, in a pedal simulator, if movement of a spring seat in a direction perpendicular to a direction of deformation of a spring is not restricted, the spring seat may have a freely movement, such as tilting with respect to a movement direction of a piston or shifting in a direction perpendicular to the movement direction of the piston. Thus, the spring seat may enter inside of the spring that serves as an elastic member, thereby inhibiting a deformation of the spring.

It is an object of the present disclosure to provide a pedal device that suppresses inhibition of deformation of an elastic member.

According to one aspect of the present disclosure, a pedal device includes: a pedal configured to rotate about a rotation axis in accordance with a pedaling operation of an operator; a first elastic member configured to be deformed by a pedaling force from the pedal as the pedal rotates, and to generate a reaction force against the pedaling force of the operator; a second elastic member configured to be deformed by a pedaling force from the pedal as the pedal rotates, and to generate a reaction force against the pedaling force of the operator; a first holder including a first support that is arranged adjacent to the pedal and supports one end of the first elastic member, and a first guide that extends from the first support in a deformation direction of the first elastic member; a second holder including a second support that supports an another end of the first elastic member, a second guide that extends in the deformation direction of the first elastic member, and a third support that supports one end of the second elastic member; a fourth support supporting an another end of the second elastic member; and a third guide extending from the fourth support in a deformation direction of the second elastic member. The first guide moves in the deformation direction of the first elastic member relative to the second guide and slides with the second guide in the deformation direction of the first elastic member, to deform the first elastic member, in accordance with the pedaling force from the pedal as the pedal rotates. The second holder moves in the deformation direction of the second elastic member relative to the third guide, and slides with the third guide in the deformation direction of the second elastic member, to deform the second elastic member, in accordance with the pedaling force from the pedal as the pedal rotates. In addition, the first guide and the second guide are disposed to be restricted with each other in a movement on a direction perpendicular to the deformation direction of the first elastic member, and the second holder and the third guide are disposed to be restricted with each other in a movement on a direction perpendicular to the deformation direction of the second elastic member.

According to the above, the first guide and the second guide are prevented from entering inside of the first elastic member, thereby suppressing inhibition of deformation of the first elastic member. Further, the second holder and the third guide are prevented from entering inside of the second elastic member, thereby suppressing inhibition of deformation of the second elastic member.

Hereinafter, embodiments will be described with reference to the drawings. In the following embodiments, the same or equivalent portions are denoted by the same reference numerals, and the description thereof will be omitted.

First Embodiment

A pedal device 1 of the present embodiment is used, for example, as a brake pedal in a brake-by-wire system 150 that controls the brakes of a vehicle. First, the brake-by-wire system 150 will be explained.

The brake-by-wire system 150 includes wheel cylinders 131 to 134, an ECU 110, a brake circuit 120, and the pedal device 1, as shown in FIG. 1.

The wheel cylinders 131 to 134 are respectively arranged at a wheel of the vehicle. Further, brake pads (not shown) are attached to each of the wheel cylinders 131 to 134.

The ECU 110 includes a first ECU 111 and a second ECU 112. The first ECU 111 includes a microcomputer, a drive circuit, and the like (not shown). Further, the first ECU 111 controls a first brake circuit 121 of the brake circuit 120, which will be described later, based on a signal from the pedal device 1, which will be described later. The second ECU 112 includes a microcomputer, a drive circuit, and the like (not shown). Further, the second ECU 112 controls a second brake circuit 122 of the brake circuit 120, which will be described later, based on a signal from the pedal device 1, which will be described later.

The brake circuit 120 has the first brake circuit 121 and the second brake circuit 122. The first brake circuit 121 includes a reservoir 124, a motor 123, a gear mechanism 125, and a master cylinder 126. The reservoir 124 stores brake fluid. The motor 123 drives the gear mechanism 125. The gear mechanism 125 reciprocates a master piston 127 included in the master cylinder 126 in an axial direction of the master cylinder 126. The second brake circuit 122 includes a solenoid valve (not shown) and the like. Further, the second brake circuit 122 controls the hydraulic pressure of each of the wheel cylinders 131 to 134 by opening and closing the solenoid valve in response to a control signal from the second ECU 112.

Here, in order to explain the pedal device 1 in the following, a front-rear direction of the vehicle is defined as a vehicle longitudinal direction Da. An up-down direction of the vehicle is defined as a vehicle vertical direction Db. A left-right direction of the vehicle is defined as a vehicle lateral direction Dc. The front in the vehicle longitudinal direction Da is described as a vehicle front. The rear in the vehicle longitudinal direction Da is referred to as a vehicle rear. The upper part in the vehicle vertical direction Db is referred to as a vehicle upward. The lower part in the vehicle vertical direction Db is referred to as a vehicle downward. The left side in the vehicle lateral direction Dc is referred to as a vehicle left side. The right side in the vehicle lateral direction Dc is referred to as a vehicle right side.

The pedal device 1 includes a pedal 10, a stroke sensor 30, a housing 40, and a reaction force generation mechanism 60, as shown in FIGS. 2 to 5.

Figure 2:
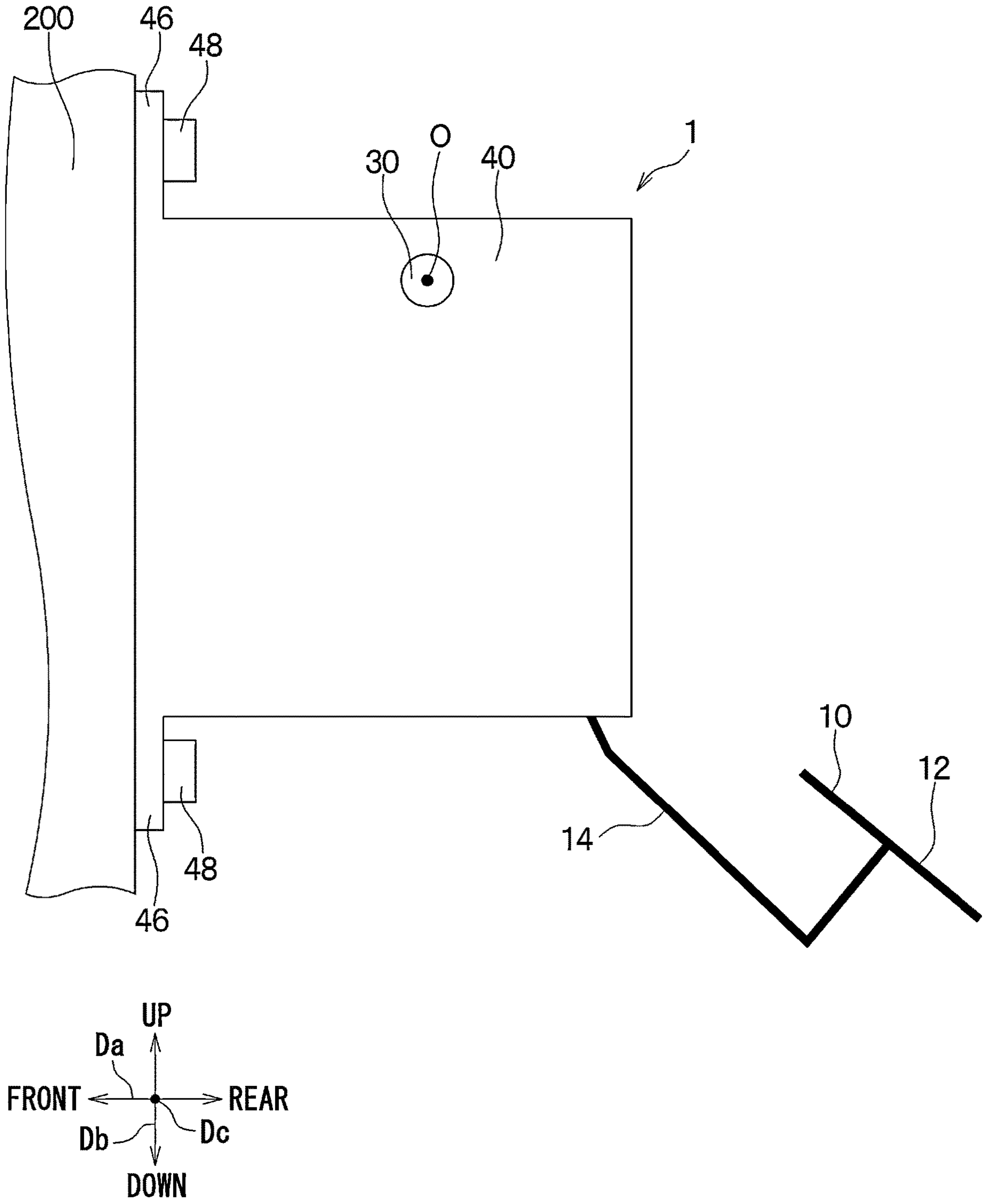
FIG. 2 is a side view of the pedal device.
Figure 3:
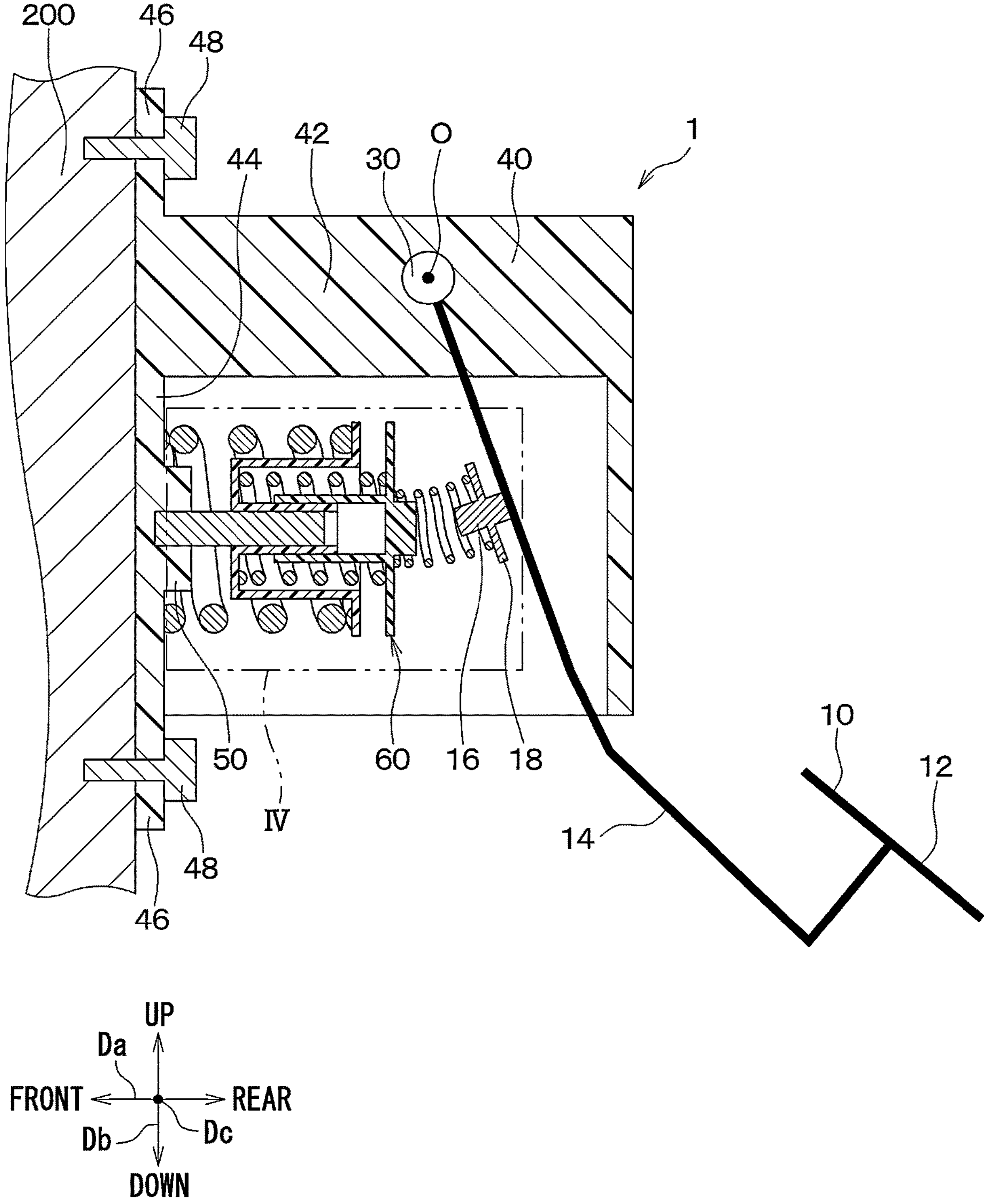
FIG. 3 is a sectional view of the pedal device.

The pedal 10 is operated by being stepped on by the driver of the vehicle, as shown in FIGS. 2 and 3. The driver of the vehicle corresponds to an operator.

Specifically, the pedal 10 includes a pedal part 12, a lever part 14, a lever protrusion 16, and a lever flange 18. The pedal part 12 is stepped on by the driver. The lever part 14 is connected to the pedal part 12. Further, the lever part 14 rotates about a rotation axis O when the pedal part 12 is stepped on by the driver. The lever protrusion 16 is connected to a vehicle front side of the lever part 14, and protrudes from a boundary with the lever part 14 in a vehicle front direction. The lever flange 18 is connected to the lever protrusion 16, and protrudes from a boundary with the lever protrusion 16 in a direction perpendicular to the direction in which the lever protrusion 16 protrudes.

The stroke sensor 30 is arranged, for example, on the rotation axis O of the lever part 14. Further, the stroke sensor 30 includes a magnet, a yoke, a Hall element, and the like. Thereby, the stroke sensor 30 detects a rotation angle and a stroke amount of the pedal 10 by detecting the rotation angle of the lever part 14. Further, the stroke sensor 30 outputs signals corresponding to the detected rotation angle and the stroke amount of the pedal 10 to the first ECU 111 and the second ECU 112. The stroke sensor 30 has a Hall element to detect the rotation angle and the stroke amount of the pedal 10, but is not limited to such configuration, and may have an MR element or the like to detect the rotation angle and the stroke amount of the pedal 10. MR is an abbreviation for Magneto Resistive. Further, the stroke amount is, for example, an amount of movement of the pedal part 12 in the vehicle longitudinal direction Da.

The housing 40 is attached to a dash panel 200 of the vehicle, and is formed in a cylindrical shape with a bottom so that it accommodates a portion of the lever part 14, the stroke sensor 30, and the reaction force generation mechanism 60, which will be described later. The dash panel 200 is a partition wall that separates an outside of a vehicle interior, such as an engine room, and the like from the vehicle interior, and is sometimes called a bulkhead. Further, outside the vehicle interior, not only the vehicle engine but also a vehicle battery, an air conditioner, and the like are arranged.

Specifically, the housing 40 includes a housing bottom 42, a housing cylinder 44, a panel attachment part 46, a panel bolt 48, and a housing restrictor 50.

The housing bottom 42 extends in the vehicle longitudinal direction Da. Further, the rotation axis O of the lever part 14 and the stroke sensor 30 are attached to the housing bottom 42. Further, the housing bottom 42 supports a part of the lever part 14 so that the lever part 14 can rotate about the rotation axis O, and also supports the stroke sensor 30.

The housing cylinder 44 corresponds to a fourth support, is connected to an end of the housing bottom 42 in the vehicle longitudinal direction Da, and extends in a vehicle downward direction from a boundary with the housing bottom 42. Further, the housing cylinder 44 accommodates a part of the lever part 14, the stroke sensor 30, and the reaction force generation mechanism 60, which will be described later.

The panel attachment part 46 is connected to an end of the housing bottom 42 on a vehicle front side and on a vehicle upper side, and extends from a boundary with the housing bottom 42 in a vehicle upward direction. Further, the panel attachment part 46 is connected to an end of the housing cylinder 44 on a vehicle front side and on a vehicle lower side, and extends in the vehicle downward direction from a boundary with the housing cylinder 44. A hole is formed in the panel attachment part 46, and the panel bolt 48 is inserted into the hole of the panel attachment part 46 and a hole of the dash panel 200, so that the housing 40 is attached to the dash panel 200.

The housing restrictor 50 is connected to an inner surface of the housing cylinder 44 located on the vehicle front side, and protrudes from the inner surface in the vehicle rear direction. Further, the housing restrictor 50 is formed with a hole into which a guide member 63, which will be described later, is inserted.

Figure 4:
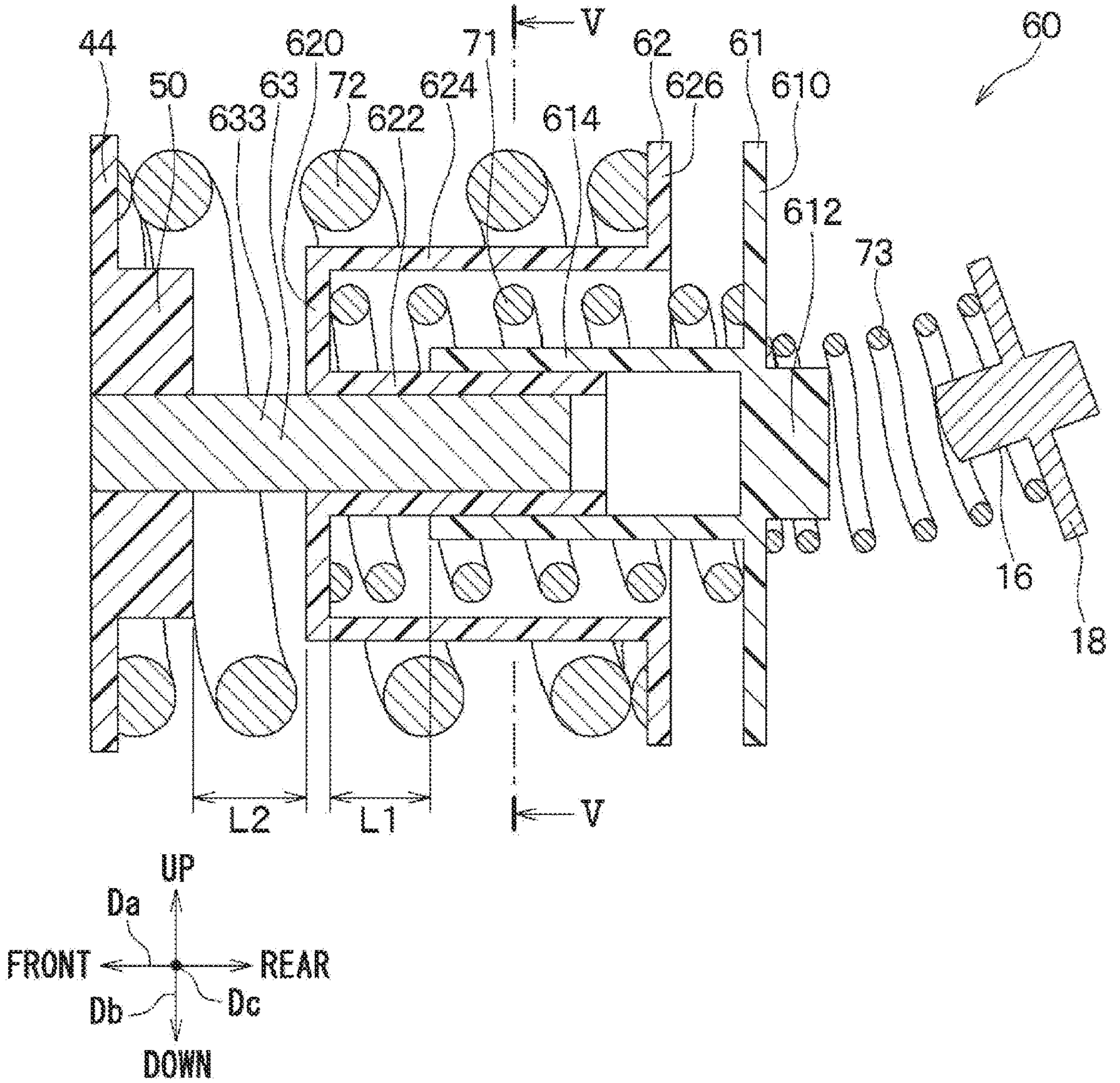
FIG. 4 is an enlarged view of IV part in FIG. 3.

The reaction force generation mechanism 60 generates a reaction force against a driver's pedaling force applied to the pedal part 12. Specifically, as shown in FIG. 4, the reaction force generation mechanism 60 includes a first holder 61, a second holder 62, a guide member 63, a first elastic member 71, a second elastic member 72, and a third elastic member 73.

The first holder 61 is made of resin, for example. Further, the first holder 61 includes a first support 610, a holder restrictor 612, and a first guide 614. Although the first holder 61 is made of resin, it is not limited thereto, and the first holder 61 may be made of metal or the like, for example.

Figure 5:
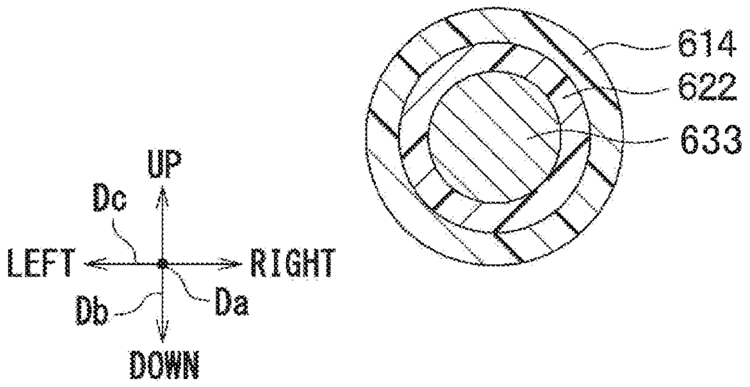
FIG. 5 is a part of a cross-sectional view taken along a line V-V in FIG. 4.

The first support 610 is, for example, formed in a plate shape extending in a direction perpendicular to the vehicle longitudinal direction Da. The holder restrictor 612 is connected to the first support 610, and protrudes from the first support 610 in a vehicle rear direction. For example, as shown in FIGS. 4 and 5, the first guide 614 is formed in a cylindrical shape that extends in the vehicle front direction from one side of the first support 610 opposite to the holder restrictor 612.

The second holder 62 is made of resin, for example. Further, the second holder 62 includes a second support 620, a second guide 622, a holder cylinder 624, and a third support 626. Although the second holder 62 is made of resin, it is not limited thereto, and the second holder 62 may be made of metal or the like, for example.

The second support 620 is formed in a plate shape extending in a direction perpendicular to the vehicle longitudinal direction Da, and is also formed in an annular shape.

The second guide 622 is connected to an inside of the second support 620 in a direction perpendicular to the vehicle longitudinal direction Da, and has a cylindrical shape extending from a boundary with the second support 620 in the vehicle rear direction. Further, a part of the second guide 622 is inserted into a hole of the first guide 614. Thereby, movement of the first guide 614 and the second guide 622 in the vehicle vertical direction Db is mutually restricted with each other. Further, since the first guide 614 and the second guide 622 extend in the vehicle longitudinal direction Da, an inner surface of the first guide 614 and an outer surface of the second guide 622 slide with each other in the vehicle longitudinal direction Da.

The holder cylinder 624 is connected to an outside of the second support 620 in a direction perpendicular to the vehicle longitudinal direction Da, and extends from a boundary with the second support 620 in the vehicle rear direction.

The third support 626 is formed in a plate shape extending in a direction perpendicular to the vehicle longitudinal direction Da, and is also formed in an annular shape. Further, the third support 626 is connected to one side of the holder cylinder 624 opposite to the second support 620, and is therefore disposed on the vehicle rear side relative to the second support 620. Further, a part of the first guide 614 is inserted into a hole of the third support 626.

The guide member 63 includes a third guide 633. The third guide 633 is made of metal, for example. Further, the third guide 633 is formed in a columnar shape extending in the vehicle longitudinal direction Da. Further, a part of the third guide 633 is inserted into a hole of the housing cylinder 44 and the housing restrictor 50. Further, a part of the third guide 633 is inserted into a hole of the second guide 622. Thereby, movement of the second guide 622 and the third guide 633 in the vehicle vertical direction Db is mutually restricted with each other. Further, since the second guide 622 and the third guide 633 extend in the vehicle longitudinal direction Da, an inner surface of the second guide 622 and an outer surface of the third guide 633 slide with each other in the vehicle longitudinal direction Da.

Here, a distance between the first holder 61 and the second holder 62 in the vehicle longitudinal direction Da, i.e., a movement distance of the first holder 61 up to coming into contact with the second holder 62 after the pedal 10 is stepped on by the driver of the vehicle, is defined as a first distance L1. For example, here, the first distance L1 is a distance from the first guide 614 to the second support 620 in the vehicle longitudinal direction Da. Also, a distance between the second holder 62 and an opposing part facing in a movement direction of the second holder 62 in the vehicle longitudinal direction Da, i.e., a movement distance of the second holder 62 up to coming into contact with the opposing part, is defined as a second distance L2. For example, here, the second distance L2 is a distance from the second holder 62 to the housing restrictor 50 in the vehicle longitudinal direction Da.

The first elastic member 71, the second elastic member 72, and the third elastic member 73 are arranged in series in here. Specifically, the first elastic member 71 is, for example, a coil spring, and is elastically deformable in the vehicle longitudinal direction Da. Further, the first guide 614 and the second guide 622 are arranged inside the first elastic member 71. In such manner, the movement of the first elastic member 71 in the vehicle vertical direction Db is restricted. Further, the first elastic member 71 is supported by the first support 610 and the second support 620 by being in contact with the first support 610 and the second support 620. Further, when the pedal part 12 is not stepped on by the driver, the first elastic member 71 is elastically deformed, i.e., is compressed here. Here, when the pedal part 12 is not stepped on by the driver, the first elastic member 71 is elastically deformed, but the present disclosure is not limited thereto, and the first elastic member 71 may be not elastically deformed in a situation described above. In such case, a length of the first elastic member 71 is a free length.

The second elastic member 72 is, for example, a coil spring, and is elastically deformable in the vehicle longitudinal direction Da. Further, the second elastic member 72 is supported by the second support 620 and the housing cylinder 44 by being in contact with the third support 626 and the housing cylinder 44. Further, the housing restrictor 50 and the holder cylinder 624 are arranged inside the second elastic member 72. In such manner, the movement of the second elastic member 72 in the vehicle vertical direction Db is restricted. Further, when the second elastic member 72 is projected toward the first elastic member 71 in the vehicle vertical direction Db, the projected second elastic member 72 and the first elastic member 71 overlap. Further, when the pedal part 12 is not stepped on by the driver, the second elastic member 72 is elastically deformed, i.e., is compressed here. Here, when the pedal part 12 is not stepped on by the driver, the second elastic member 72 is elastically deformed, but the second elastic member 72 is not limited thereto, and may be not elastically deformed in a situation described above. In such case, a length of the second elastic member 72 is a free length.

The third elastic member 73 is, for example, a coil spring, and is elastically deformable in the vehicle longitudinal direction Da. Further, the third elastic member 73 is supported by the first support 610 by being in contact with the first support 610. Further, the holder restrictor 612 is arranged inside the third elastic member 73. In such manner, the movement of the third elastic member 73 in the vehicle vertical direction Db is restricted. Further, when the pedal part 12 is not stepped on by the driver, the third elastic member 73 is in contact with the lever flange 18 by having a part of the lever protrusion 16 inserted inside the third elastic member 73. At such time, the third elastic member 73 is elastically deformed, i.e., is compressed here. Here, when the pedal part 12 is not stepped on by the driver, the third elastic member 73 is elastically deformed, but the present disclosure is not limited thereto, and the third elastic member 73 may be not elastically deformed in a situation described above. In such case, a length of the third elastic member 73 is a free length. Further, the third elastic member 73 and the lever flange 18 are in contact with each other when the pedal part 12 is not stepped on by the driver, but the present disclosure is not limited thereto in a situation described above. When the pedal part 12 is not stepped on by the driver, the third elastic member 73 and the lever flange 18 may be non-contact due to separation between the third elastic member 73 and the lever flange 18 being positioned away from each other.

The brake-by-wire system 150 is configured as described above. Next, the operation of the pedal device 1 will be explained.

When the pedal part 12 is stepped on by the driver of the vehicle, the lever part 14 rotates together with the pedal part 12 about the rotation axis O. In such manner, a force from the pedal part 12 is transmitted to the third elastic member 73 via the lever flange 18, thereby compressing the third elastic member 73. Further, the force from the pedal part 12 is transmitted to the first holder 61. Thus, the first holder 61 moves in the vehicle front direction, during which the inner surface of the first guide 614 slides along the outer surface of the second guide 622 in the vehicle front direction, and the first elastic member 71 is compressed by being pushed by the first support 610. Further, the force from the pedal part 12 is transmitted to the second holder 62. Thereby, the second holder 62 moves in the vehicle front direction, during which the inner surface of the second guide 622 slides along the outer surface of the third guide 633 in the vehicle front direction, and the second elastic member 72 is compressed by being pushed by the third support 626. Therefore, a reaction force is generated as a restoring force that is generated when the first elastic member 71, the second elastic member 72, and the third elastic member 73 are compressed. Due to such reaction force, even when the mechanical connection between the pedal 10 and the master cylinder 126 is abolished, the pedal device 1 generates the same reaction as when the pedal is connected to the master cylinder 126, that is, when the reaction force by hydraulic pressure can be obtained.

At such time, the stroke sensor 30 detects the rotation angle and the stroke amount of the pedal part 12 by detecting the rotation angle of the lever part 14. Further, the stroke sensor 30 outputs the detected rotation angle and stroke amount of the pedal part 12 to the first ECU 111 and the second ECU 112.

At such time, the first ECU 111 rotates the motor 123 by supplying electric power to the motor 123, for example. Thereby, the gear mechanism 125 is driven, and the master piston 127 moves. Therefore, the hydraulic pressure of the brake fluid supplied from the reservoir 124 to the master cylinder 126 increases. The increased hydraulic pressure is supplied to the second brake circuit 122.

Further, the second ECU 112 supplies electric power to a solenoid valve (not shown) of the second brake circuit 122, for example. Thereby the solenoid valve of the second brake circuit 122 opens. Therefore, the brake fluid supplied to the second brake circuit 122 is supplied to each of the wheel cylinders 131 to 134. Therefore, the brake pads attached to the wheel cylinders 131 to 134 rub against their corresponding brake discs. In such manner, each wheel is braked, thereby decelerates the vehicle. At such time, the second ECU 112 may perform ABS control, VSC control, collision avoidance control, regeneration coordination control, and the like based on the signal from the stroke sensor 30 and the signal from other electronic control devices (not shown). Note that, ABS is an abbreviation for Anti-lock Braking System. Further, VSC is an abbreviation for Vehicle Stability Control.

Here, for example, when the second holder 62 and the third guide 633 are fixed, when the first holder 61 moves by the first distance L1, an absolute value of a deceleration amount of the vehicle is equal to or greater than a first threshold value, and the vehicle stops. Further, when the first guide 614 and the second guide 622 are fixed, when the second holder 62 moves by the second distance L2, an absolute value of the deceleration amount of the vehicle is equal to or greater than a second threshold value, and the vehicle stops. The first threshold value and the second threshold value are set through experiments, simulations, and the like so that a sufficient amount of deceleration of the vehicle can be obtained.

Thereafter, when the driver of the vehicle stops stepping on the pedal part 12, the first holder 61 and the second holder 62 are pushed back in the vehicle rear direction by the restoring forces of the first elastic member 71 and the second elastic member 72. Thereby, the inner surface of the first guide 614 slides along the outer surface of the second guide 622 in the vehicle rear direction, and the inner surface of the second guide 622 slides along the outer surface of the third guide 633 in the vehicle rear direction. Further, the lever flange 18 is pushed back by the restoring force of the third elastic member 73. Therefore, the position of the pedal 10 returns to an initial position of when the pedal part 12 is not stepped on by the driver of the vehicle.

The pedal device 1 operates in such manner. In the pedal device 1 described above, stuck of rotation of the pedal 10 at a time when the pedal 10 is stepped on is suppressed, and inhibition of deformation of the first elastic member 71 and the second elastic member 72 is suppressed. Next, a description will be given about how to suppress the pedal 10 from being stuck, i.e., stuck of rotation thereof.

Figure 6:
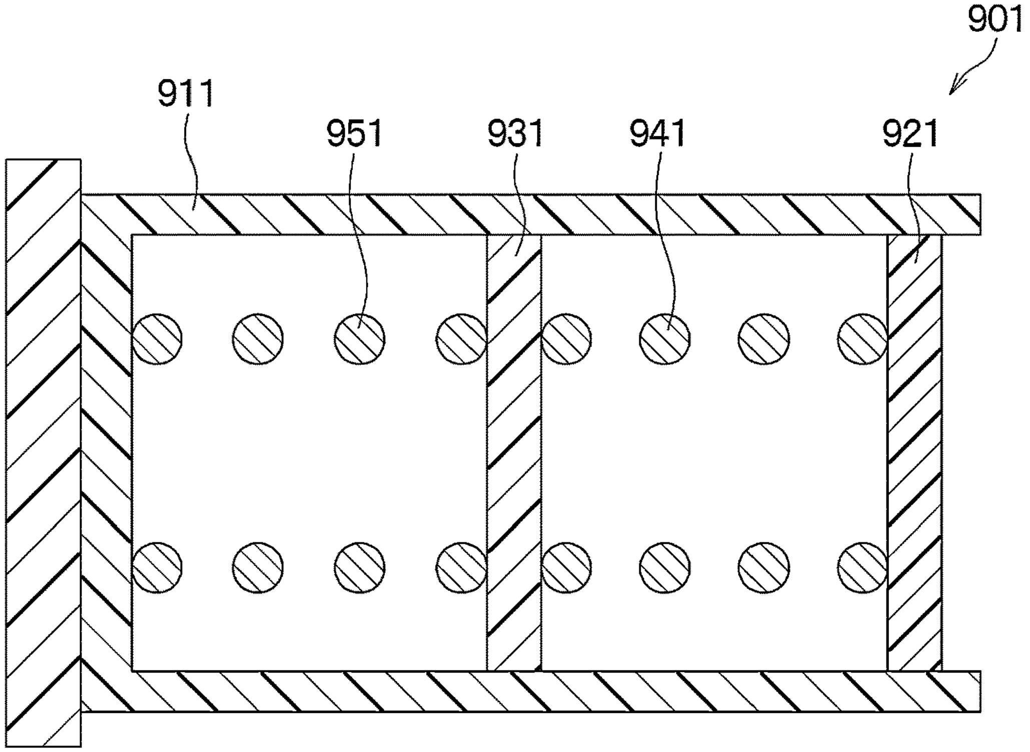
FIG. 6 is a sectional view of a first comparative pedal device.

Here, a case in which the pedal 10 becomes stuck to be non-rotatable will be described using a first comparative pedal device 901 and a second comparative pedal device 902. Now, the first comparative pedal device 901 will be explained first. As shown in FIG. 6, the first comparative pedal device 901 includes a first comparative guide 911, a first comparative support 921, a second comparative support 931, a first comparative elastic member 941, and a second comparative elastic member 951 together with a comparative pedal (not shown).

The first comparative guide 911 is formed in a cylindrical shape with a bottom, thereby accommodating therein the first comparative support 921, the second comparative support 931, the first comparative elastic member 941, and the second elastic members 951 respectively described in detail later. The first comparative support 921 and the second comparative support 931 are formed in a plate shape extending in a direction perpendicular to the left-right direction in the drawing. Further, side surfaces of the first comparative support 921 and the second comparative support 931 extending in the left-right direction in the drawing slide against an inner surface of the first comparative guide 911 in the left-right direction in the drawing. Further, the second comparative support 931 is disposed on the left side of the drawing relative to the first comparative support 921. The first comparative elastic member 941 is disposed at a position between the first comparative support 921 and the second comparative support 931, and is supported by the first comparative support 921 and the second comparative support 931. The second comparative elastic member 951 is disposed at a position between bottoms of the second comparative support 931 and the first comparative guide 911, and is supported by the bottoms of the second comparative support 931 and the first comparative guide 911. Further, the first comparative elastic member 941 and the second comparative elastic member 951 are elastically deformed in the left-right direction in the drawing.

Then, in the first comparative pedal device 901, for example, minute objects or foreign objects entering from outside enter a gap between the first comparative support 921 and the first comparative guide 911 at a sliding portion. At such time, the first comparative support 921 and the first comparative guide 911 are fixed, and the first comparative support 921 becomes unmovable along the first comparative guide 911. Thereby, the first comparative elastic member 941 becomes stiff, i.e., not elastically deformable, thereby the force of the comparative pedal (not shown) is no longer transmittable therefrom to the second comparative support 931. Therefore, the second comparative support 931 also becomes unmovable along the first comparative guide 911. Thereby, the comparative pedal (not shown) becomes non-rotatable. Further, the reaction force by the first comparative elastic member 941 and the second comparative elastic member 951 is no longer transmittable to the comparative pedal (not shown). Here, the minute objects are, for example, abrasion particles generated by sliding between (a) the first comparative support 921 or the second comparative support 931 and (b) the first comparative guide 911 or similar objects.

Figure 7:
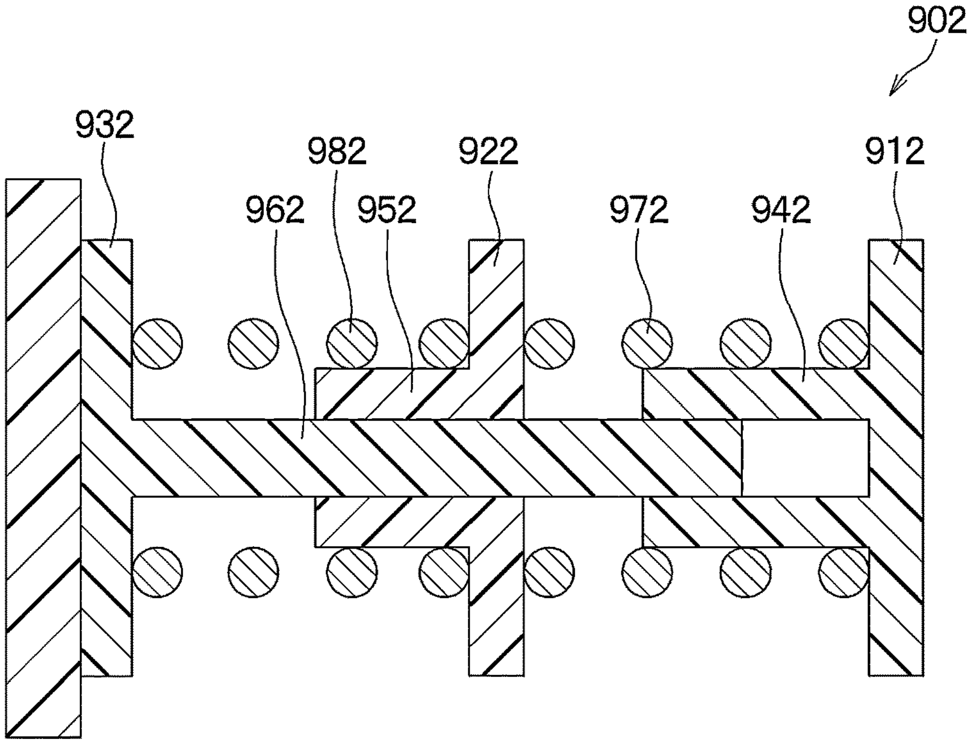
FIG. 7 is a sectional view of a second comparative pedal device.

Next, the second comparative pedal device 902 will be explained. As shown in FIG. 7, the second comparative pedal device 902 includes a third comparative support 912, a fourth comparative support 922, and a fifth comparative support 932. Further, the second comparative pedal device 902 includes a first comparative cylinder 942, a second comparative cylinder 952, a second comparative guide 962, a third comparative elastic member 972, and a fourth comparative elastic member 982 together with a comparative pedal (not shown).

The third comparative support 912, the fourth comparative support 922, or the fifth comparative support 932 is formed in a plate shape extending in a direction perpendicular to the left-right direction in the drawing. The fourth comparative support 922 is arranged on the left side of the drawing relative to the third comparative support 912. The fifth comparative support 932 is arranged on the left side of the drawing relative to the fourth comparative support 922. The first comparative cylinder 942 is connected to the third comparative support 912, and extends from a boundary with the third comparative support 912 to the left in the drawing. The second comparative cylinder 952 is connected to the fourth comparative support 922, and extends from a boundary with the fourth comparative support 922 to the left in the drawing. The second comparative guide 962 is connected to the fifth comparative support 932, and is formed in a columnar shape extending from the fifth comparative support 932 to the right in the drawing. Further, a part of the second comparison guide 962 is inserted into a hole of the first comparison cylinder 942 and a hole of the second comparison cylinder 952. Further, an outer surface of the second comparative guide 962 that extends in the left-right direction in the drawing slides in the left-right direction (i) along an inner surface the first comparison cylinder 942 extending in the left-right direction in the drawing, and (ii) along an inner surface of the second comparison cylinder 952 extending in the left-right direction in the drawing. The third comparative elastic member 972 is disposed at a position between the third comparative support 912 and the fourth comparative support 922, and is supported by the third comparative support 912 and the fourth comparative support 922. The fourth comparative elastic member 982 is disposed at a position between the fourth comparative support 922 and the fifth comparative support 932, and is supported by the fourth comparative support 922 and the fifth comparative support 932. Further, the third comparative elastic member 972 and the fourth comparative elastic member 982 are elastically deformed in the left-right direction in the drawing.

In the second comparative pedal device 902 as well, for example, minute objects or foreign objects from outside enter a gap between the first comparative cylindrical portion 942 and the second comparative guide 962 at the sliding portion. At such time, the first comparative cylinder 942 and the second comparative guide 962 are fixed, and the first comparative cylinder 942 become unmovable along the second comparative guide 962. Accordingly, the third comparative elastic member 972 becomes stiff, i.e., not elastically deformable, thereby the force of the comparative pedal (not shown) is no longer transmittable to the fourth comparative support 922 and the second comparative cylinder 952. Therefore, the second comparative cylinder 952 also becomes unmovable along the second comparative guide 962. Thereby, the comparative pedal (not shown) becomes non-rotatable. Further, the reaction force by the third comparative elastic member 972 and the fourth comparative elastic member 982 is no longer transmittable to the comparative pedal (not shown). Here, the minute objects are, for example, abrasion powder generated by sliding between (a) the first comparative cylinder 942 or the second comparative cylinder 952 and (b) the second comparative guide 962.

In contrast, in the pedal device 1 of the present embodiment, the first guide 614 slides along the second guide 622 in the vehicle longitudinal direction Da due to the force from the pedal 10 when the pedal 10 rotates, thereby deforming the first elastic member 71. Further, due to the force from the pedal 10 when the pedal 10 rotates, the second guide 622 of the second holder 62 slides with the third guide 633 along the vehicle longitudinal direction Da, so that the second elastic member 72 is deformed. The vehicle longitudinal direction Da corresponds to the deformation direction of the first elastic member 71 and the deformation direction of the second elastic member 72.

Thus, when the second holder 62 and the third guide 633 are fixed, the first guide 614 and the second guide 622 slide with each other in the vehicle longitudinal direction Da by the force from the rotation of the pedal 10. Further, when the first guide 614 and the second guide 622 are fixed, the second guide 622 of the second holder 62 and the third guide 633 slide with each other in the vehicle longitudinal direction Da by the force from the rotation of the pedal 10. Therefore, even when one of the two sliding portions is fixed, the other sliding portion is slidable. Thus, when the pedal 10 is stepped on, the stuck of the pedal 10 to become non-rotatable can be suppressed.

Next, a description will be given about how inhibition of deformation of the first elastic member 71 and the second elastic member 72 is suppressed. In the pedal device 1 of the present embodiment, the first guide 614 and the second guide 622 mutually restrict movement with each other in the vehicle vertical direction Db. The vehicle vertical direction Db corresponds to a direction perpendicular to the deformation direction of the first elastic member 71.

Thus, the first guide 614 and the second guide 622 entering the inside of the first elastic member 71 can be suppressed, thereby suppressing inhibition of elastic deformation of the first elastic member 71. Further, since the first elastic member 71 is suppressed from being caught by the first guide 614 and the second guide 622, thereby damage of the first elastic member 71 is also suppressible. Therefore, non-transmission of the restoring force of the first elastic member 71 to the pedal 10 can be suppressed, thereby suppressing stuck of the pedal 10, i.e., no return of the pedal 10 to its original position can be suppressed.

Further, the second holder 62 and the third guide 633 mutually restrict movement of the other in the vehicle vertical direction Db. The vehicle vertical direction Db corresponds to a direction perpendicular to the deformation direction of the second elastic member 72.

Thus, the second holder 62 and the third guide 633 entering the inside of the second elastic member 72 can be suppressed, thereby suppressing inhibition of the elastic deformation of the second elastic member 72. Further, the second elastic member 72 is suppressed from being caught by the second holder 62 and the third guide 633, thereby damage to the second elastic member 72 is also suppressible. Therefore, non-transmission of the restoring force of the second elastic member 72 to the pedal 10 can be suppressed, thereby suppressing the stuck of the pedal 10, i.e., no return of the pedal 10 to its original position can be suppressed.

Further, the first embodiment also achieves the following effects.

[1-1] The first guide 614 is formed in a cylindrical shape. The second guide 622 is formed in a cylindrical shape. Thereby, during an assembly of the first guide 614 and the second guide 622, the shapes of the first guide 614 and the second guide 622 can easily fit to each other even when the first guide 614 and/or the second guide 622 rotate about the axis. Therefore, when assembling the first guide 614 and the second guide 622, it is possible to assemble the first guide 614 and the second guide 622 without considering the rotation direction of the first guide 614 and the second guide 622 about their axes. Thus, assembly of the first guide 614 and the second guide 622 is made easy.

Further, the third guide 633 is formed in a columnar shape. Thereby, during an assembly of the second guide 622 and the third guide 633, their shapes can easily fit to each other even when the second guide 622 and the third guide 633 rotate about the axis. Therefore, when assembling the second guide 622 and the third guide 633, it is possible to assemble the second guide 622 and the third guide 633 without considering the rotation direction of the second guide 622 and the third guide 633 about their axes. Thus, assembly of the second guide 622 and the third guide 633 is made easy.

[1-2] The deformation direction of the first elastic member 71, the deformation direction of the second elastic member 72, and the deformation direction of the third elastic member 73 are in a linear direction perpendicular to the rotation axis O in here, i.e., are aligned in the vehicle longitudinal direction Da. Thereby, the first elastic member 71, the second elastic member 72, and the third elastic member 73 are easily compressible without tilting, thereby generating a stable reaction force.

[1-3] When the second elastic member 72 is projected in the vehicle vertical direction Db, projection of the second elastic member 72 and the first elastic member 71 overlap. The vehicle vertical direction Db corresponds to a direction perpendicular to the deformation direction of the second elastic member 72.

Thereby, a volume of the reaction force generation mechanism 60 in the vehicle longitudinal direction Da becomes smaller compared to a case where the projection of the second elastic member 72 in the vehicle vertical direction Db and the first elastic member 71 do not overlap. Therefore, the increase in the volume of the pedal device 1 can be suppressed.

[1-4] A space is formed inside the first elastic member 71, and the first guide 614 and the second guide 622 are arranged inside the first elastic member 71. Thereby, compared to a case where the first guide 614 and the second guide 622 are arranged outside the first elastic member 71, the volume of the first holder 61 and the second holder 62 in the vehicle vertical direction Db becomes smaller. Therefore, the increase in the volume of the pedal device 1 can be suppressed. Further, since the first guide 614 and the second guide 622 are surrounded by the first elastic member 71, foreign objects from the outside are less likely to enter the sliding portions of the first guide 614 and the second guide 622.

[1-5] A space is formed inside the second elastic member 72, and the second guide 622 and the third guide 633 are arranged inside the second elastic member 72. Therefore, the volume of the second holder 62 in the vehicle vertical direction Db becomes smaller compared to a case where the second guide 622 and the third guide 633 are arranged outside the second elastic member 72. Therefore, the increase in the volume of the pedal device 1 can be suppressed. Further, since the second guide 622 and the third guide 633 are surrounded by the second elastic member 72, foreign objects from the outside are less likely to enter the sliding portions of the second guide 622 and the third guide 633.

[1-6] The first guide 614 and the second guide 622 restrict movement of the first elastic member 71 in the vehicle vertical direction Db. Thereby, the first elastic member 71 becomes difficult to move in the vehicle vertical direction Db, thereby friction with the first support 610 and the second support 620 respectively supporting the first elastic member 71 becomes difficult to occur. Therefore, an amount of wear on the first elastic member 71, the first support 610, and the second support 620 can be reduced. Further, due to difficulty of movement of the first elastic member 71 in the vehicle vertical direction Db, the first elastic member 71 is compressible without tilting, thereby a stable reaction force is generated. The first guide 614 and the second guide 622 may be used as a restrictor.

[1-7] The holder cylinder 624 and the housing restrictor 50 restrict movement of the second elastic member 72 in the vehicle vertical direction Db. Thereby, the second elastic member 72 becomes difficult to move in the vehicle vertical direction Db, thereby friction with the third support 626 supporting the second elastic member 72 and the housing cylinder 44 becomes difficult to occur. Therefore, an amount of wear on the second elastic member 72, the third support 626, and the housing cylinder 44 can be reduced. Further, due to difficulty of movement of the second elastic member 72 in the vehicle vertical direction Db, the second elastic member 72 is compressible without tilting, thereby a stable reaction force is generated. The holder cylinder 624 and the housing restrictor 50 correspond to a restrictor.

[1-8] The third guide 633 includes metal. Thereby, due to characteristics of metal, which is a material relatively hard to deform, it is possible to suppress the third guide 633 from being damaged and from not sliding on the second guide 622. Further, the housing 40 includes resin. Therefore, when forming the housing 40 connected to the third guide 633, it is possible to perform integral molding, for example, by injection molding or the like. Further, the second guide 622 includes resin. Thereby, a coefficient of friction between the second guide 622 and the third guide 633 becomes smaller than when the second guide 622 and the third guide 633 are made of metal. Therefore, the frictional force between the second guide 622 and the third guide 633 can be reduced, thereby suppressing the generation of noise due to the friction between the second guide 622 and the third guide 633. Further, since resin has a relatively low specific gravity, increase of the weight of the second guide 622 can be suppressed, thereby making it possible to make the second guide 622 lightweight. Therefore, increase of the weight of the pedal device 1 can be suppressed, thereby making the pedal device 1 lightweight.

[1-9] The first elastic member 71, the second elastic member 72, and the third elastic member 73 are coil springs. Thereby, the influence of temperature on the elastic coefficients of the first elastic member 71, the second elastic member 72, and the third elastic member 73 is relatively small. Further, the first elastic member 71, the second elastic member 72, and the third elastic member 73 have relatively high oil resistance, solvent resistance, and chemical resistance. Therefore, the first elastic member 71, the second elastic member 72, and the third elastic member 73 are relatively unlikely to deteriorate, thereby generating a stable reaction force.

[1-10] The pedal 10 is a brake pedal used in a vehicle. In the pedal device 1 of the present embodiment, since it is possible to suppress that the pedal 10 is stuck in a non-rotatable manner when the pedal 10 is stepped on, a non-brakable state of the vehicle in which the brake of the vehicle is not operable can be prevented.

[1-11] The first guide 614 faces the second support 620 in the vehicle longitudinal direction Da, and is movable toward the second support 620 by the force from the rotation of the pedal 10. The second support 620 and the third support 626 face the housing cylinder 44 in the vehicle longitudinal direction Da, and are movable toward the housing cylinder 44 by the force from the rotation of the pedal 10. Further, when the first holder 61 moves by an amount of the first distance L1, the absolute value of the deceleration amount of the vehicle becomes equal to or greater than the threshold value, and the vehicle stops. Further, when the second holder 62 moves by an amount of the second distance L2, the absolute value of the deceleration amount of the vehicle becomes equal to or greater than the threshold value, and the vehicle stops. As described above, the first threshold value and the second threshold value are set through experiments, simulations, and the like so that a sufficient amount of deceleration of the vehicle can be obtained.

Thereby, even when one of the two sliding portions is fixed, the pedal 10 is rotatable thereby sufficiently decelerating the vehicle. Thus, the non-brakable state of the vehicle can be suppressed.

[1-12] The housing 40 that accommodates the reaction force generation mechanism 60 is arranged on the vehicle interior side of the dash panel 200 that separates the exterior of the vehicle from the interior of the vehicle. Thereby, it is difficult for moisture and oil from the engine room to enter the vehicle interior, which makes it difficult for moisture and oil from the engine room to adhere to the first elastic member 71, second elastic member 72, and third elastic member 73 of the reaction force generation mechanism 60. Further, external factors such as light and heat from the engine room are difficult to enter the vehicle interior. Therefore, the first elastic member 71, the second elastic member 72, and the third elastic member 73 are less likely to deteriorate, thereby improving durability thereof.

[1-13] The first elastic member 71, the second elastic member 72, and the third elastic member 73 are elastically deformed when the pedal 10 is not stepped on by the driver of the vehicle, and here in the present embodiment, they are compressed. Thereby, even when at least one of the first elastic member 71, second elastic member 72, and third elastic member 73 is damaged while being elastically deformed due to stepping-on of the pedal 10 by the driver of the vehicle, the pedal 10 is easily returnable back to its original position by the restoring force of those members restoring respective free lengths.

Second Embodiment

Figure 8:
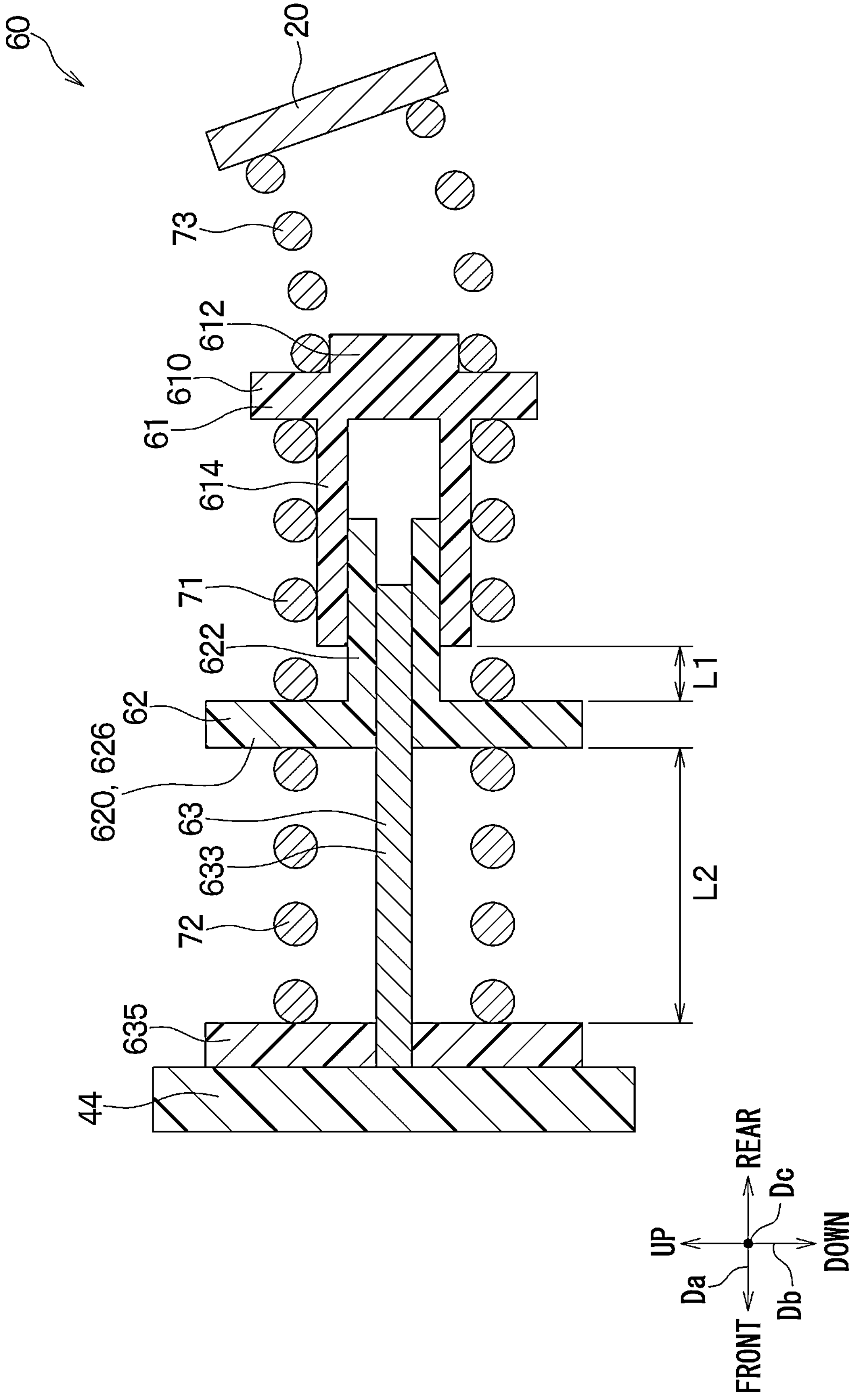
FIG. 8 is a sectional view of a reaction force generation mechanism of a pedal device according to a second embodiment.

In the second embodiment, as shown in FIG. 8, the shape of the pedal 10 is different from the first embodiment. Further, the form of the second holder 62 is different from the first embodiment. Further, the form of the guide member 63 is different from the first embodiment. Further, the housing 40 does not have the housing restrictor 50. The other configurations other than the above are similar to those of the first embodiment.

A pedal 10 has a lever plate 20 instead of the lever protrusion 16 and the lever flange 18. The lever plate 20 is formed in a plate shape and is connected to the vehicle front side of a lever part 14. Further, the lever plate 20 is in contact with one side of a third elastic member 73 opposite to a first support 610. In such configuration, the third elastic member 73 is not elastically deformed. Therefore, when a pedal part 12 is not stepped on by the driver, the third elastic member 73 has a free length. Here, when the pedal part 12 is not stepped on by the driver, the third elastic member 73 is not elastically deformed, but the third elastic member 73 is not limited thereto, and the third elastic member 73 may be elastically deformed in a situation described above. Further, the third elastic member 73 and the lever plate 20 are in contact with each other when the pedal part 12 is not stepped on by the driver, but the present disclosure is not limited thereto in a situation described above. When the pedal part 12 is not stepped on by the driver, the third elastic member 73 and the lever plate 20 may be non-contact due to separation between the third elastic member 73 and the lever plate 20 away from each other.

A second holder 62 does not include a holder cylinder 624. Further, a second support 620 and a third support 626 of the second holder 62 are integrated to have one body.

A guide member 63 has a guide member bottom 635 in addition to a third guide 633. The guide member bottom 635 corresponds to a fourth support. The guide member bottom 635 is made of resin, for example. Further, the guide member bottom 635 is connected to the third guide 633. Further, the guide member bottom 635 is connected to an inner surface of the housing cylinder 44 positioned on the vehicle front side. Further, the guide member bottom 635 supports a second elastic member 72 by being in contact with one side of the second elastic member 72 opposite to the third support 626.

A pedal device 1 of the second embodiment is configured in a manner described above. The second embodiment achieves effects similar to the effects achieved by the first embodiment.

Third Embodiment

Figure 9:
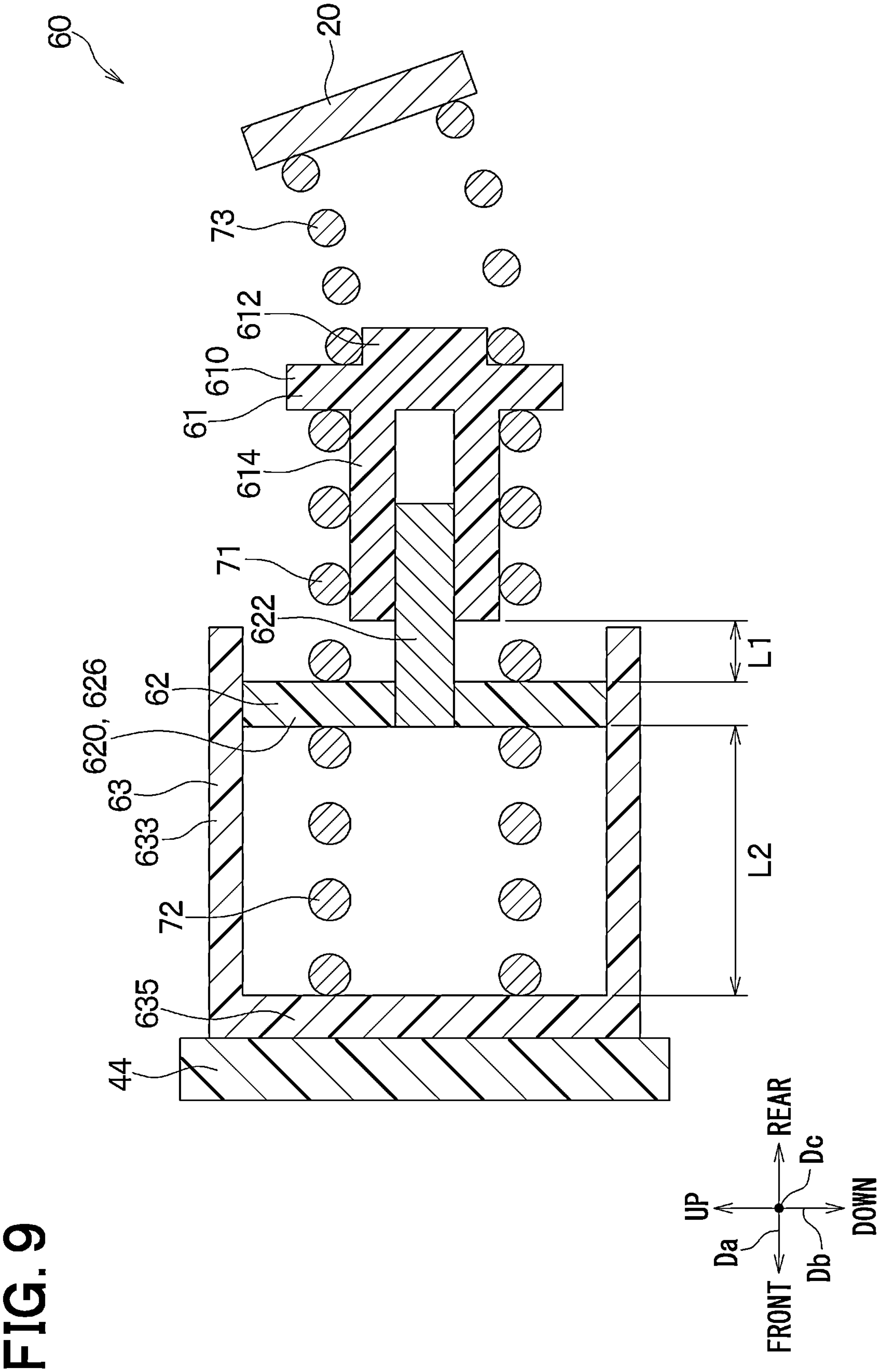
FIG. 9 is a sectional view of a reaction force generation mechanism of a pedal device according to a third embodiment.

In the third embodiment, as shown in FIG. 9, the forms of the second holder 62 and the third guide 633 are different from those in the second embodiment. Other than the above, the second embodiment is the same as the second embodiment.

A second holder 62 has a second support 620, a third support 626, and a second guide 622. The second support 620 is integrally formed with the third support 626 in a plate shape extending in the vehicle vertical direction Db. The second guide 622 is made of metal, for example. Further, the second guide 622 is connected to the second support 620, and is formed in a columnar shape extending from a boundary with the second support 620 in the vehicle rear direction. Further, a part of the second guide 622 is inserted into a hole of the first guide 614. In such manner, movements of a first guide 614 and the second guide 622 in the vehicle vertical direction Db are mutually restricted with each other. Further, an inner surface of the first guide 614 and an outer surface of the second guide 622 slide with each other in the vehicle longitudinal direction Da, due to the first guide 614 and the second guide 622 respectively extending in the vehicle longitudinal direction Da.

A third guide 633 is made of resin instead of metal. Further, the third guide 633 is formed in a cylindrical shape extending in the vehicle longitudinal direction Da, instead of having a columnar shape. Thereby, a guide member 63 is formed in a cylindrical shape with a bottom. Further, the second support 620 and the third support 626 are inserted into a hole of the third guide 633. In such manner, the movement of the second support 620, the third support 626, and the third guide 633 in the vehicle vertical direction Db is restricted. Further, since the third guide 633 extends in the vehicle longitudinal direction Da, side surfaces of the second support 620 and the third support 626 extending in the vehicle longitudinal direction Da and an inner surface of the third guide 633 slide with each other.

A pedal device 1 of the third embodiment is configured in a manner described above. The third embodiment also achieves the same effects as the second embodiment.

Fourth Embodiment

Figure 10:
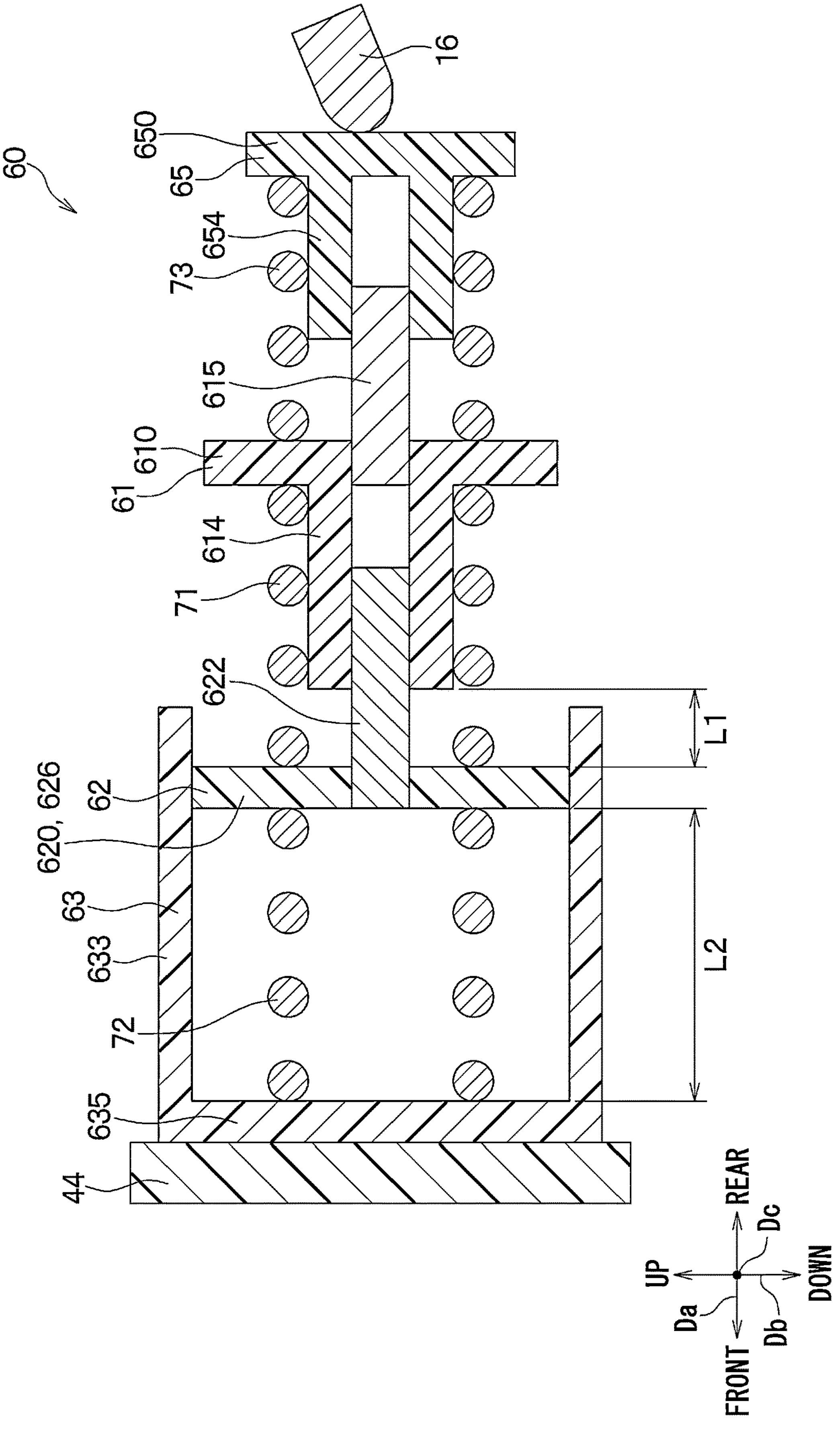
FIG. 10 is a sectional view of a reaction force generation mechanism of a pedal device according to a fourth embodiment.

In the fourth embodiment, as shown in FIG. 10, the shape of the pedal 10 is different from that in the third embodiment. Further to the first holder 61, the second holder 62, the guide member 63, the first elastic member 71, the second elastic member 72, and the third elastic member 73, the reaction force generation mechanism 60 also includes a third holder 65. Further, the form of the first holder 61 is different from the first embodiment. Other than these, the present embodiment is the same as the third embodiment.

A pedal 10 has a lever protrusion 16 instead of the lever plate 20. The lever protrusion 16 is connected to a vehicle front side of a lever part 14, and protrudes from a boundary with the lever part 14 in the vehicle front direction.

The third holder 65 is made of resin, for example. Further, the third holder 65 has a holder support 650 and a fourth guide 654.

The holder support 650 is, for example, formed in a plate shape extending in a direction perpendicular to the vehicle longitudinal direction Da. Further, the holder support 650 is in contact with the lever protrusion 16. The holder support 650 and the lever protrusion 16 are in contact with each other when a pedal part 12 is not stepped on by the driver, but the present disclosure is not limited thereto in a situation described above. When the pedal part 12 is not stepped on by the driver, the holder support 650 and the lever protrusion 16 may be non-contact due to separation between the holder support 650 and the lever protrusion 16 away from each other.

The fourth guide 654 is, for example, formed in a cylindrical shape extending in the vehicle front direction from an end surface of the holder support 650 on an opposite side to the lever protrusion 16. Further, the fourth guide 654 is arranged inside a third elastic member 73. According to the above, movement of the third elastic member 73 in the vehicle vertical direction Db is restricted.

A first holder 61 has a fifth guide 615 instead of the holder restrictor 612. The fifth guide 615 is made of metal, for example. Further, the fifth guide 615 is connected to the first support 610, and is formed in a columnar shape extending from a boundary with the first support 610 in the vehicle rear direction. Further, a part of the fifth guide 615 is inserted into a hole of the fourth guide 654. Thereby, movement of the fourth guide 654 and the fifth guide 615 in the vehicle vertical direction Db is mutually restricted with each other. Further, since the fourth guide 654 and the fifth guide 615 extend in the vehicle longitudinal direction Da, an inner surface of the fourth guide 654 and an outer surface of the fifth guide 615 slide with each other in the vehicle longitudinal direction Da.

A pedal device 1 of the fourth embodiment is configured in a manner described above. The fourth embodiment also achieves the same effects as the third embodiment.

Fifth Embodiment

Figure 11:
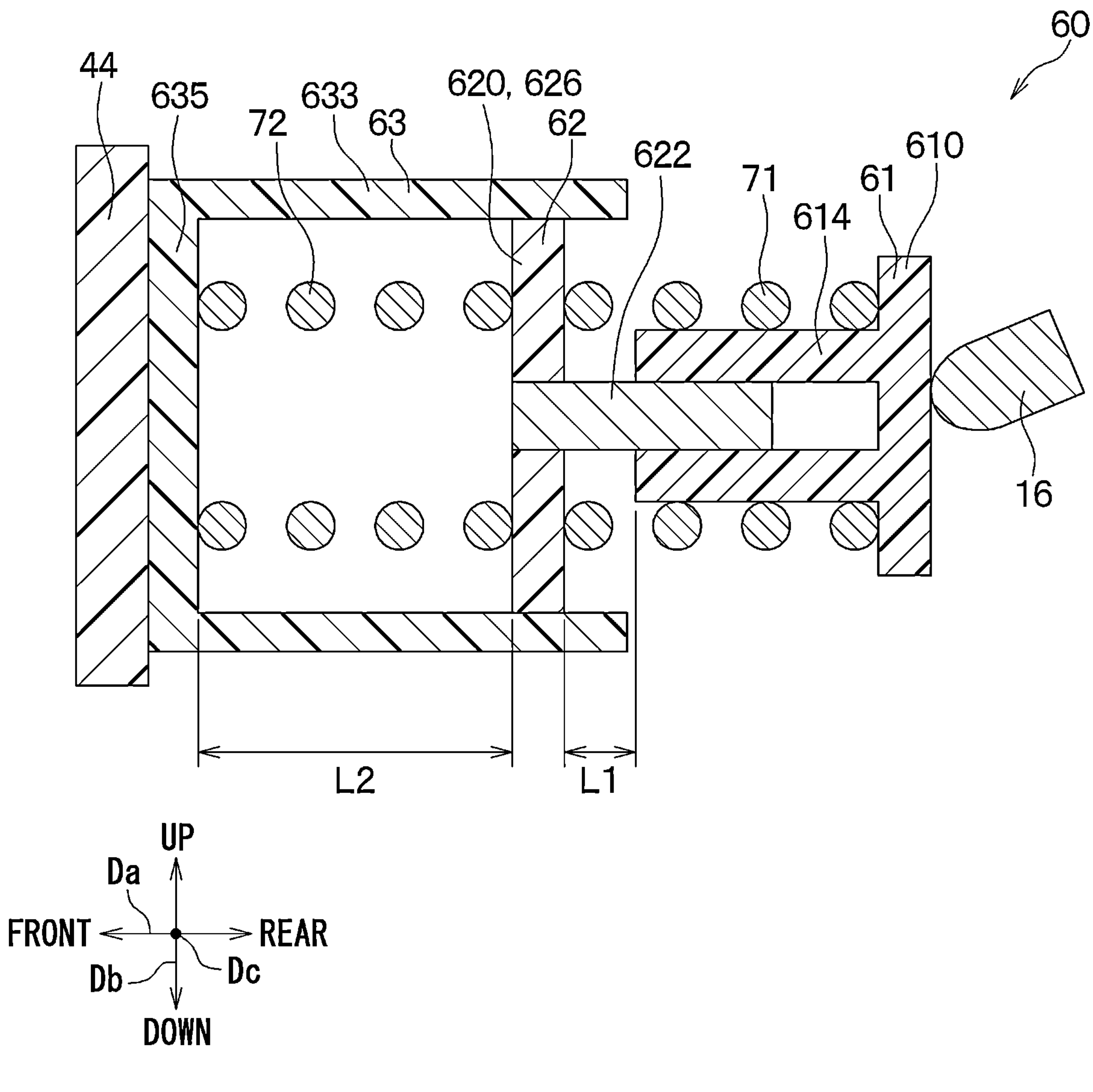
FIG. 11 is a sectional view of a reaction force generation mechanism of a pedal device according to a fifth embodiment.

In the fifth embodiment, as shown in FIG. 11, the shape of the pedal 10 is different from that in the third embodiment. Further, the reaction force generation mechanism 60 does not include the third elastic member 73 and the third holder 65. Further, the first holder 61 does not include the fifth guide 615. The configurations other than the above are similar to those of the fourth embodiment.

A lever protrusion 16 of a pedal 10 contacts a first support 610 instead of contacting a holder support 650. The lever protrusion 16 and the first support 610 are in contact with each other when a pedal part 12 is not stepped on by the driver, but the present disclosure is not limited thereto in a situation described above. When the pedal part 12 is not stepped on by the driver, the first support 610 and the lever protrusion 16 may be not in contact with each other due to separation between the lever protrusion 16 and the first support 610 away from each other.

A pedal device 1 of the fifth embodiment is configured in a manner described above. The fifth embodiment achieves effects similar to the effects achieved by the fourth embodiment.

Sixth Embodiment

Figure 12:
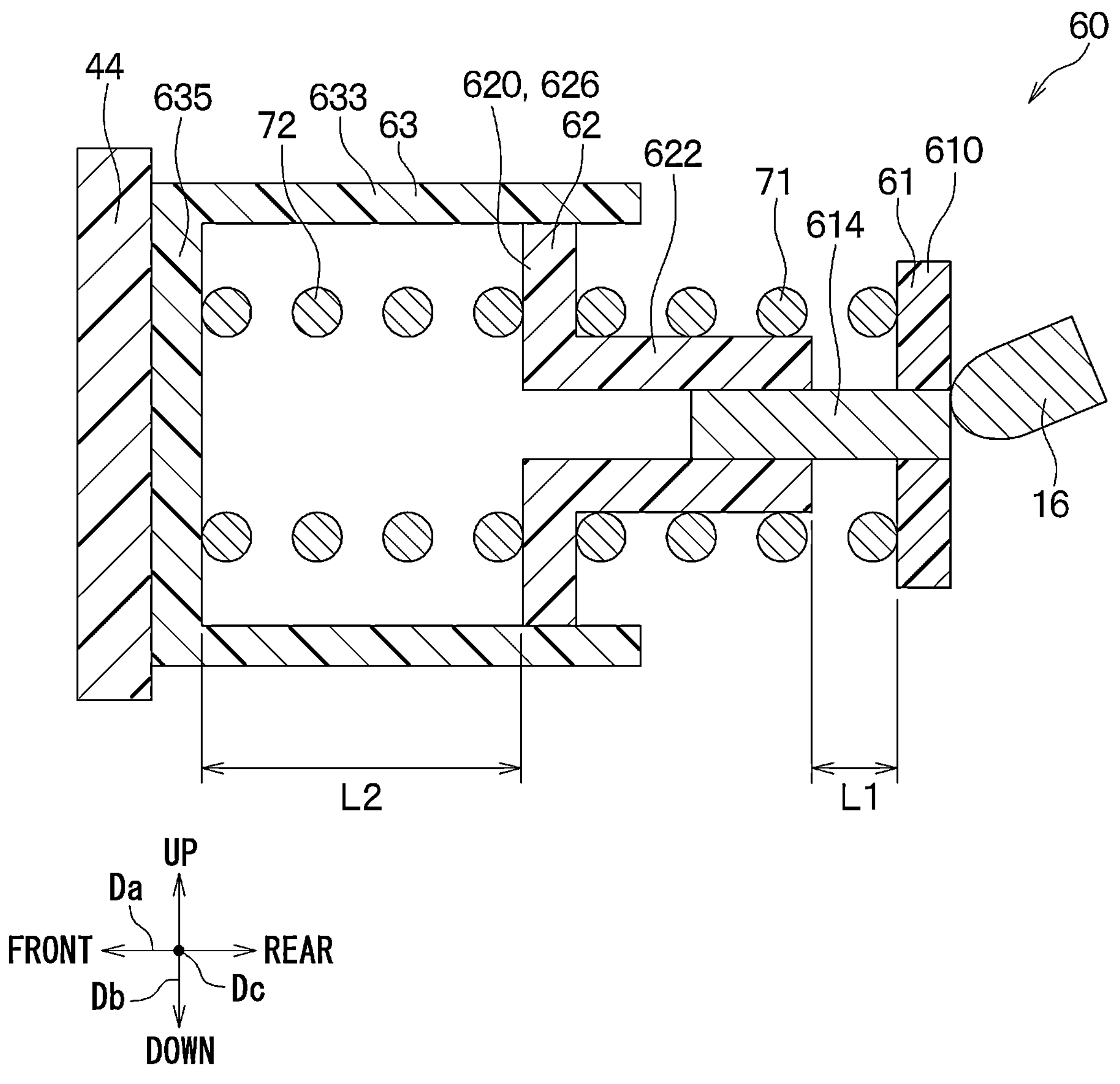
FIG. 12 is a sectional view of a reaction force generation mechanism of a pedal device according to a sixth embodiment.

In the sixth embodiment, as shown in FIG. 12, the shapes of the first guide 614 and the second guide 622 are different from those in the fifth embodiment. Other than the above, the present embodiment is the same as the fifth embodiment.

A first guide 614 is made of metal instead of resin. Further, the first guide 614 is formed in a columnar shape instead of having a cylindrical shape. A second guide 622 is made of resin instead of metal. Further, the second guide 622 is formed in a cylindrical shape instead of having a columnar shape. Further, a part of the first guide 614 is inserted into a hole of the second guide 622. Thereby, movement of the first guide 614 and the second guide 622 in the vehicle vertical direction Db is mutually restricted with each other. Further, since the first guide 614 and the second guide 622 extend in the vehicle longitudinal direction Da, an outer surface of the first guide 614 and an inner surface of the second guide 622 slide with each other in the vehicle longitudinal direction Da.

A pedal device 1 of the sixth embodiment is configured in a manner described above. The sixth embodiment also achieves the same effects as the fifth embodiment.

Seventh Embodiment

Figure 13:
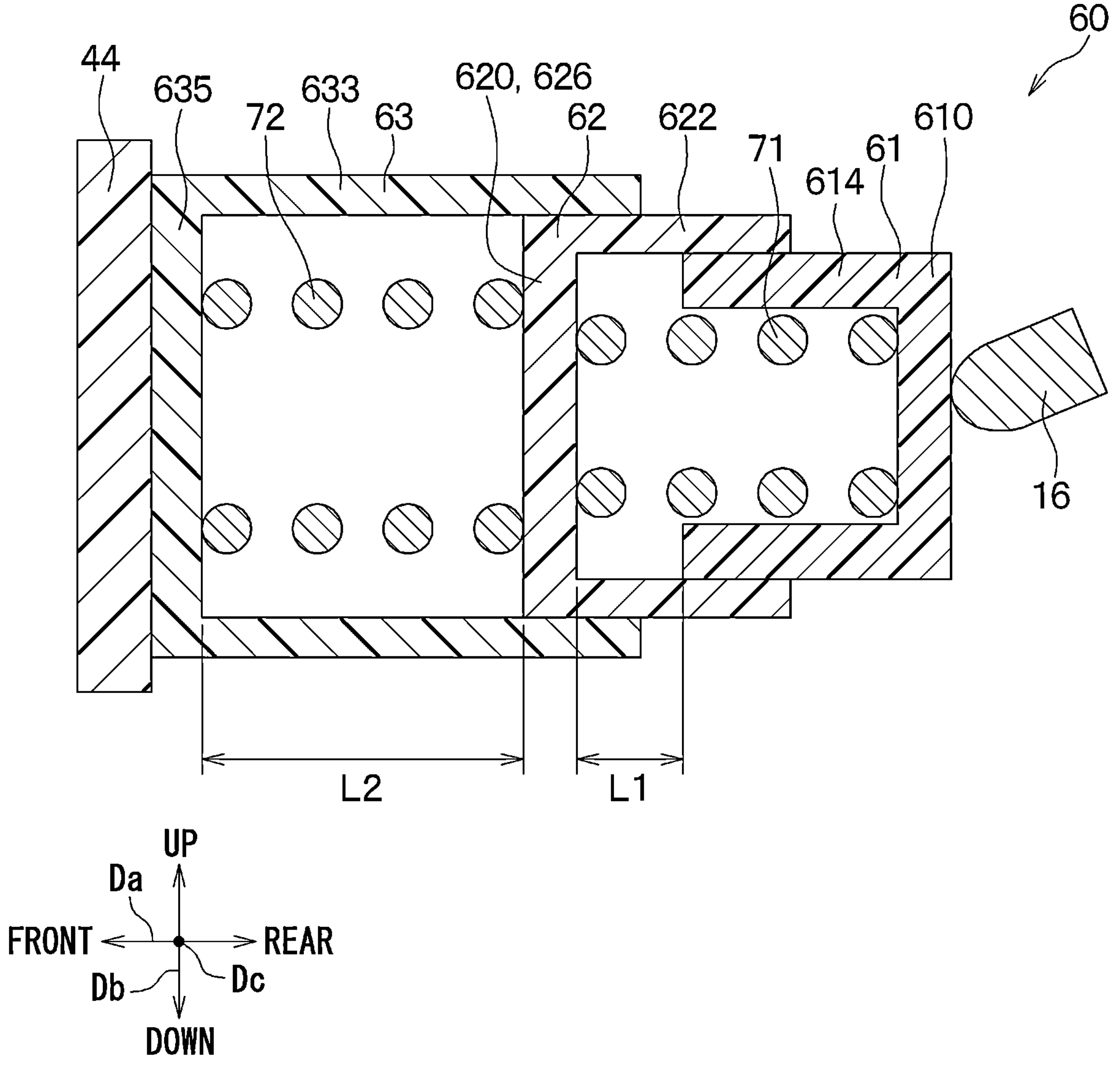
FIG. 13 is a sectional view of a reaction force generation mechanism of a pedal device according to a seventh embodiment.

In the seventh embodiment, as shown in FIG. 13, the shapes of the first guide 614 and the second guide 622 are different from those in the fifth embodiment. The other configuration other than the above is the same as that of the fifth embodiment.

A first guide 614 is made of resin and has a cylindrical shape, and is disposed outside a first elastic member 71.

A second guide 622 is made of resin instead of metal. Further, the second guide 622 is formed in a cylindrical shape instead of having a columnar shape. Further, a part of the first guide 614 is inserted into a hole of the second guide 622. A part of the second guide 622 may be inserted into the hole of the first guide 614.

Thereby, movement of the first guide 614 and the second guide 622 in the vehicle vertical direction Db is mutually restricted with each other. Further, since the first guide 614 and the second guide 622 extend in the vehicle longitudinal direction Da, an outer surface of the first guide 614 and an inner surface of the second guide 622 slide with each other in the vehicle longitudinal direction Da.

Further, a part of the second guide 622 is inserted into a hole of a third guide 633. Thereby, movement of the second guide 622 and the third guide 633 in the vehicle vertical direction Db is mutually restricted with each other. Further, since the second guide 622 and the third guide 633 extend in the vehicle longitudinal direction Da, an outer surface of the second guide 622 and an inner surface of the third guide 633 slide with each other in the vehicle longitudinal direction Da.

A pedal device 1 of the seventh embodiment is configured in a manner described above. The seventh embodiment also achieves the same effects as the fifth embodiment.

Eighth Embodiment

Figure 14:
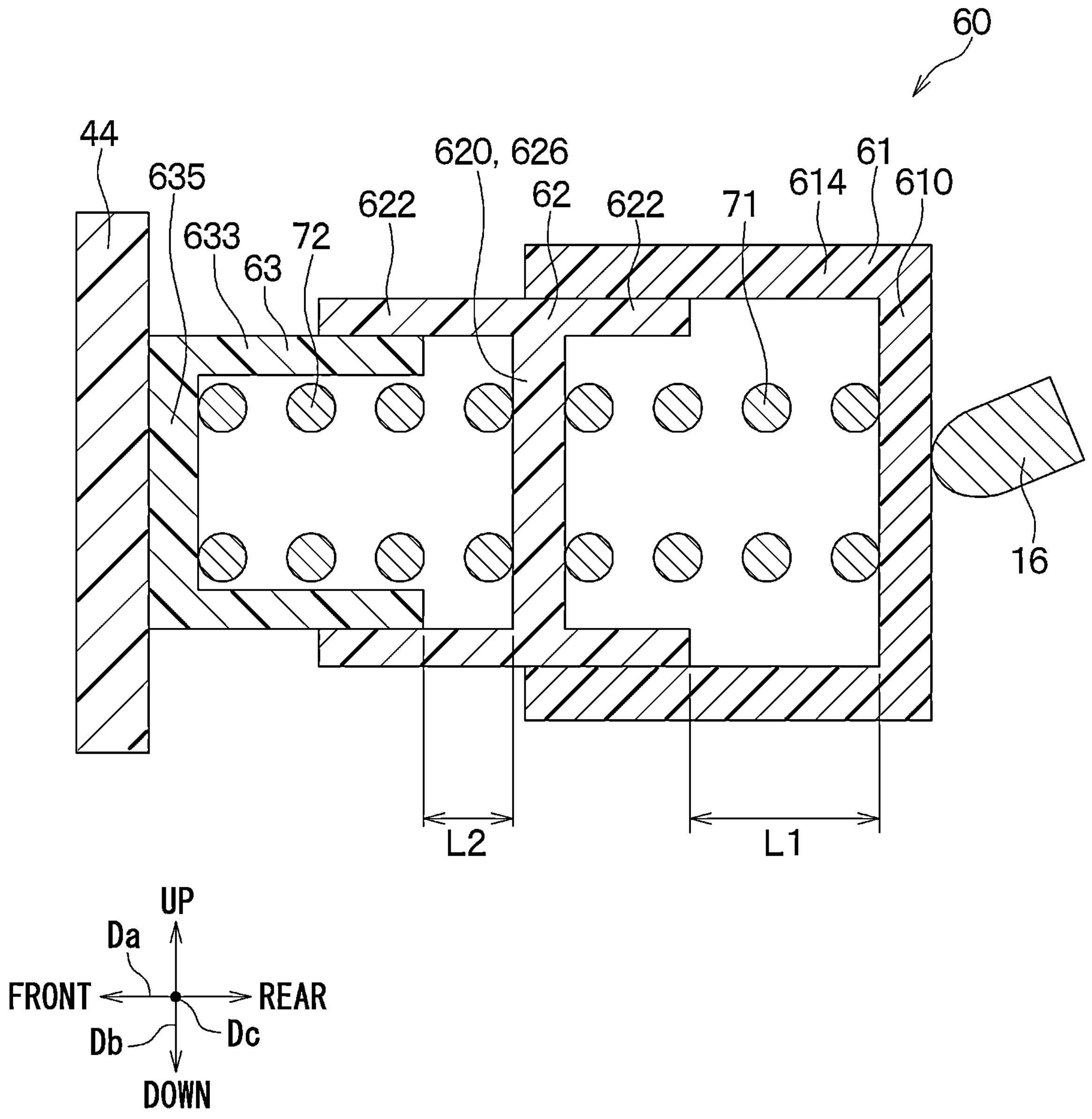
FIG. 14 is a sectional view of a reaction force generation mechanism of a pedal device according to an eighth embodiment.

In the eighth embodiment, as shown in FIG. 14, the shapes of the first guide 614 and the second guide 622 are different from those in the fifth embodiment. The other configuration is the same as that of the seventh embodiment.

A second guide 622 extends from a second support 620 in the vehicle longitudinal direction Da. Further, a part of the second guide 622 is inserted into the hole of a first guide 614. A part of the first guide 614 may be inserted into a hole of the second guide 622.

Thereby, movement of the second guide 622 and the first guide 614 in the 33/66 vehicle vertical direction Db is restricted from each other. Further, an inner surface of the first guide 614 and an outer surface of the second guide 622 slide with each other in the vehicle longitudinal direction Da, due to the first guide 614 and the second guide 622 respectively extending in the vehicle longitudinal direction Da.

Further, a part of a third guide 633 is inserted into a hole of the second guide 622. A part of the second guide 622 may be inserted into a hole of the third guide 633.

Thereby, movement of the second guide 622 and the third guide 633 in the vehicle vertical direction Db is mutually restricted with each other. Further, since the second guide 622 and the third guide 633 extend in the vehicle longitudinal direction Da, an inner surface of the second guide 622 and an outer surface of the third guide 633 slide with each other in the vehicle longitudinal direction Da.

A pedal device 1 of the eighth embodiment is configured in a manner described above. The eighth embodiment also achieves the same effects as the seventh embodiment.

Ninth Embodiment

Figure 15:
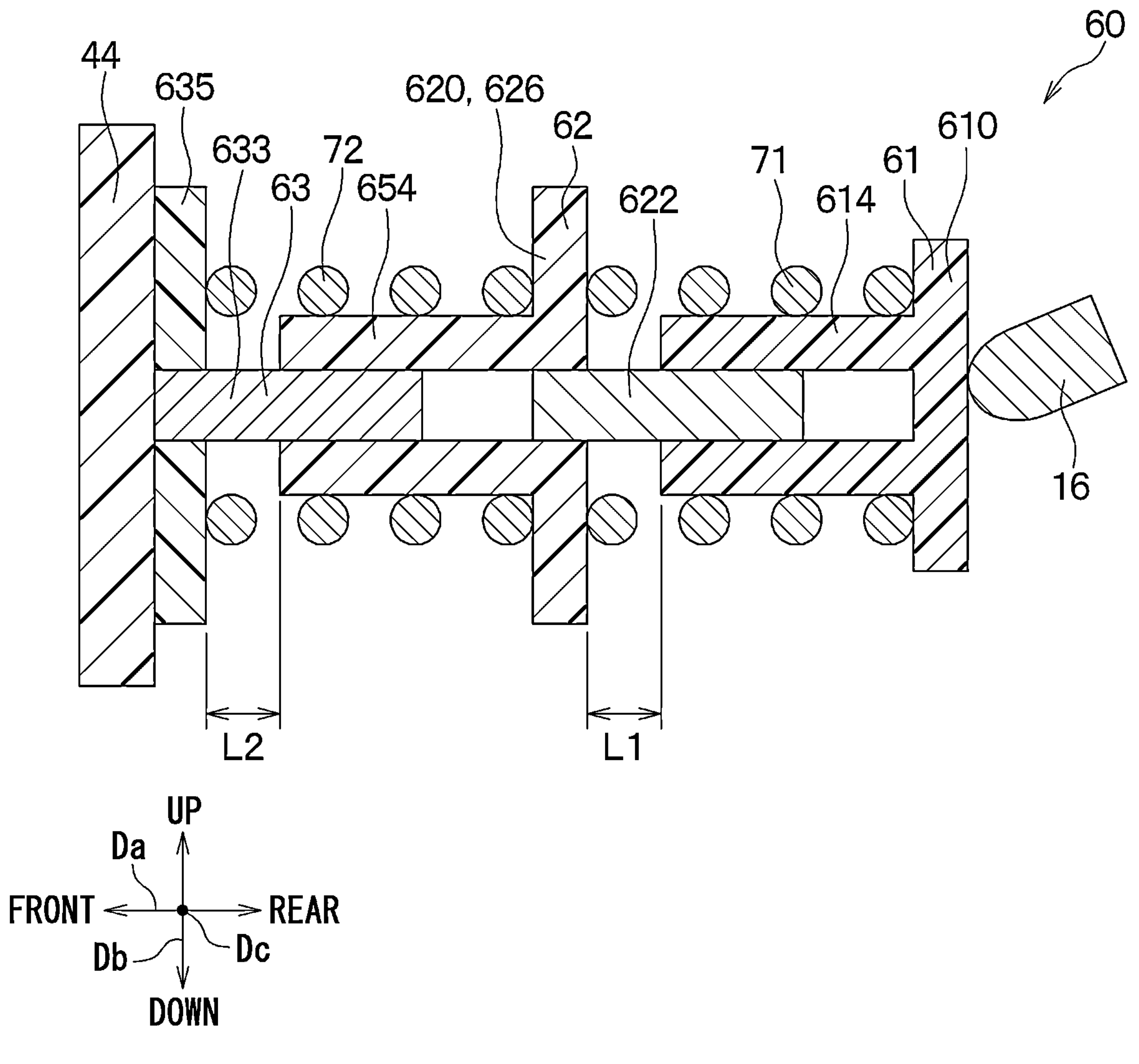
FIG. 15 is a sectional view of a reaction force generation mechanism of a pedal device according to a ninth embodiment.

In the ninth embodiment, as shown in FIG. 15, the forms of the second holder 62 and the third guide 633 are different from those in the fifth embodiment. The other configuration other than the above is the same as that of the fifth embodiment.

A second holder 62 includes a fourth guide 654, in addition to a second support 620, a third support 626, and a second guide 622.

The fourth guide 654 is made of resin, for example. Further, the fourth guide 654 is connected to the second support 620, and is formed in a cylindrical shape extending from a boundary with the second support 620 in the vehicle front direction.

The third guide 633 is made of metal instead of resin. Further, the third guide 633 is formed in a columnar shape instead of having a cylindrical shape. Further, a part of the third guide 633 is inserted into the hole of the fourth guide 654. Thereby, the movement of the third guide 633 and the fourth guide 654 in the vehicle vertical direction Db is mutually restricted with each other. Further, since the third guide 633 and the fourth guide 654 extend in the vehicle longitudinal direction Da, an outer surface of the third guide 633 and an inner surface of the fourth guide 654 slide with each other in the vehicle longitudinal direction Da.

A pedal device 1 of the ninth embodiment is configured in a manner described above. The ninth embodiment also achieves the same effects as the fifth embodiment.

Tenth Embodiment

Figure 16:
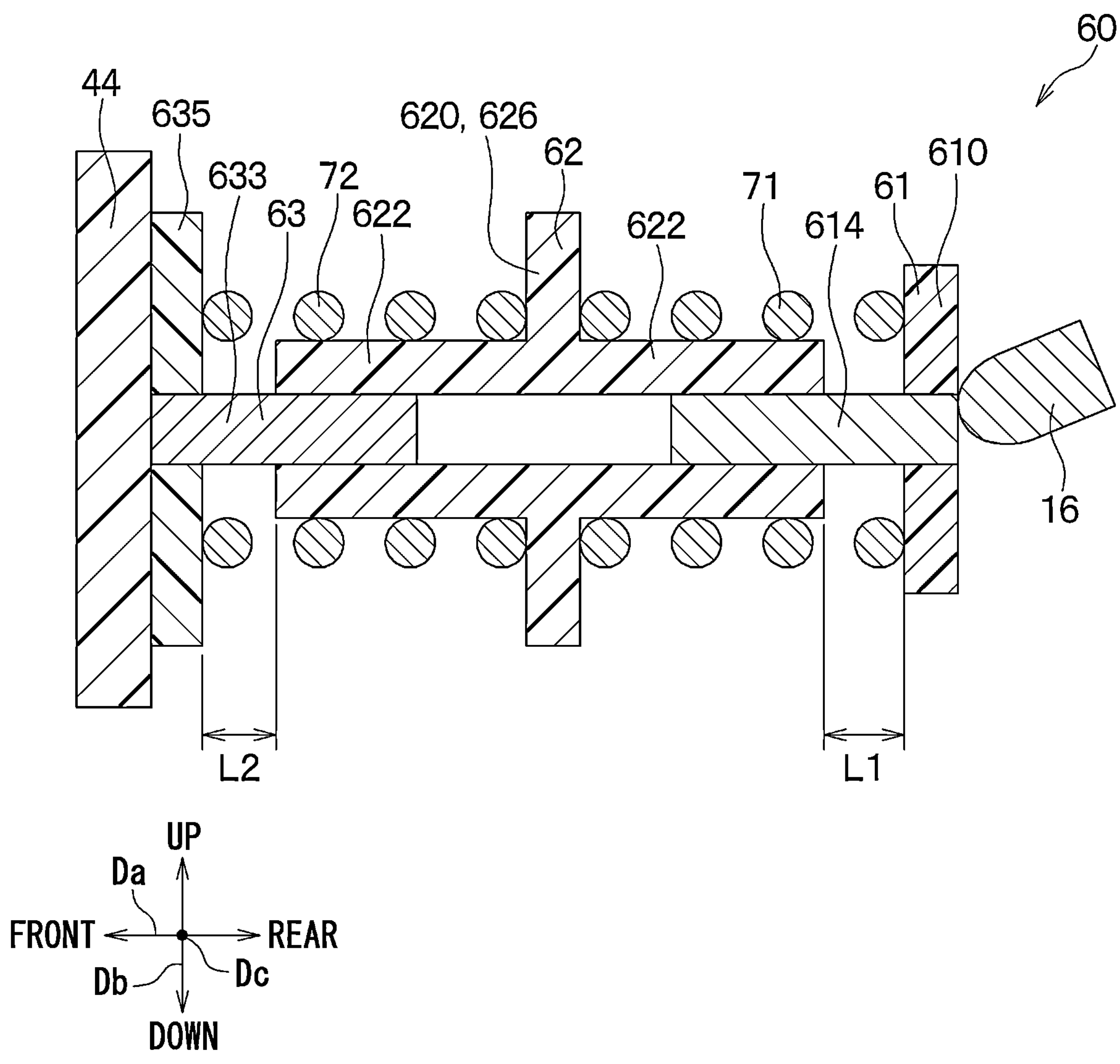
FIG. 16 is a sectional view of a reaction force generation mechanism of a pedal device according to a tenth embodiment.

In the tenth embodiment, as shown in FIG. 16, the shapes of the first guide 614, the second support 620, the third support 626, the second guide 622, and the third guide 633 are different from those in the fifth embodiment. The other configuration other than the above is the same as that of the fifth embodiment.

A first guide 614 is made of metal instead of resin. Further, the first guide 614 is formed in a columnar shape instead of having a cylindrical shape. A second support 620 and a third support 626 are formed in an annular shape.

A second guide 622 is made of resin instead of metal. Further, the second guide 622 is formed in, instead of having a columnar shape, a cylindrical shape extending in the vehicle longitudinal direction Da. Further, a hole of the first guide 614 communicates with a hole of the second guide 622. Further, a part of the first guide 614 is inserted into the hole of the second guide 622.

The third guide 633 is made of metal instead of resin. Further, the third guide 633 is formed in a columnar shape instead of having a cylindrical shape. Further, a part of the third guide 633 is inserted into the hole of the second guide 622. Thereby, movement of the second guide 622 and the third guide 633 in the vehicle vertical direction Db is mutually restricted with each other. Further, since the second guide 622 and the third guide 633 extend in the vehicle longitudinal direction Da, an inner surface of the second guide 622 and an outer surface of the third guide 633 slide with each other in the vehicle longitudinal direction Da.

A pedal device 1 of the tenth embodiment is configured in a manner described above. The tenth embodiment also achieves the same effects as the fifth embodiment.

Eleventh Embodiment

Figure 17:
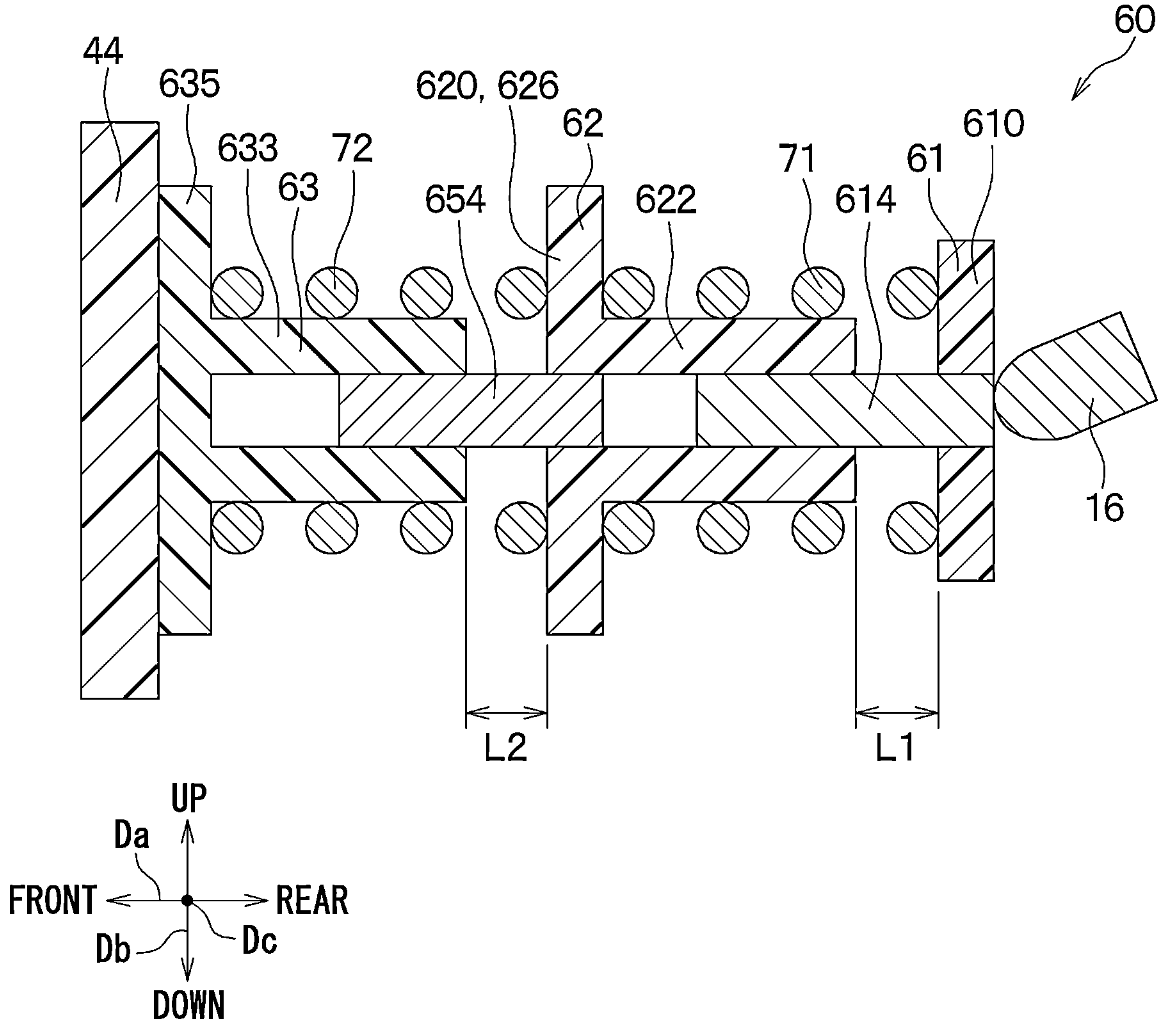
FIG. 17 is a sectional view of a reaction force generation mechanism of a pedal device according to an eleventh embodiment.

In the eleventh embodiment, as shown in FIG. 17, the shapes of the first guide 614, the second guide 622, the third guide 633, and the fourth guide 654 are different from those in the ninth embodiment. Other than the above, the eleventh embodiment is the same as the ninth embodiment.

A first guide 614 is made of metal instead of resin. Further, the first guide 614 is formed in a columnar shape instead of having a cylindrical shape.

A second guide 622 is made of resin instead of metal. Further, the second guide 622 is formed in a cylindrical shape instead of having a columnar shape. Further, a part of the first guide 614 is inserted into a hole of the second guide 622. Thereby, movement of the first guide 614 and the second guide 622 in the vehicle vertical direction Db is mutually restricted with each other. Further, since the first guide 614 and the second guide 622 extend in the vehicle longitudinal direction Da, an outer surface of the first guide 614 and an inner surface of the second guide 622 slide with each other in the vehicle longitudinal direction Da.

A third guide 633 is made of resin instead of metal. Further, the third guide 633 is formed in a cylindrical shape instead of having a columnar shape.

A fourth guide 654 is made of metal instead of resin. Further, the fourth guide 654 is formed in a columnar shape instead of having a cylindrical shape. Further, a part of the fourth guide 654 is inserted into a hole of the third guide 633. Thereby, the movement of the third guide 633 and the fourth guide 654 in the vehicle vertical direction Db is mutually restricted with each other. Further, since the third guide 633 and the fourth guide 654 extend in the vehicle longitudinal direction Da, an inner surface of the third guide 633 and an outer surface of the fourth guide 654 slide with each other in the vehicle longitudinal direction Da.

A pedal device 1 of the eleventh embodiment is configured in a manner described above. The eleventh embodiment also achieves the same effects as the ninth embodiment.

Twelfth Embodiment

Figure 18:
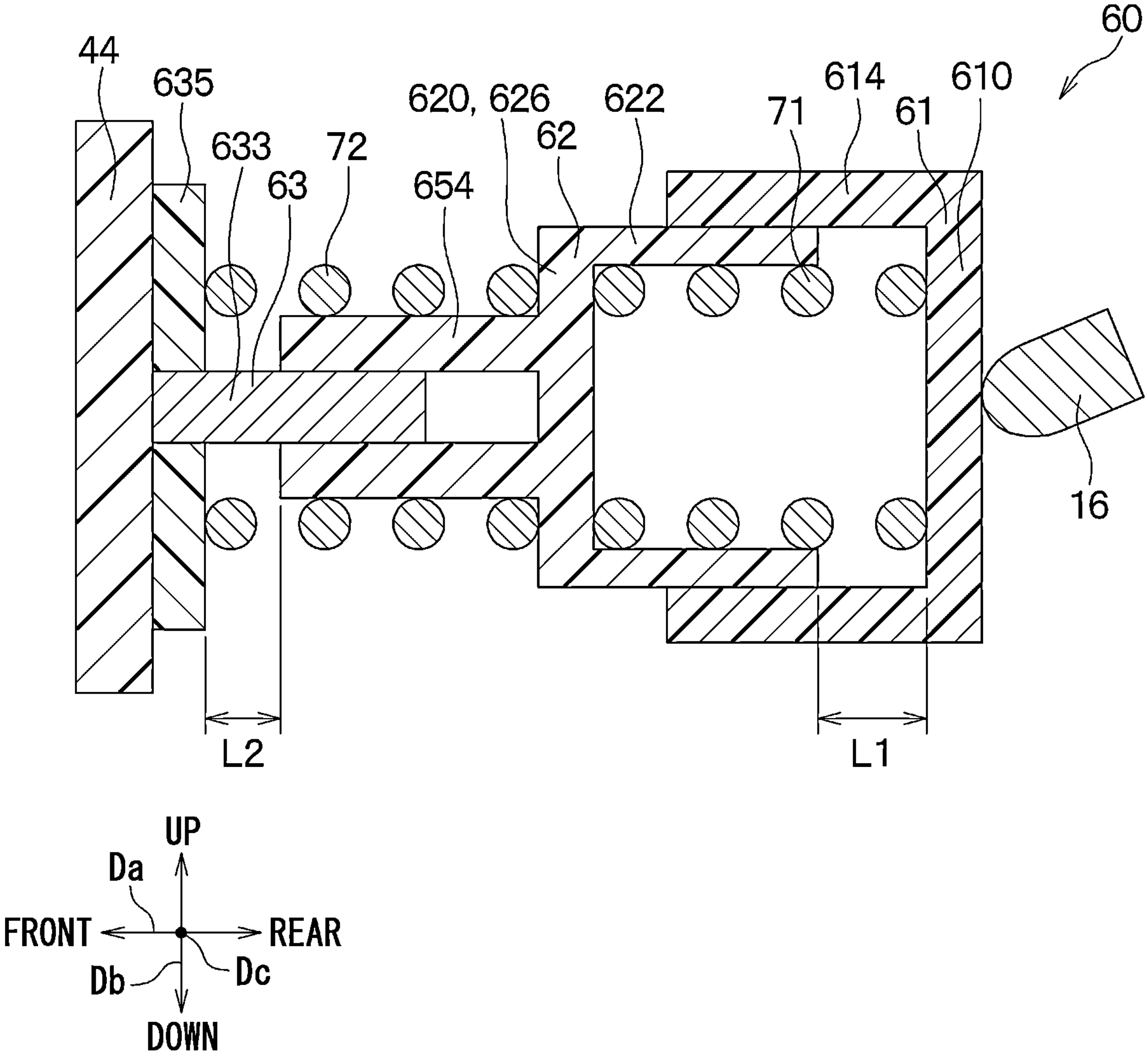
FIG. 18 is a sectional view of a reaction force generation mechanism of a pedal device according to a twelfth embodiment.

In the twelfth embodiment, as shown in FIG. 18, the shapes of the first guide 614 and the second guide 622 are different from those in the ninth embodiment. Other than the above, the twelfth embodiment is the same as the ninth embodiment.

A first guide 614 is made of resin and has a cylindrical shape, and is disposed outside a first elastic member 71.

A second guide 622 is made of resin instead of metal. Further, the second guide 622 is formed in a cylindrical shape instead of having a columnar shape. Further, a part of the first guide 614 is inserted into a hole of the second guide 622. A part of the first guide 614 is inserted into a hole of the second guide 622.

Thereby, movement of the first guide 614 and the second guide 622 in the vehicle vertical direction Db is mutually restricted with each other. Further, an inner surface of the first guide 614 and an outer surface of the second guide 622 slide with each other in the vehicle longitudinal direction Da, due to the first guide 614 and the second guide 622 respectively extending in the vehicle longitudinal direction Da.

A pedal device 1 of the twelfth embodiment is configured in a manner described above. The twelfth embodiment also achieves the same effects as the ninth embodiment.

Thirteenth Embodiment

Figure 19:
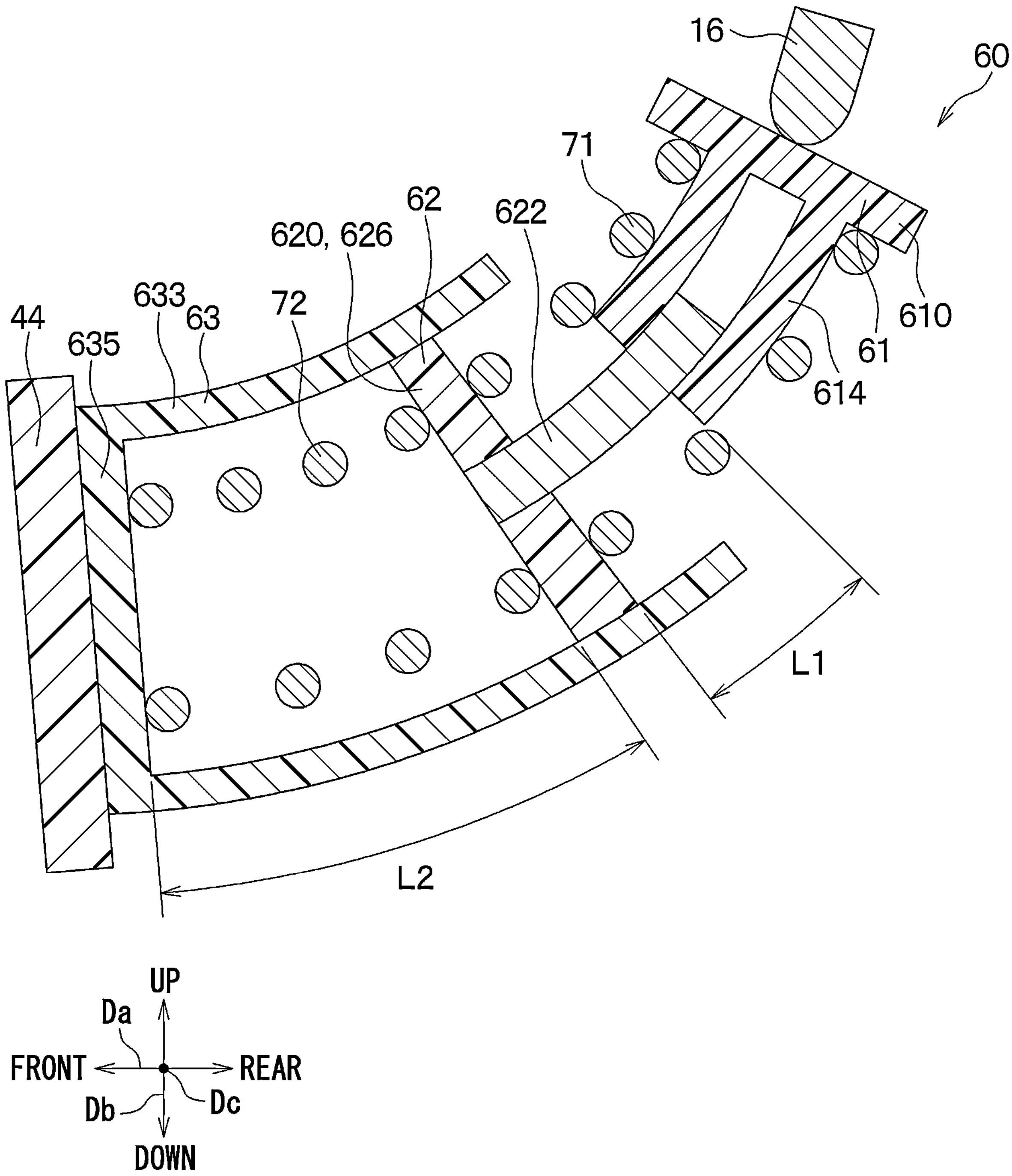
FIG. 19 is a sectional view of a reaction force generation mechanism of a pedal device according to a thirteenth embodiment.

In the thirteenth embodiment, as shown in FIG. 19, the forms of the first support 610, the first guide 614, the second support 620, the second guide 622, the third guide 633, the first elastic member 71 and the second elastic member 72 are different from the fifth embodiment. The other configuration other than the above is the same as that of the fifth embodiment.

A first support 610 extends in a direction intersecting the vehicle longitudinal direction Da and the vehicle vertical direction Db.

A first guide 614 is connected to the first support 610, and extends in a clockwise direction of rotation about an axis extending from a boundary with the first support 610 in the vehicle lateral direction Dc.

A second support 620 extends in a direction intersecting the vehicle longitudinal direction Da and the vehicle vertical direction Db.

A second guide 622 is connected to the second support 620, and extends in a counterclockwise direction of rotation about an axis extending from a boundary with the second support 620 in the vehicle lateral direction Dc.

A third guide 633 is connected to a guide member bottom 635, and extends in the counterclockwise direction of rotation about an axis extending from the guide member bottom 635 in the vehicle lateral direction Dc.

The first elastic member 71 and the second elastic member 72 are elastically deformed in the clockwise direction of rotation about an axis extending in the vehicle lateral direction Dc, instead of being elastically deformed in a straight travel direction. The vehicle lateral direction Dc corresponds to a direction of the rotation axis O. Further, the deformation direction of the first elastic member 71 and the second elastic member 72 corresponds to a tangential direction of a circle centered on the rotation axis O.

A pedal device 1 of the thirteenth embodiment is configured in a manner described above. The thirteenth embodiment also achieves the same effects as the fifth embodiment. Further, the thirteenth embodiment also achieves the effects described below.

[2] The deformation direction of the first elastic member 71 and the second elastic member 72 is a rotation direction about an axis extending in the vehicle lateral direction Dc.

Thereby, compared to a case where the deformation direction of the first elastic member 71 and the second elastic member 72 is the straight travel direction, the first elastic member 71 and the second elastic member 72 respectively have a longer length by a length in a direction intersecting the straight travel direction. Therefore, a deformation range of the first elastic member 71 and the second elastic member 72 becomes larger, a movement range of the first holder 61 and the second holder 62 becomes larger. Therefore, due to an increase in a range of rotational movement of the pedal 10, it becomes easier to adjust a step-on operation of the pedal 10.

Fourteenth Embodiment

Figure 20:
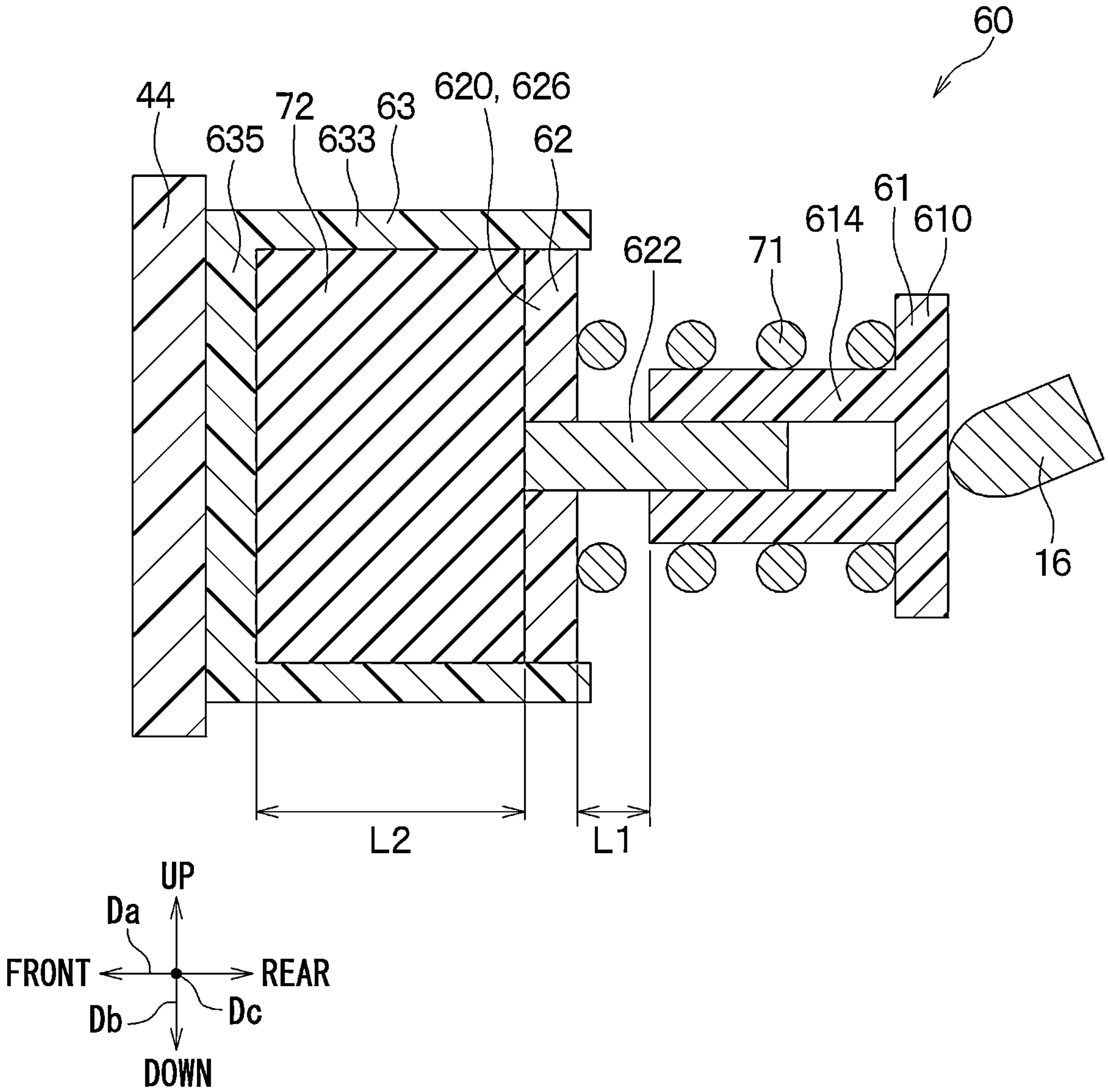
FIG. 20 is a sectional view of a reaction force generation mechanism of a pedal device according to a fourteenth embodiment.

In the fourteenth embodiment, as shown in FIG. 20, the form of the second elastic member 72 is different from that in the fifth embodiment. The other configuration other than the above is the same as that of the fifth embodiment.

A second elastic member 72 is made of rubber instead of a coil spring. A first elastic member 71 may be made of rubber instead of a coil spring.

A pedal device 1 of the fourteenth embodiment is configured in a manner described above. The fourteenth embodiment also achieves the same effects as the fifth embodiment.

Fifteenth Embodiment

Figure 21:
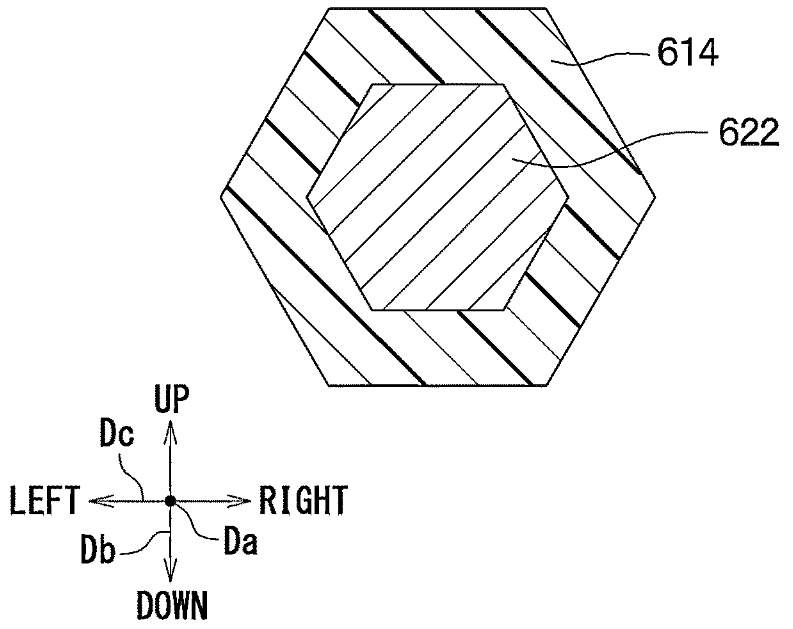
FIG. 21 is a sectional view of a first guide and a second guide of a pedal device according to a fifteenth embodiment.
Figure 22:
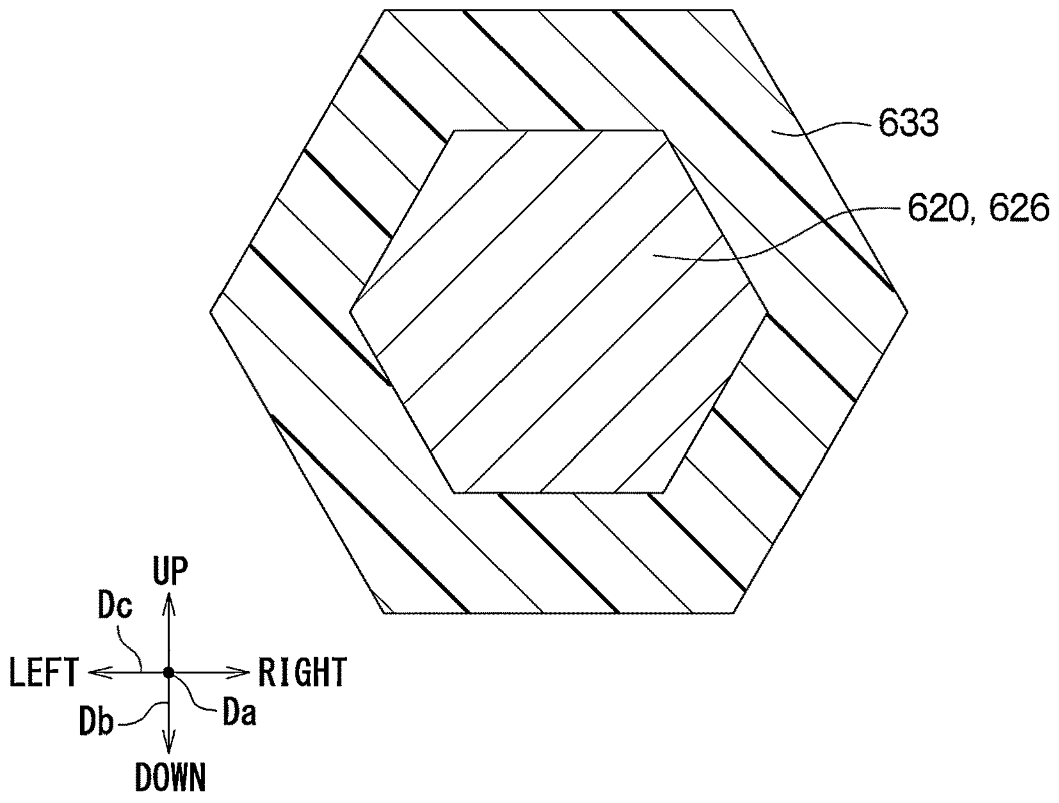
FIG. 22 is a sectional view of a second support and a third guide of the pedal device.

In the fifteenth embodiment, as shown in FIGS. 21 and 22, the first guide 614, the second guide 622, the second support 620, the third support 626, and the third guide 633 have a form different from the fifth embodiment. The other configuration other than the above is the same as that of the fifth embodiment.

As shown in FIG. 21, a first guide 614 is formed in a polygonal tube shape such as a hexagonal tube shape or the like instead of having a cylindrical shape. A second guide 622 is formed in a polygonal column shape, such as a hexagonal column 39/66 shape, or the like corresponding to a hole of the first guide 614 instead of having a columnar shape.

As shown in FIG. 22, a second support 620 and a third support 626 are formed in a polygonal plate shape such as a hexagonal plate shape or the like instead of having a disk shape. A third guide 633 is formed in a polygonal tube shape such as a hexagonal tube shape or the like corresponding to the shapes of the second support 620 and the third support 626 instead of having a cylindrical shape.

A pedal device 1 of the fifteenth embodiment is configured in a manner described above. The fifteenth embodiment also achieves the same effects as the fifth embodiment.

Sixteenth Embodiment

Figure 23:
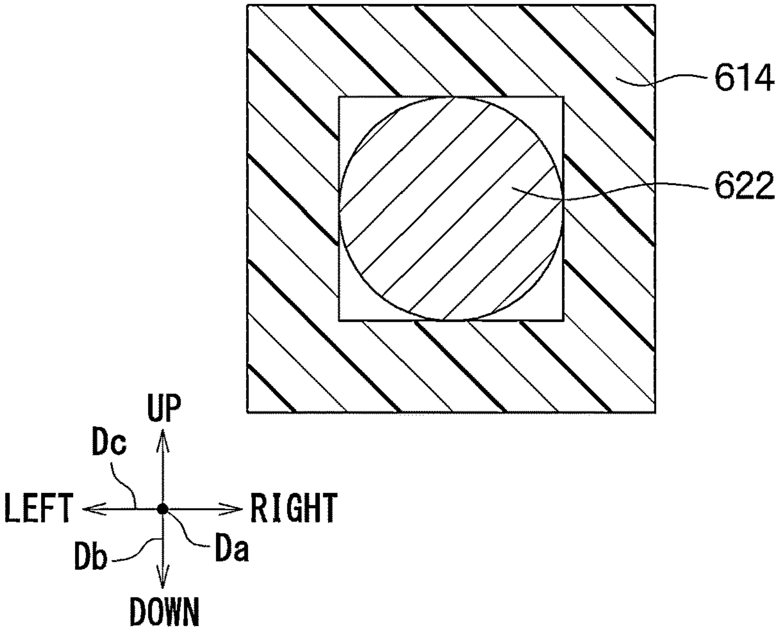
FIG. 23 is a sectional view of a first guide and a second guide of a pedal device according to a sixteenth embodiment.
Figure 24:
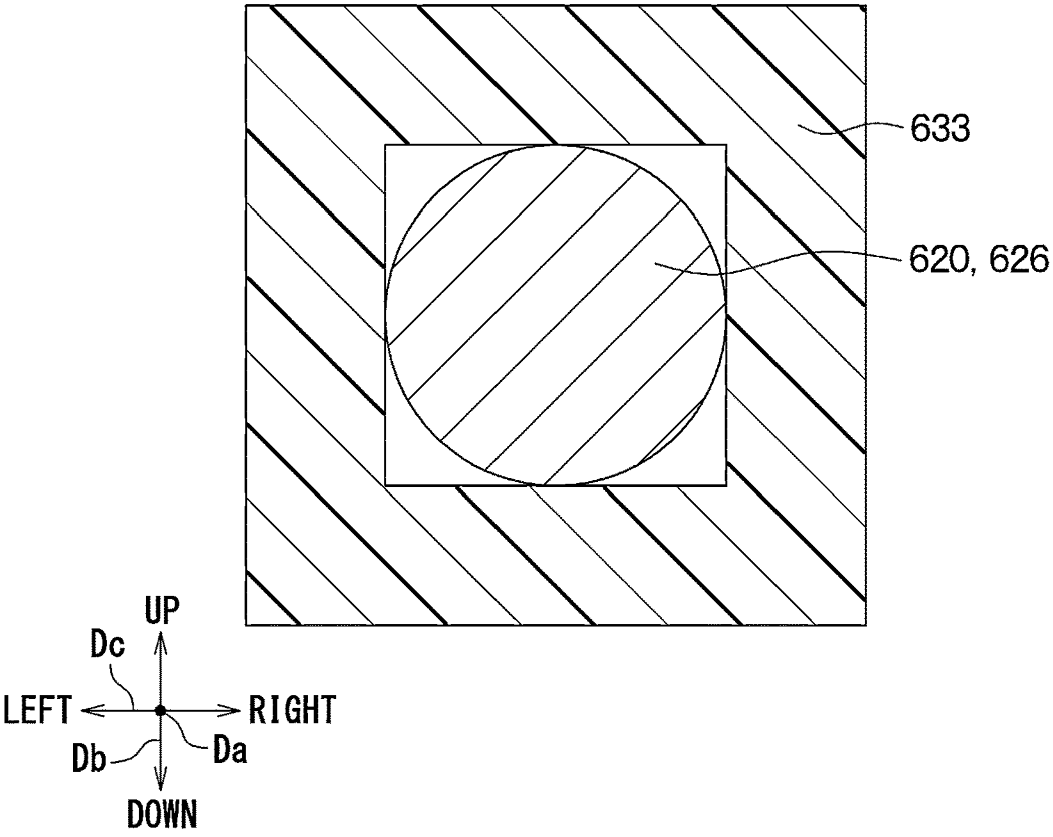
FIG. 24 is a sectional view of the second support and the third guide of the pedal device.

In the sixteenth embodiment, as shown in FIGS. 23 and 24, the shapes of the first guide 614 and the third guide 633 are different from those in the fifth embodiment.

As shown in FIG. 23, a first guide 614 is formed in a polygonal tube shape such as a square tube shape or the like instead of having a cylindrical shape. As shown in FIG. 24, a third guide 633 is formed in a polygonal tube shape such as a square tube shape or the like instead of having a cylindrical shape.

A pedal device 1 of the sixteenth embodiment is configured in a manner described above. The sixteenth embodiment also achieves the same effects as the fifth embodiment.

Seventeenth Embodiment

Figure 25:
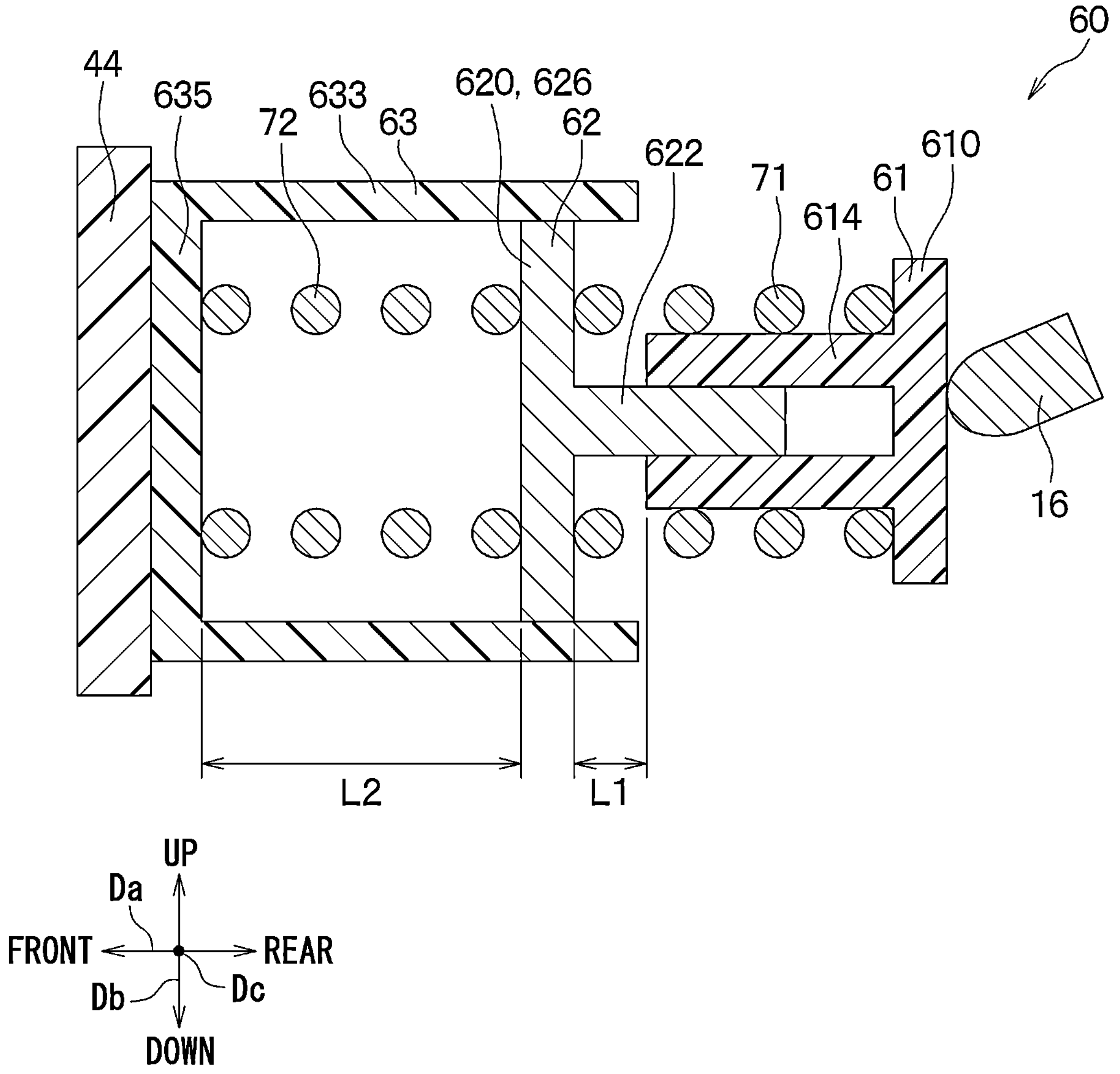
FIG. 25 is a sectional view of a reaction force generation mechanism of a pedal device according to a seventeenth embodiment.

In the seventeenth embodiment, as shown in FIG. 25, the forms of the second support 620 and the third support 626 are different from those in the fifth embodiment. Specifically, a second support 620 and a third support 626 are made of metal instead of resin. The other configuration other than the above is the same as that of the fifth embodiment.

A pedal device 1 of the seventeenth embodiment is configured in a manner described above. The seventeenth embodiment also achieves the same effects as the fifth embodiment.

Eighteenth Embodiment

Figure 26:
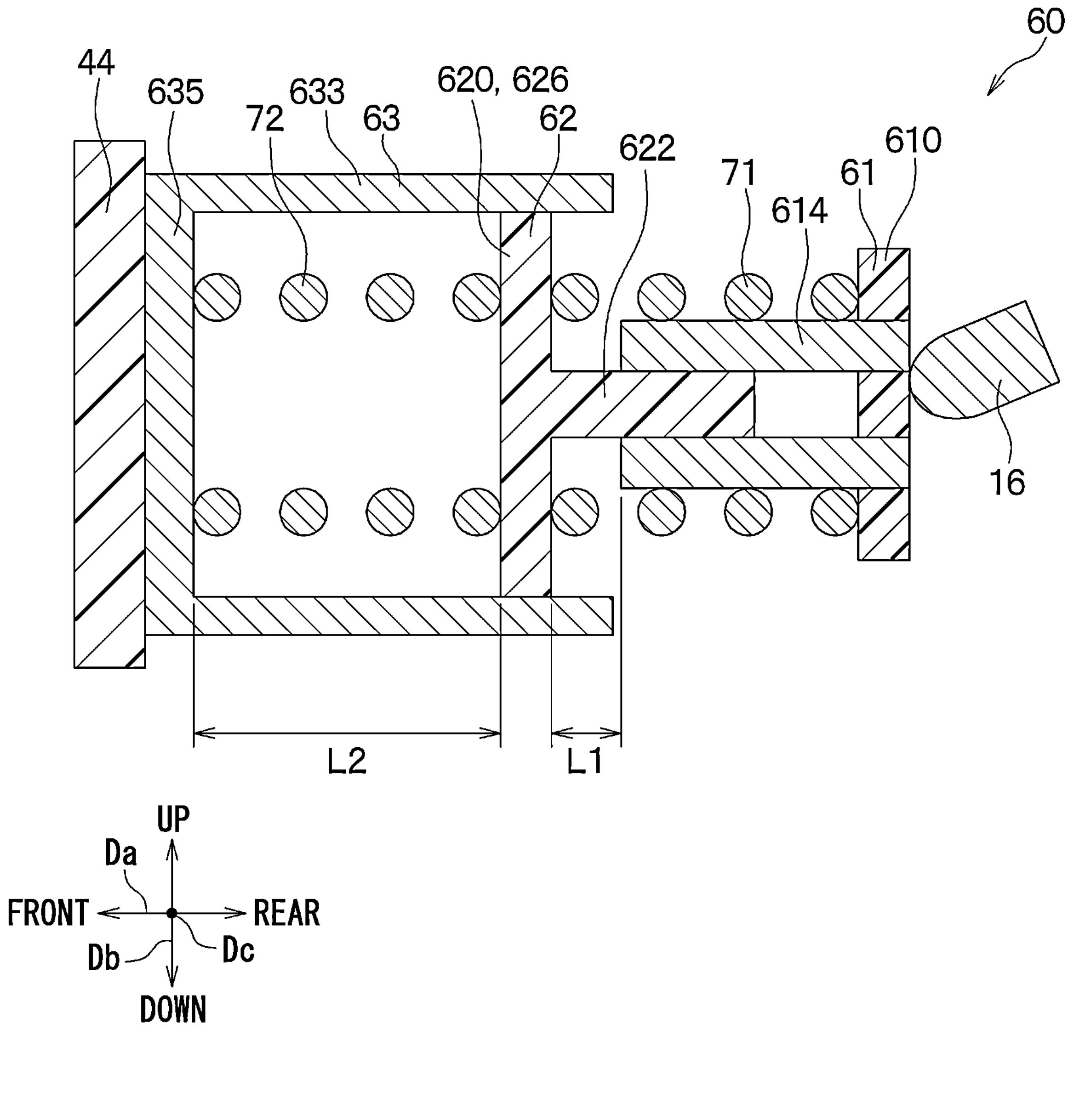
FIG. 26 is a sectional view of a reaction force generation mechanism of a pedal device according to an eighteenth embodiment.

In the eighteenth embodiment, as shown in FIG. 26, the shapes of the first guide 614, the second holder 62, and the guide member 63 are different from those in the seventeenth embodiment. Other than the above, the present embodiment is the same as the seventeenth embodiment.

A first guide 614 is made of metal instead of resin. Further, a second support 620 of a second holder 62, a second guide 622, and a third support 626 are made of resin instead of metal. Further, a third guide 633 and a guide member bottom 635 of the guide member 63 are made of metal instead of resin.

A pedal device 1 of the eighteenth embodiment is configured in a manner described above. The eighteenth embodiment also achieve the same effects as the seventeenth embodiment.

Nineteenth Embodiment

Figure 27:
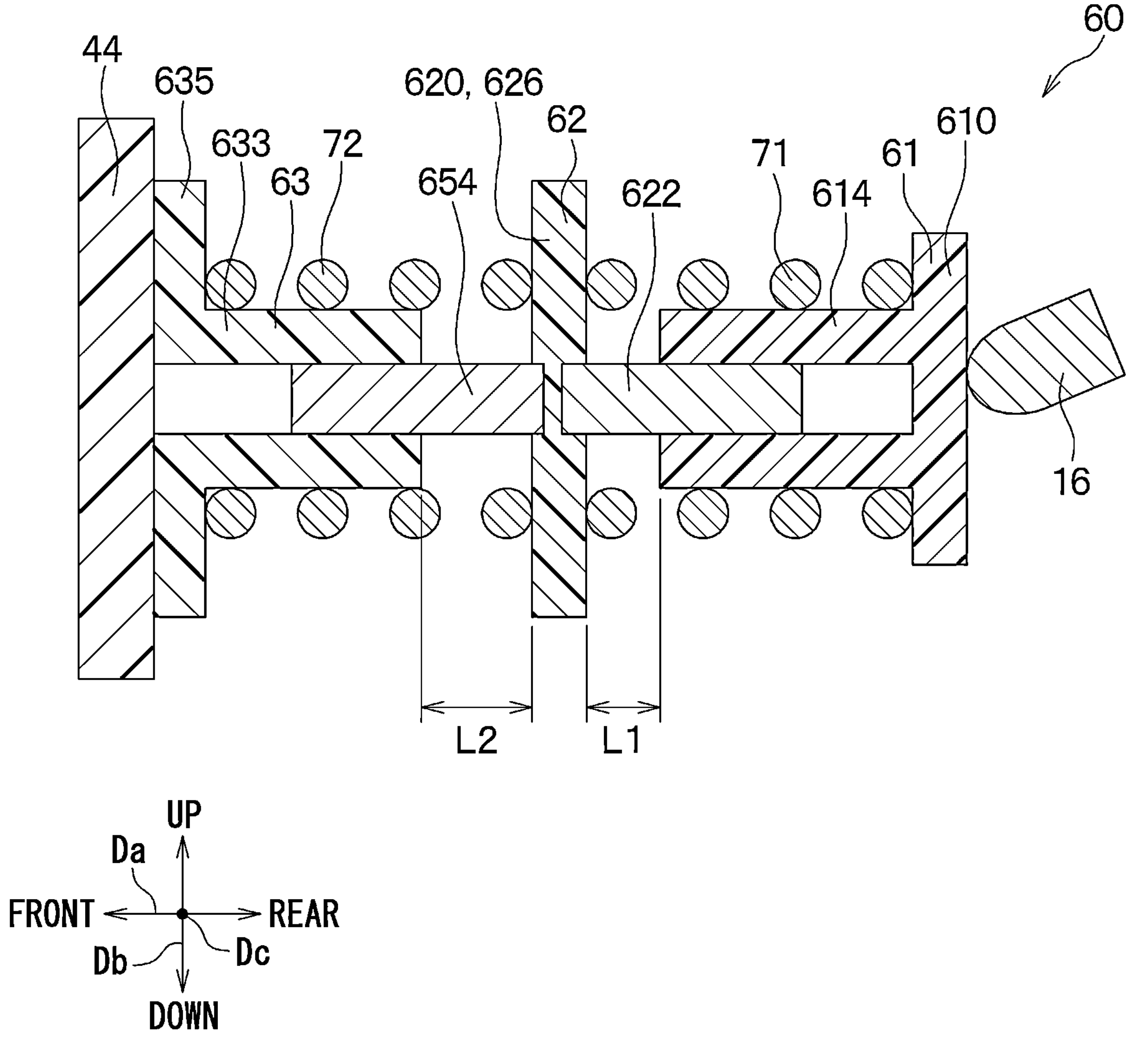
FIG. 27 is a sectional view of a reaction force generation mechanism of a pedal device according to a nineteenth embodiment.

In the nineteenth embodiment, as shown in FIG. 27, the shapes of the third guide 633 and the fourth guide 654 are different from those in the ninth embodiment. Other than the above, the nineteenth embodiment is the same as the ninth embodiment.

A third guide 633 is made of resin instead of metal. Further, the third guide 633 is formed in a cylindrical shape instead of having a columnar shape.

A fourth guide 654 is made of metal instead of resin. Further, the fourth guide 654 is formed in a columnar shape instead of having a cylindrical shape. Further, a part of the fourth guide 654 is inserted into a hole of the third guide 633. Thereby, movement of the third guide 633 and the fourth guide 654 in the vehicle vertical direction Db is mutually restricted with each other. Further, since the third guide 633 and the fourth guide 654 extend in the vehicle longitudinal direction Da, an inner surface of the third guide 633 and an outer surface of the fourth guide 654 slide with each other in the vehicle longitudinal direction Da.

A pedal device 1 of the nineteenth embodiment is configured in a manner described above. The nineteenth embodiment also achieves the same effects as the ninth embodiment.

Twentieth Embodiment

Figure 28:
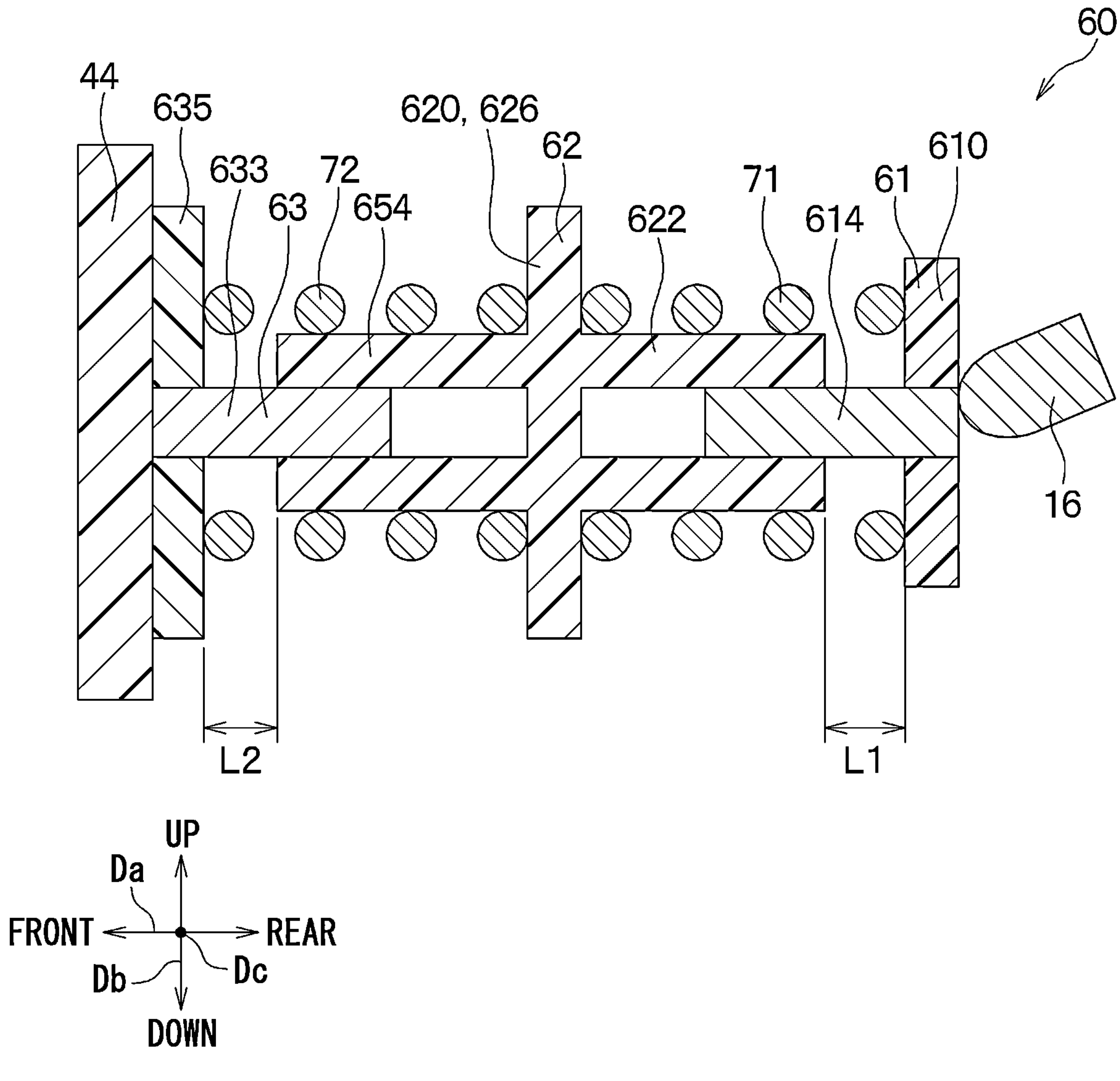
FIG. 28 is a sectional view of a reaction force generation mechanism of a pedal device according to a twentieth embodiment.

In the twentieth embodiment, as shown in FIG. 28, the forms of the first guide 614 and the second guide 622 are different from the ninth embodiment. Other than the above, the twentieth embodiment is the same as the ninth embodiment.

A first guide 614 is made of metal instead of resin. Further, the first guide 614 is formed in a columnar shape instead of having a cylindrical shape.

A second guide 622 is made of resin instead of metal. Further, the second guide 622 is formed in a cylindrical shape instead of having a columnar shape. Further, a part of the first guide 614 is inserted into a hole of the second guide 622. Thereby, movement of the first guide 614 and the second guide 622 in the vehicle vertical direction Db is mutually restricted with each other. Further, since the first guide 614 and the second guide 622 extend in the vehicle longitudinal direction Da, an outer surface of the first guide 614 and an inner surface of the second guide 622 slide with each other in the vehicle longitudinal direction Da.

A pedal device 1 of the twentieth embodiment is configured in a manner described above. The twentieth embodiment also achieves the same effects as the ninth embodiment.

Twenty-First Embodiment

Figure 29:
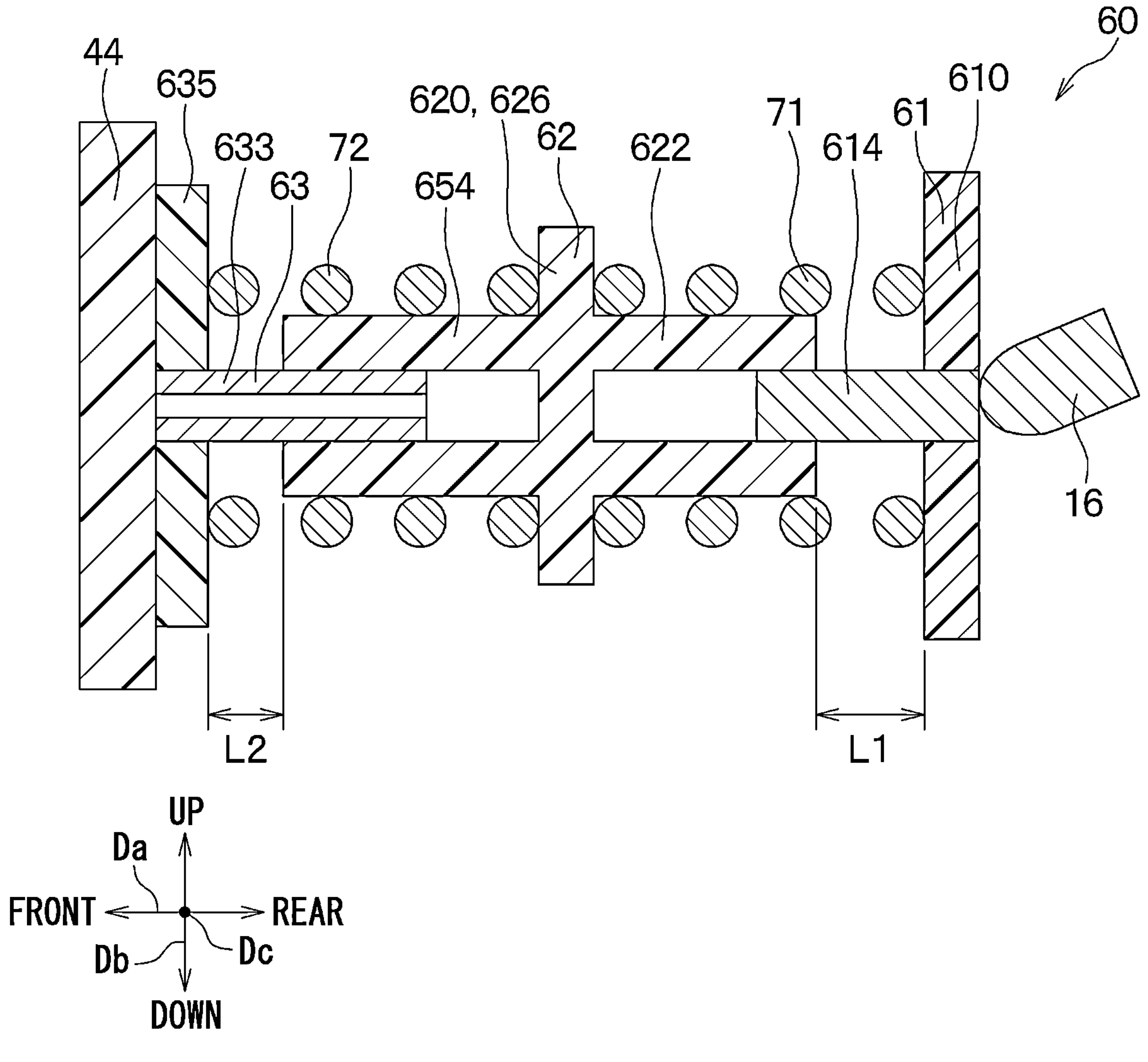
FIG. 29 is a sectional view of a reaction force generation mechanism of a pedal device according to a twenty-first embodiment.

In the twenty-first embodiment, as shown in FIG. 29, the shapes of the first guide 614, the second guide 622, and the third guide 633 are different from those in the twelfth embodiment. Other than the above, the present embodiment is the same as the twelfth embodiment.

A first guide 614 is made of metal instead of resin. Further, the first guide 614 is formed in a columnar shape instead of having a cylindrical shape.

A second guide 622 is arranged inside a first elastic member 71. Further, a part of the first guide 614 is inserted into a hole of the second guide 622. Thereby, movement of the first guide 614 and the second guide 622 in the vehicle vertical direction Db is mutually restricted with each other. Further, since the first guide 614 and the second guide 622 extend in the vehicle longitudinal direction Da, an outer surface of the first guide 614 and an inner surface of the second guide 622 slide with each other in the vehicle longitudinal direction Da.

A third guide 633 is formed in a cylindrical shape instead of having a columnar shape. Further, a part of the third guide 633 is inserted into a hole of the fourth guide 654. A part of the fourth guide 654 may be inserted into a hole of the third guide 633.

Thereby, movement of the third guide 633 and the fourth guide 654 in the vehicle vertical direction Db is mutually restricted with each other. Further, since the third guide 633 and the fourth guide 654 extend in the vehicle longitudinal direction Da, an outer surface of the third guide 633 and an inner surface of the fourth guide 654 slide with each other in the vehicle longitudinal direction Da.

A pedal device 1 of the twenty-first embodiment is configured in a manner described above. The twenty-first embodiment also achieves the same effects as the twelfth embodiment.

Twenty-Second Embodiment

Figure 30:
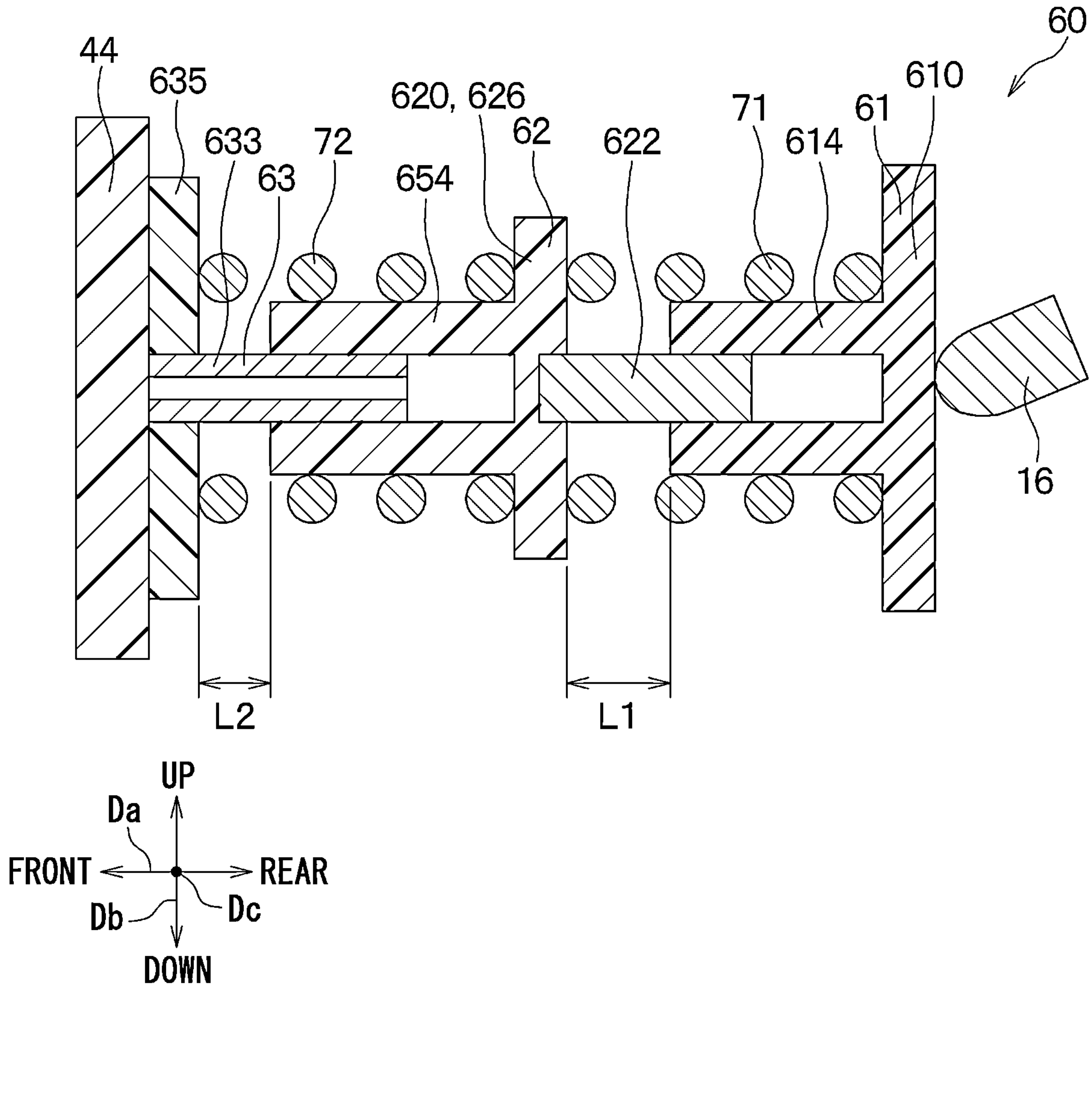
FIG. 30 is a sectional view of a reaction force generation mechanism of a pedal device according to a twenty-second embodiment.

In the twenty-second embodiment, as shown in FIG. 30, the shapes of the first guide 614 and the second guide 622 are different from those in the twenty-first embodiment. Other than the above, the twenty-second embodiment is the same as the twenty-first embodiment.

A first guide 614 is made of resin instead of metal. Further, the first guide 614 is formed in a cylindrical shape instead of having a columnar shape.

A second guide 622 is made of metal instead of resin. Further, the second guide 622 is formed in a columnar shape instead of having a cylindrical shape. Further, a part of the second guide 622 is inserted into a hole of the first guide 614. Thereby, movement of the first guide 614 and the second guide 622 in the vehicle vertical direction Db is mutually restricted with each other. Further, since the first guide 614 and the second guide 622 extend in the vehicle longitudinal direction Da, an inner surface of the first guide 614 and an outer surface of the second guide 622 slide with each other in the vehicle longitudinal direction Da.

A pedal device 1 of the twenty-second embodiment is configured in a manner described above. The twenty-second embodiment also achieves the same effects as the twenty-first embodiment.

Twenty-Third Embodiment

Figure 31:
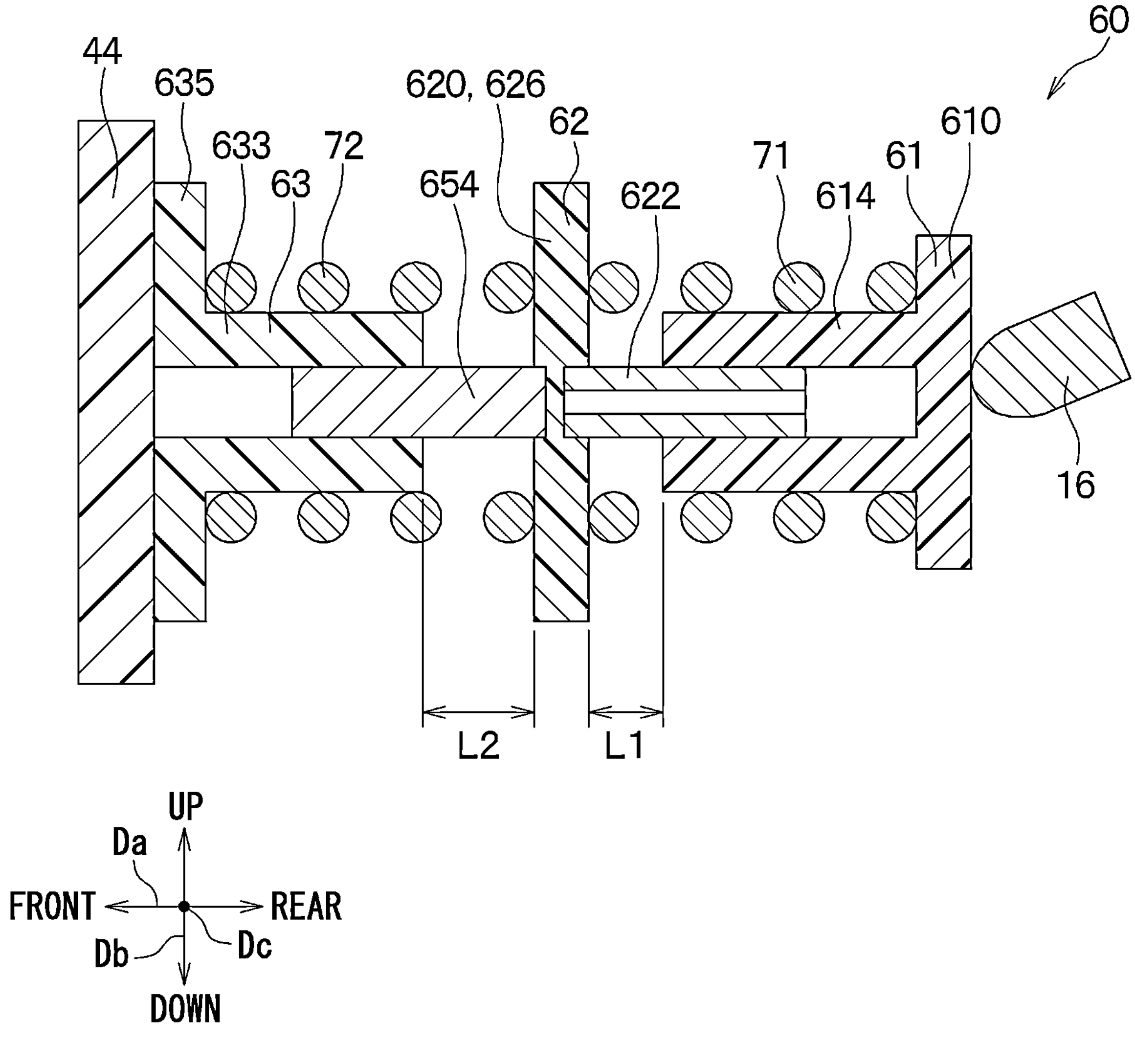
FIG. 31 is a sectional view of a reaction force generation mechanism of a pedal device according to a twenty-third embodiment.

In the twenty-third embodiment, as shown in FIG. 31, the shapes of the first guide 614, the second guide 622, the third guide 633, and the fourth guide 654 are different from the twelfth embodiment. Other than the above, the present embodiment is the same as the twelfth embodiment.

A first guide 614 and a second guide 622 are arranged inside a first elastic member 71.

A third guide 633 is made of resin instead of metal. Further, the third guide 633 is formed in a cylindrical shape instead of having a columnar shape.

A fourth guide 654 is made of metal instead of resin. Further, the fourth guide 654 is formed in a columnar shape instead of having a cylindrical shape. Further, a part of the fourth guide 654 is inserted into a hole of the third guide 633. Thereby, movement of the third guide 633 and the fourth guide 654 in the vehicle vertical direction Db is mutually restricted with each other. Further, since the third guide 633 and the fourth guide 654 extend in the vehicle longitudinal direction Da, an inner surface of the third guide 633 and an outer surface of the fourth guide 654 slide with each other in the vehicle longitudinal direction Da.

A pedal device 1 of the twenty-third embodiment is configured in a manner described above. The twenty-third embodiment also achieves the same effects as the twelfth embodiment.

Twenty-Fourth Embodiment

Figure 32:
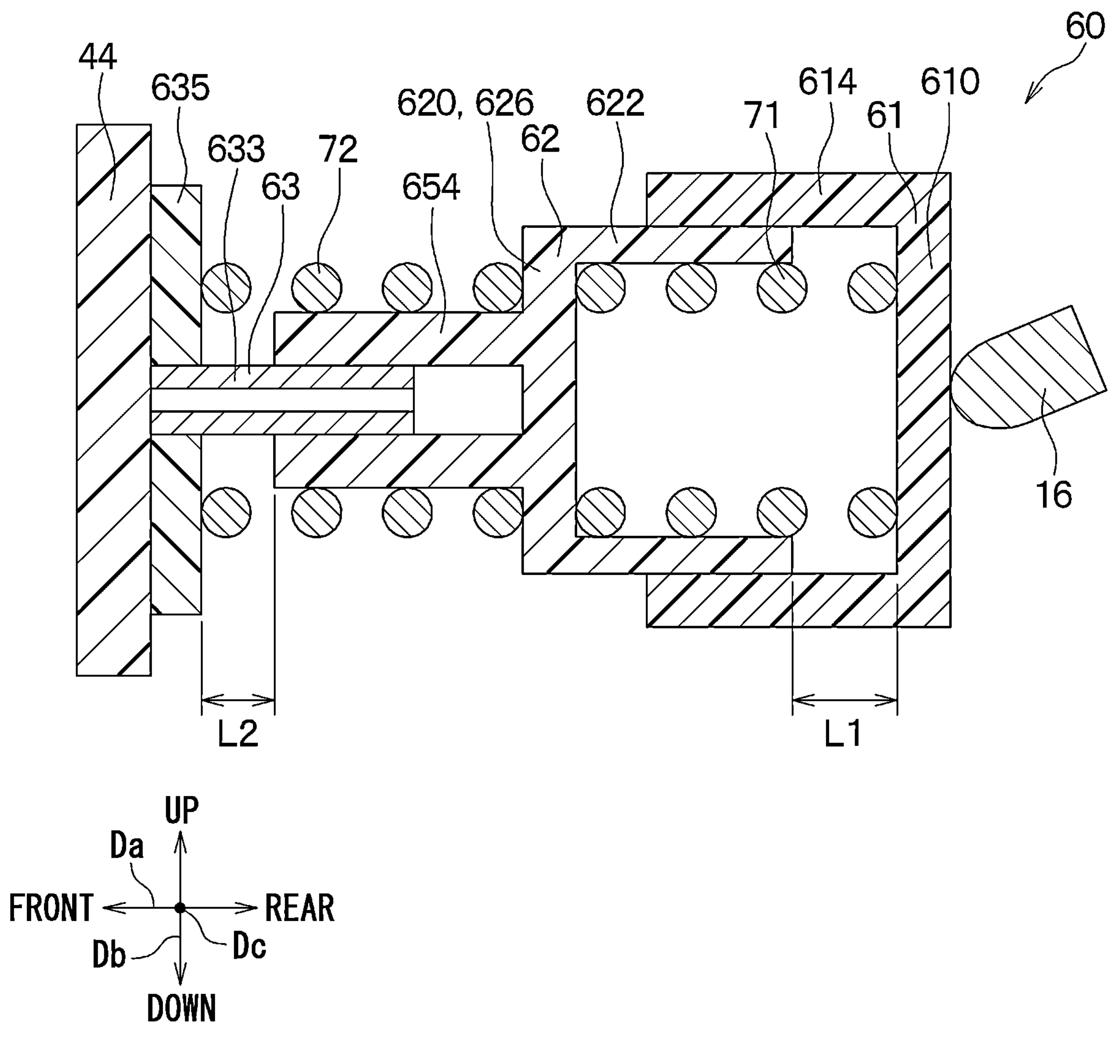
FIG. 32 is a sectional view of a reaction force generation mechanism of a pedal device according to a twenty-fourth embodiment.

In the twenty-fourth embodiment, as shown in FIG. 32, the form of the third guide 633 is different from that in the twelfth embodiment. Other than the above, the present embodiment is the same as the twelfth embodiment.

A third guide 633 is formed in a cylindrical shape instead of having a columnar shape. Further, a part of the third guide 633 is inserted into a hole of the fourth guide 654. A part of the fourth guide 654 may be inserted into a hole of the third guide 633.

A pedal device 1 of the twenty-fourth embodiment is configured in a manner described above. The twenty-fourth embodiment also achieves the same effects as the twelfth embodiment.

Twenty-Fifth Embodiment

Figure 33:
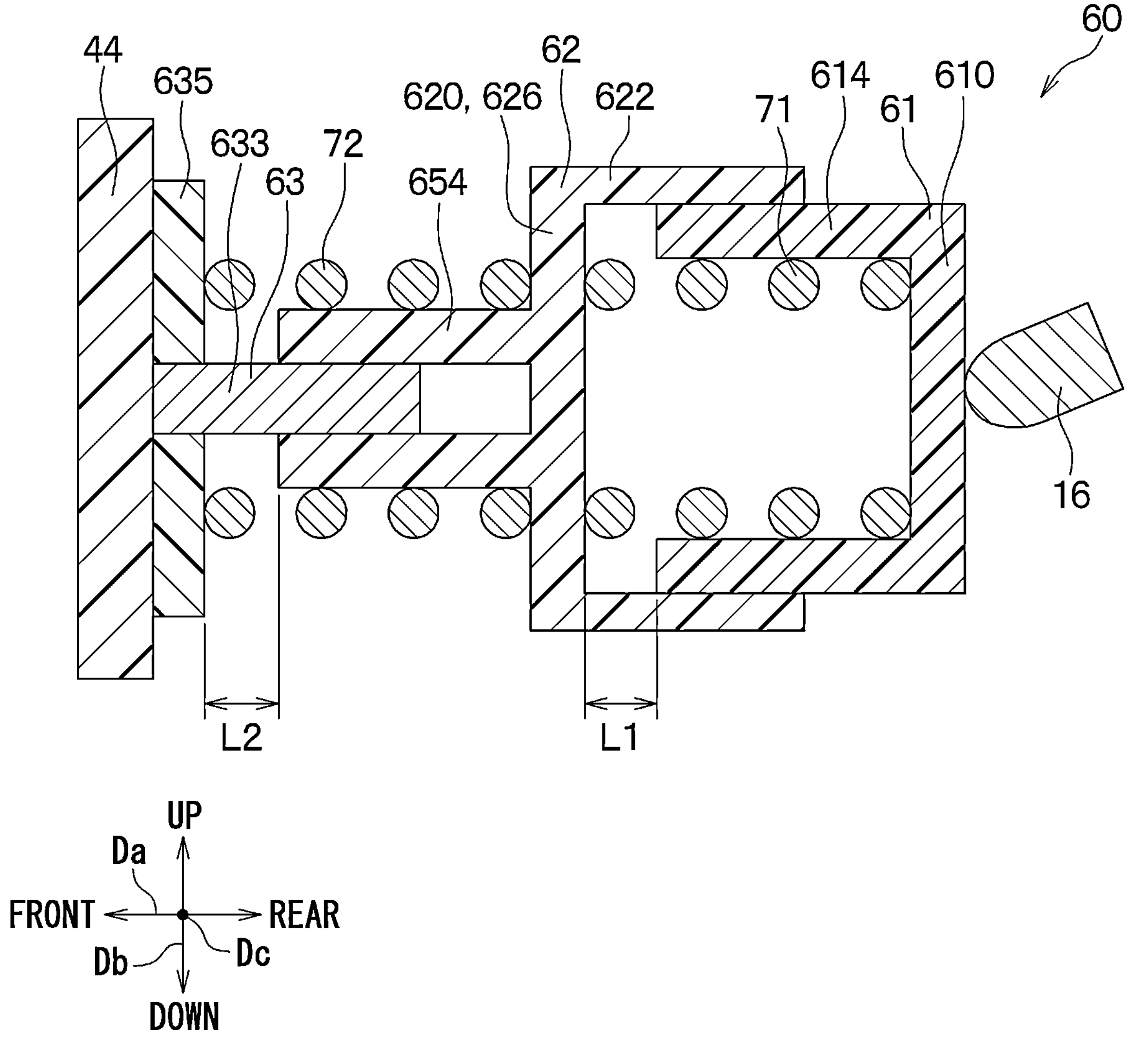
FIG. 33 is a sectional view of a reaction force generation mechanism of a pedal device according to a twenty-fifth embodiment.

In the twenty-fifth embodiment, as shown in FIG. 33, the shapes of the first guide 614 and the second guide 622 are different from those in the twelfth embodiment. Other than the above, the present embodiment is the same as the twelfth embodiment.

Instead of a part of a second guide 622 being inserted into a hole of a first guide 614, a part of the first guide 614 is inserted into a hole of the second guide 622. Thereby, movement of the first guide 614 and the second guide 622 in the vehicle vertical direction Db is mutually restricted with each other. Further, since the first guide 614 and the second guide 622 extend in the vehicle longitudinal direction Da, an outer surface of the first guide 614 and an inner surface of the second guide 622 slide with each other in the vehicle longitudinal direction Da.

A pedal device 1 of the twenty-fifth embodiment is configured in a manner described above. The twenty-fifth embodiment also achieves the same effects as the twelfth embodiment.

(Twenty-sixth Embodiment)

Figure 34:
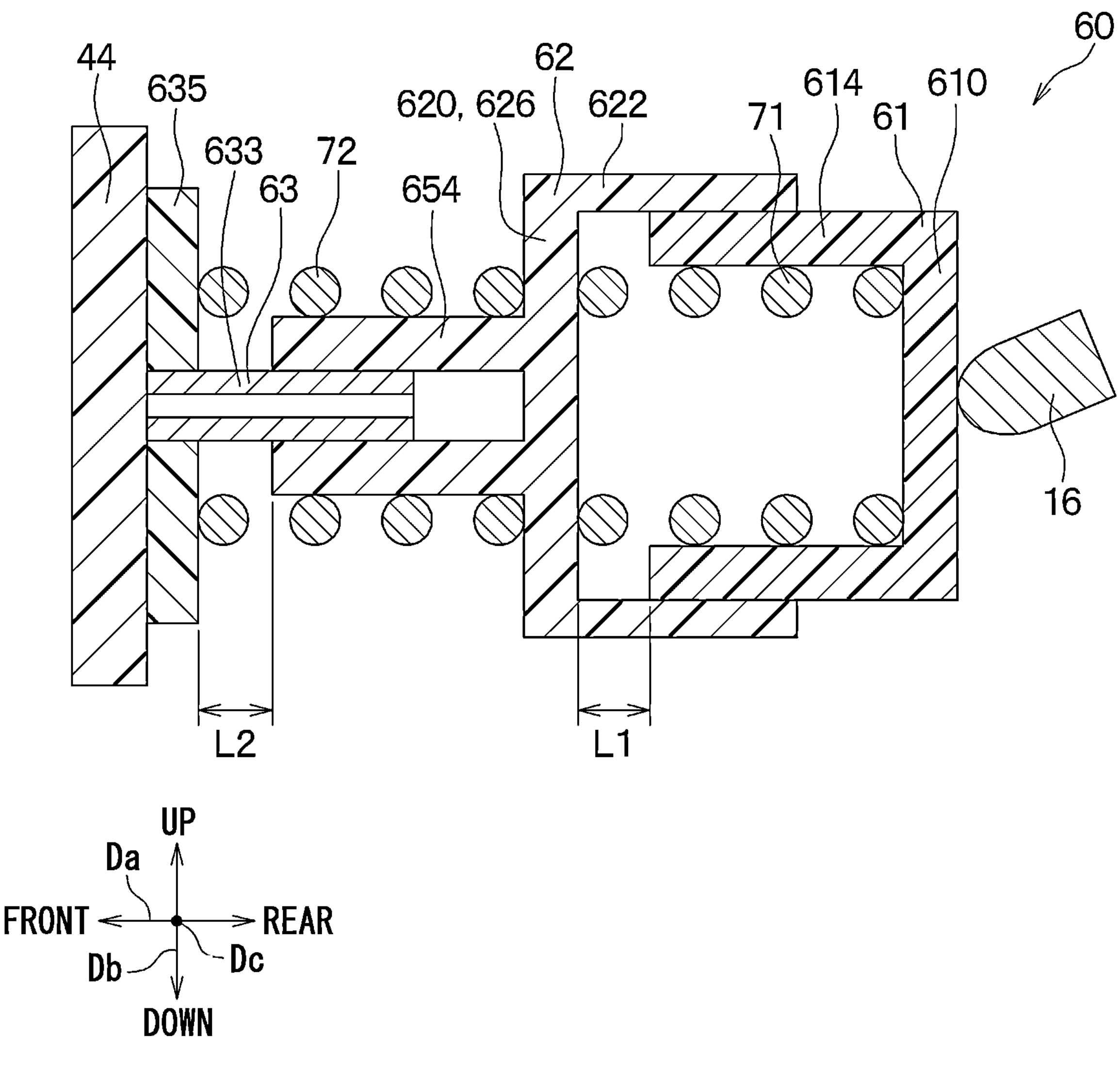
FIG. 34 is a sectional view of a reaction force generation mechanism of a pedal device according to a twenty-sixth embodiment.

In the twenty-sixth embodiment, as shown in FIG. 34, the shapes of the first guide 614 and the second guide 622 are different from those in the twenty-fourth embodiment. Other than the above, the second embodiment is the same as the twenty-fourth embodiment.

Instead of a part of a second guide 622 being inserted into a hole of a first guide 614, a part of the first guide 614 is inserted into a hole of the second guide 622. Thereby, movement of the first guide 614 and the second guide 622 in the vehicle vertical direction Db is mutually restricted with each other. Further, since the first guide 614 and the second guide 622 extend in the vehicle longitudinal direction Da, an outer surface of the first guide 614 and an inner surface of the second guide 622 slide with each other in the vehicle longitudinal direction Da.

A pedal device 1 of the twenty-sixth embodiment is configured in a manner described above. The twenty-sixth embodiment also achieves the same effects as the twenty-fourth embodiment.

Twenty-Seventh Embodiment

Figure 35:
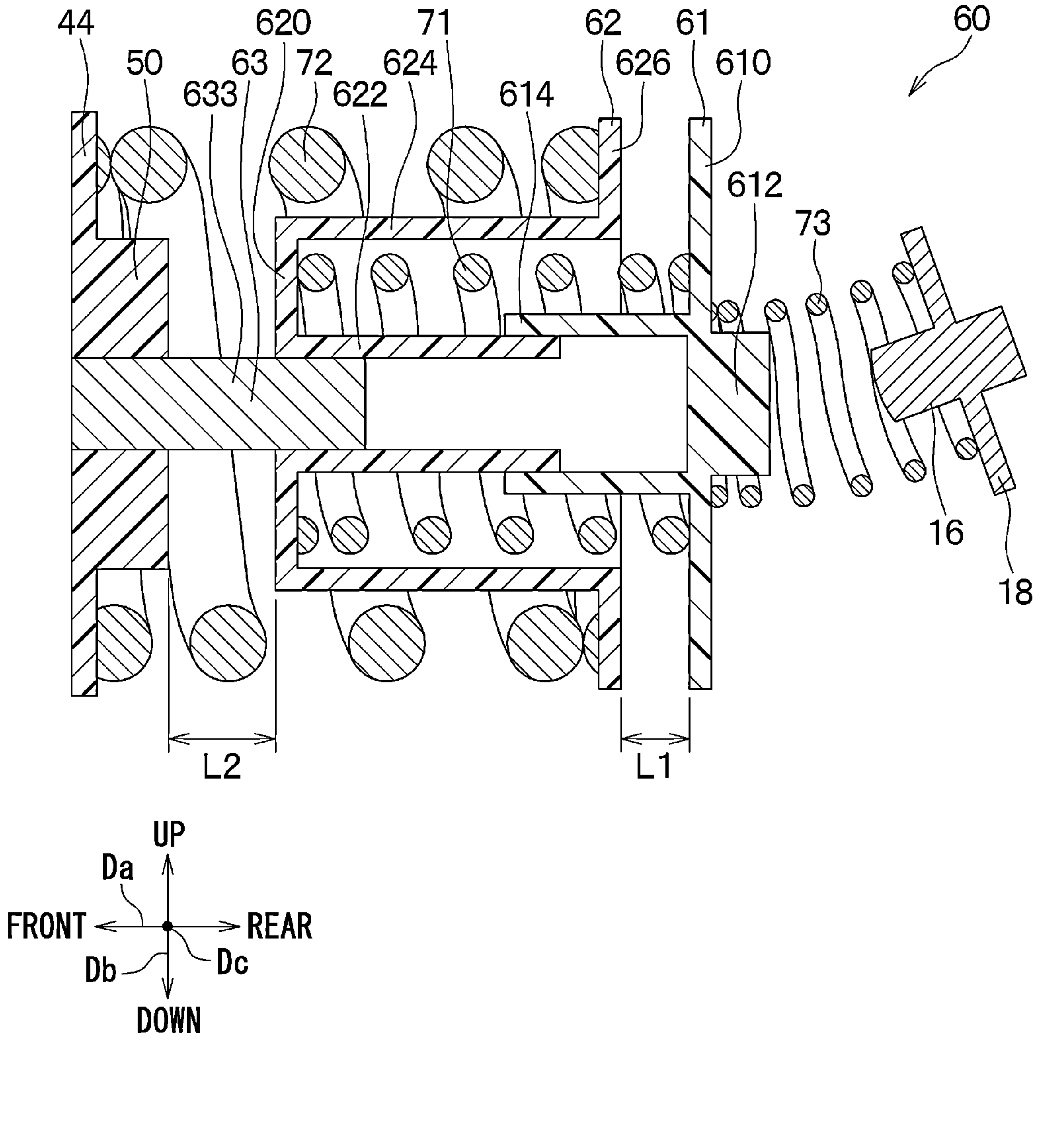
FIG. 35 is a sectional view of a reaction force generation mechanism of a pedal device according to a twenty-seventh embodiment.

In the twenty-seventh embodiment, as shown in FIG. 35, the shapes of the first guide 614, the second guide 622, and the third guide 633 are different from those in the first embodiment. The other configurations are the same as those of the first embodiment.

Here, assuming that a sliding portion between a first guide 614 and a second guide 622 is projected toward a sliding portion between the second guide 622 and a third guide 633 in the vehicle vertical direction Db. At such time, in the first embodiment, the sliding portion between the first guide 614 and the second guide 622 projected in the vehicle vertical direction Db overlaps the sliding portion between the second guide 622 and the third guide 633. Further, (a) when a pedal part 12 is not stepped on by the driver or (b) even when the pedal part 12 is stepped on by the driver, the projected sliding portion between the first guide 614 and the second guide 622 overlaps the sliding portion between the second guide 622 and the third guide 633. The sliding portion between the first guide 614 and the second guide 622 corresponds to a contact portion between the first guide 614 and the second guide 622. Further, the sliding portion between the second guide 622 and the third guide 633 corresponds to a contact portion between the second guide 622 and the third guide 633.

On the other hand, in the twenty-seventh embodiment, a sliding portion between the first guide 614 and the second guide 622 projected in the vehicle vertical direction Db does not overlap a sliding portion between the second guide 622 and the third guide 633. Further, (a) when the pedal part 12 is not stepped on by the driver or (b) even when the pedal part 12 is stepped on by the driver, the projected sliding portion between the first guide 614 and the second guide 622 does not overlap the sliding portion between the second guide 622 and the third guide 633.

A pedal device 1 of the twenty-seventh embodiment is configured in a manner described above. The twenty-seventh embodiment also achieves the same effects as the first embodiment. Further, the twenty-seventh embodiment also achieves the effects described below.

[3] Also, here, assuming that the sliding portion between the first guide 614 and the second guide 622 projected in the vehicle vertical direction Db overlaps the sliding portion between the second guide 622 and the third guide 633. At such time, assuming further that the sliding portion of the second guide 622 is deformed due to (a) a force from outside of the pedal device 1 or (b) the environment in which the pedal device 1 is used, which has caused water absorption, expansion, contraction, and the like of the second guide 622, thereby changing dimensions of the sliding portion of the second guide 622. In such a situation, it may be a case that the sliding portion between the inner surface of the first guide 614 and the outer surface of the second guide 622 is deformed, and the sliding portion between the inner surface of the second guide 622 and the outer surface of the third guide 633 is deformed. Therefore, the inner surface of the first guide 614 and the outer surface of the second guide 622 do not slide in the vehicle longitudinal direction Da, and the inner surface of the second guide 622 and the outer surface of the third guide 633 do not slide in the vehicle longitudinal direction Da.

On the other hand, in the twenty-seventh embodiment, the sliding portion between the first guide 614 and the second guide 622 projected in the vehicle vertical direction Db does not overlap the sliding portion between the second guide 622 and the third guide 633, but separates therefrom.

Thereby, even when the sliding portion between the inner surface of the first guide 614 and the outer surface of the second guide 622 is deformed due to the force, water absorption, expansion, contraction, or the like, deformation of the sliding portion between the inner surface of the second guide 622 and the outer surface of the guide 633 can be suppressed. Further, even when the sliding portion between the inner surface of the second guide 622 and the outer surface of the third guide 633 is deformed due to the force, water absorption, expansion, contraction, or the like, deformation of the sliding portion between the inner surface of the first guide 614 and the outer surface of the second guide 622 can be suppressed. Therefore, even when one of the two sliding portions is fixed, the other sliding portion slides. Therefore, non-transmission of the restoring forces of the first elastic member 71 and the second elastic member 72 to the pedal 10 can be suppressed. Therefore, no returning of the pedal 10 to its original position can be suppressed.

Twenty-Eighth Embodiment

Figure 36:
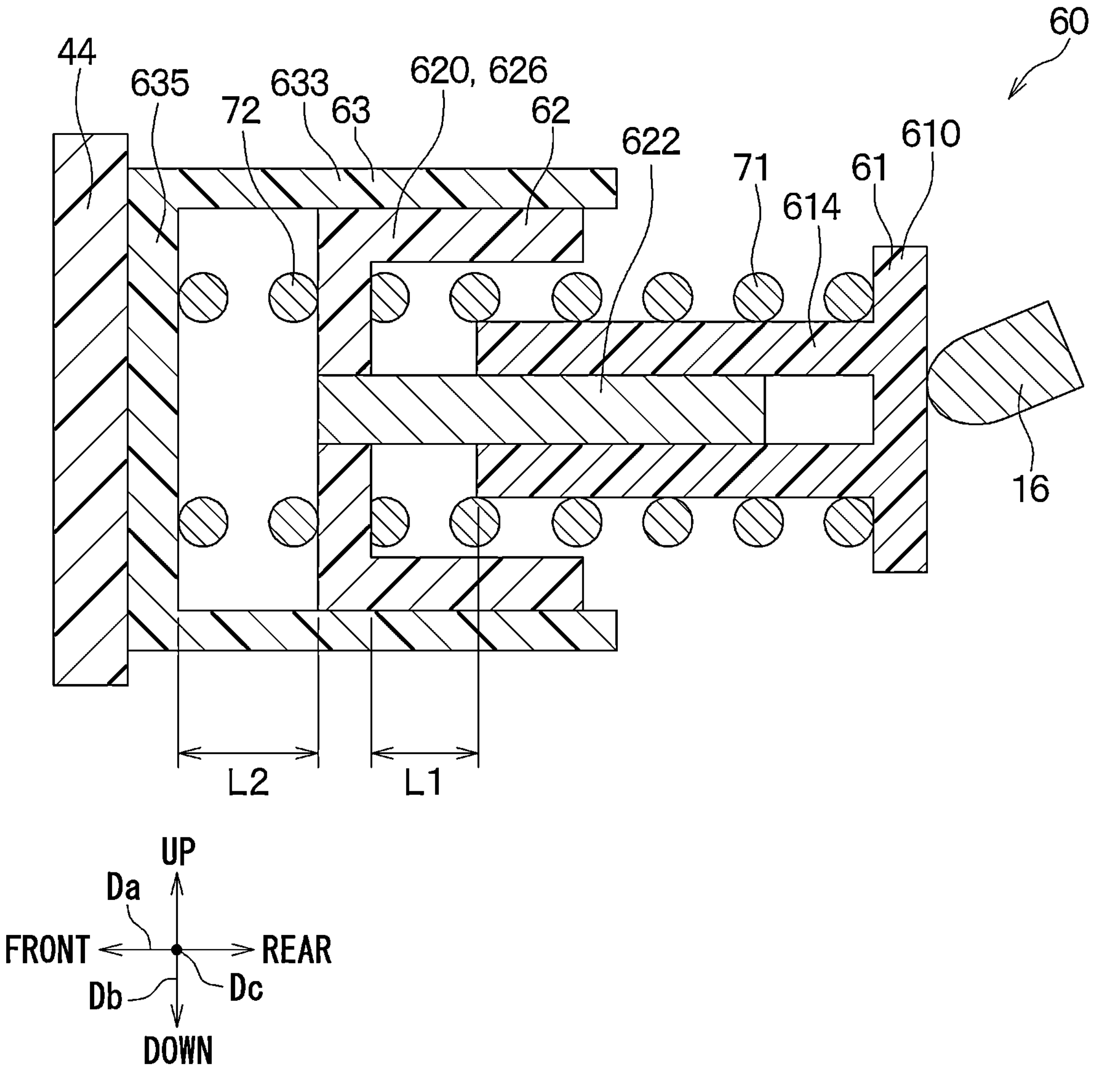
FIG. 36 is a sectional view of a reaction force generation mechanism of a pedal device according to a twenty-eighth embodiment.

In the twenty-eighth embodiment, as shown in FIG. 36, the second support 620, the third support 626, the first guide 614, the second guide 622, and the third guide 633 are different from those in the fifth embodiment. The other configuration other than the above is the same as that of the fifth embodiment.

A second support 620 and a third support 626 are integrated to have one body, and have a bottom and a side part. The bottom of the second support 620 and the third support 626 is formed in a plate shape extending in the vehicle vertical direction Db. The side part of the second support 620 and the third support 626 is formed in a cylindrical shape extending in the vehicle rear direction from the above-described bottom.

Here, assuming that a sliding portion between the first guide 614 and the second guide 622 is projected toward a sliding portion between (a) the second support 620 and the third support 626 and (b) the third guide 633 in the vehicle vertical direction Db. At such time, in the fifth embodiment, the sliding portion between the first guide 614 and the second guide 622 projected in the vehicle vertical direction Db does not overlap the sliding portion between (a) the second support 620 and the third support 626 and (b) the third guide 633. Further, when a pedal part 12 is not stepped on by the driver, the sliding portion between the first guide 614 and the second guide 622 projected in the vehicle vertical direction Db does not overlap the sliding portion between (a) the second support 620 and the third support 626 and (b) the third guide 633. Further, even when the pedal part 12 is stepped on by the driver, the sliding portion between the first guide 614 and the second guide 622 projected in the vehicle vertical direction Db does not overlap the sliding portion between (a) the second support 620 and the third support 626 and (b) the third guide 633. The sliding portion between (a) the second support 620 and the third support 626 and (b) the third guide 633 corresponds to a contact portion between (c) the second support 620 and the third support 626 and (d) the third guide 633.

On the other hand, in the twenty-eighth embodiment, the sliding portion between the first guide 614 and the second guide 622 projected in the vehicle vertical direction Db overlaps the sliding portion between (a) the second support 620 and the third support 626 and (b) the third guide 633. Further, when the pedal part 12 is not stepped on by the driver, the sliding portion between the first guide 614 and the second guide 622 projected in the vehicle vertical direction Db overlaps the sliding portion between (a) the second support 620 and the third support 626 and (b) the third guide 633. Further, even when the pedal part 12 is stepped on by the driver, the sliding portion between the first guide 614 and the second guide 622 projected in the vehicle vertical direction Db overlaps the sliding portion between (a) the second support 620 and the third support 626 and (b) the third guide 633.

A pedal device 1 of the twenty-eighth embodiment is configured in a manner described above. The twenty-eighth embodiment also achieves the same effects as the fifth embodiment. Further, the twenty-eighth embodiment also achieves the effects described below.

[4] Assuming that the sliding portion between the first guide 614 and the second guide 622 is projected in the vehicle vertical direction Db toward the sliding portion between (a) the second support 620 and the third support 626 and (b) the third guide 633. At such time, the sliding portion between the first guide 614 and the second guide 622 projected in the vehicle vertical direction Db overlaps the sliding portion between (a) the second support 620 and the third support 626 and (b) the third guide 633.

Thereby, compared to an above-described non-overlap case, in which the projected sliding portions between the first guide 614 and the second guide 622 does not overlap the sliding portion between (a) the second support 620 and the third support 626 and (b) the third guide 633, the volume of a reaction force generation mechanism 60 in the vehicle longitudinal direction Da can be reduced. Therefore, the increase in the volume of a pedal device 1 can be suppressed.

Twenty-Ninth Embodiment

Figure 37:
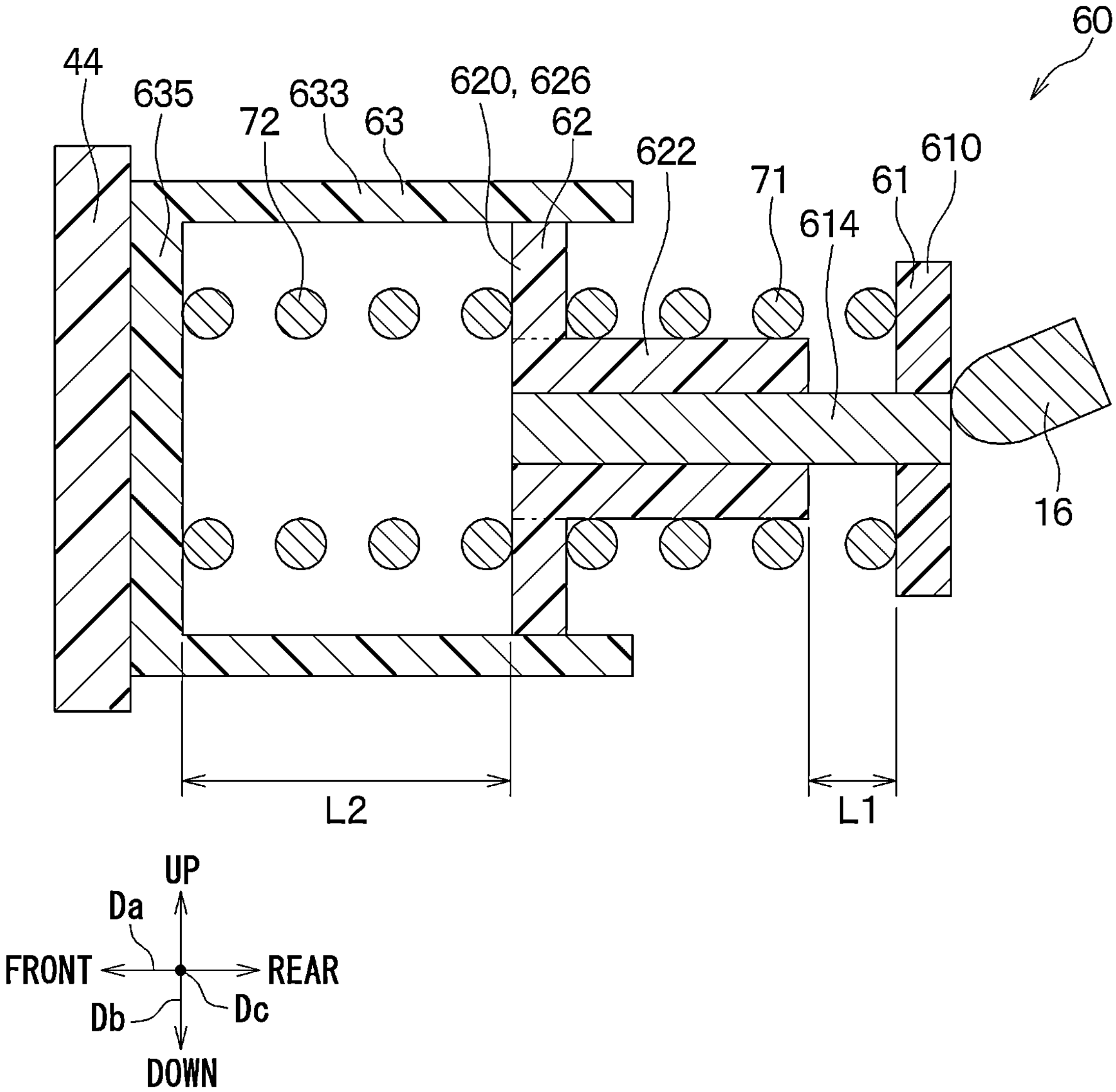
FIG. 37 is a sectional view of a reaction force generation mechanism of a pedal device according to a twenty-ninth embodiment.

In the twenty-ninth embodiment, as shown in FIG. 37, the shapes of the first guide 614 and the second guide 622 are different from those in the sixth embodiment. Other than the above, the present embodiment is the same as the sixth embodiment.

Here, assuming that a sliding portion between a first guide 614 and a second guide 622 is projected in the vehicle vertical direction Db toward a sliding portion between (a) a second support 620 and a third support 626 and (b) third guide 633. At such time, the sliding portion between the first guide 614 and the second guide 622 projected in the vehicle vertical direction Db overlaps the sliding portion between (a) the second support 620 and the third support 626 and (b) the third guide 633. Further, these sliding portions overlap (a) when a pedal part 12 is not stepped on by the driver or (b) even when the pedal part 12 is stepped on by the driver.

A pedal device 1 of the twenty-ninth embodiment is configured in a manner described above. The twenty-ninth embodiment also achieves the same effects as the sixth embodiment. Further, the twenty-ninth embodiment also achieves the effect described in the item [4] described above.

Thirtieth Embodiment

Figure 38:
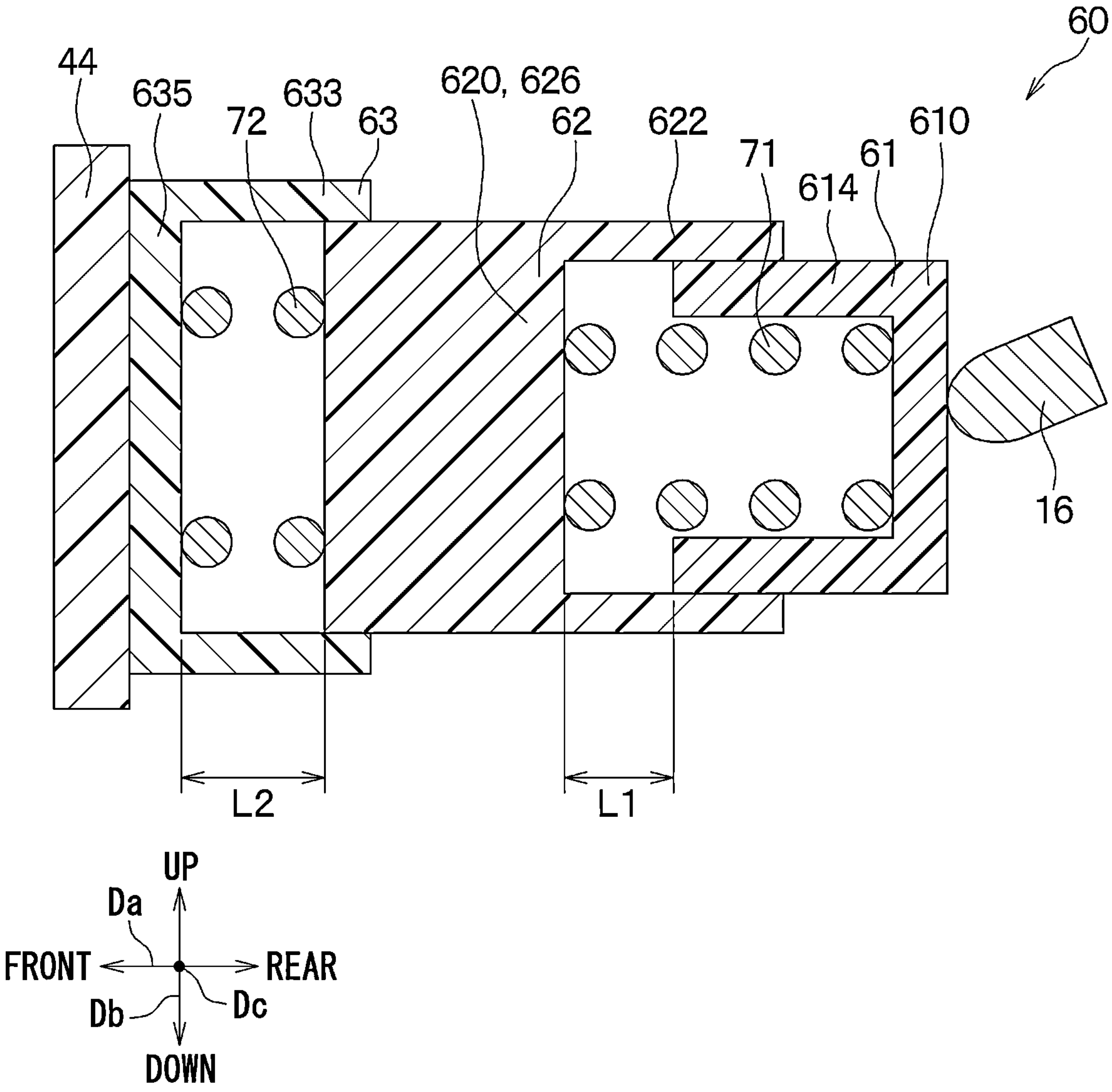
FIG. 38 is a sectional view of a reaction force generation mechanism of a pedal device according to a thirtieth embodiment.

In the thirtieth embodiment, as shown in FIG. 38, the forms of the second support 620, the third support 626, the first guide 614, the second guide 622, and the third guide 633 are different from those in the seventh embodiment. different. The other configuration is the same as that of the seventh embodiment.

Lengths of a second support 620 and a third support 626 in the vehicle longitudinal direction Da are longer than those of the seventh embodiment. Further, assuming that a sliding portion between a first guide 614 and a second guide 622 is projected in the vehicle vertical direction Db toward a sliding portion between (a) the second support 620 and the third support 626 and (b) the third guide 633. At such time, the sliding portion between the first guide 614 and the second guide 622 projected in the vehicle vertical direction Db does not overlap the sliding portion between (a) the second support 620 and the third support 626 and (b) the third guide 633. Further, when a pedal part 12 is not stepped on by the driver or even when the pedal part 12 is stepped on by the driver, these sliding portions do not overlap.

A pedal device 1 of the thirtieth embodiment is configured in a manner described above. The thirtieth embodiment also achieves the same effects as the seventh embodiment. Further, the thirtieth embodiment also achieves the effects described in the item [3] described above.

Thirty-First Embodiment

Figure 39:
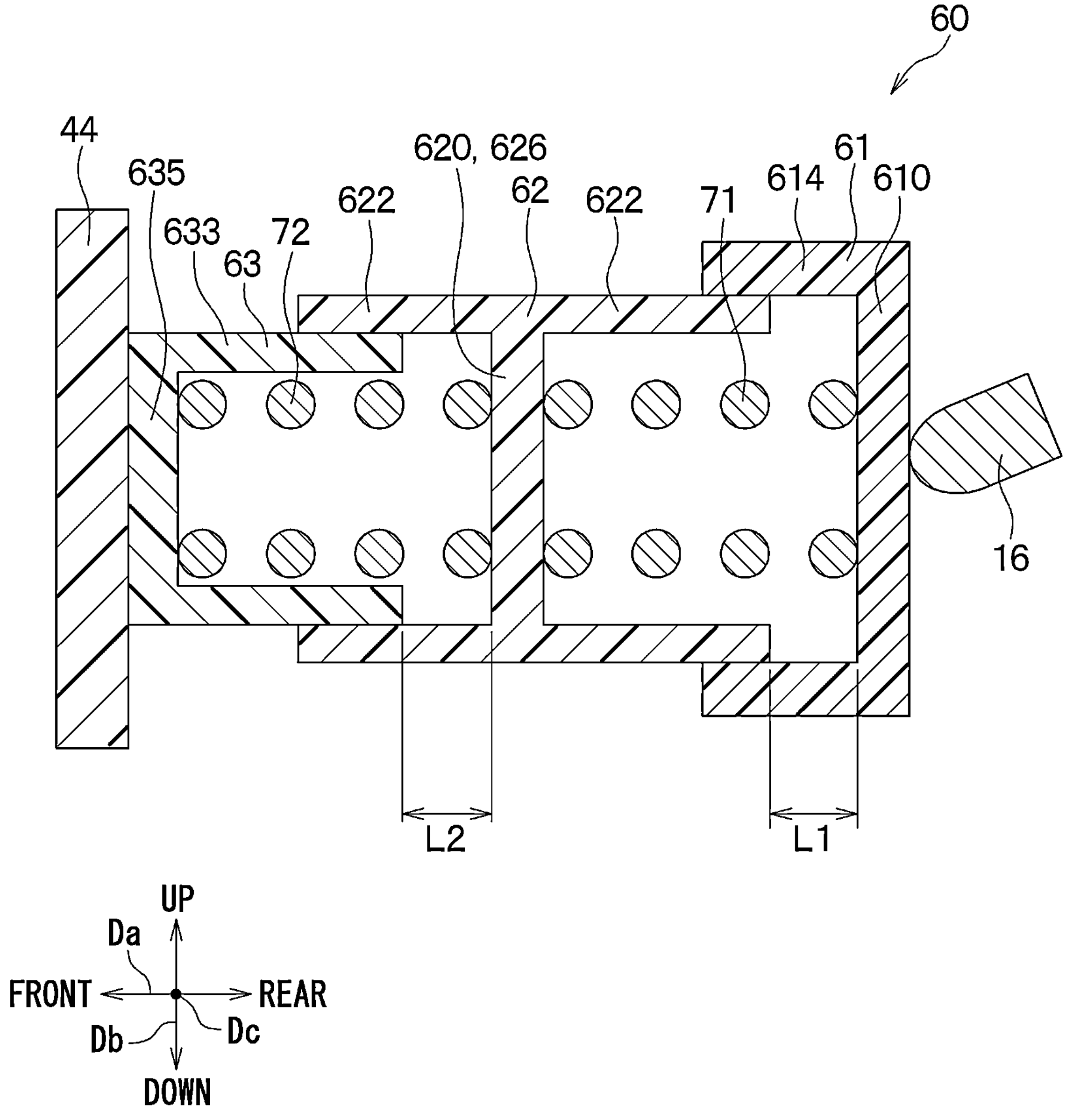
FIG. 39 is a sectional view of a reaction force generation mechanism of a pedal device according to a thirty-first embodiment.

In the thirty-first embodiment, as shown in FIG. 39, the shapes of the first guide 614, the second guide 622, and the third guide 633 are different from those in the eighth embodiment. The other configuration is the same as that of the eighth embodiment.

A length of a first guide 614 in the vehicle longitudinal direction Da is shorter than that in the eighth embodiment. Further, a length of a second guide 622 in the vehicle longitudinal direction Da is longer than that of the eighth embodiment. Also, it is assumed that a sliding portion between the first guide 614 and the second guide 622 is projected in the vehicle vertical direction Db toward a sliding portion between the second guide 622 and a third guide 633. At such time, the sliding portion between the first guide 614 and the second guide 622 projected in the vehicle vertical direction Db does not overlap the sliding portion between the second guide 622 and the third guide 633.

Further, when a pedal part 12 is not stepped on by the driver or even when the pedal part 12 is stepped on by the driver, these sliding portions do not overlap.

A pedal device 1 of the thirty-first embodiment is configured in a manner described above. The thirty-first embodiment also achieves the same effects as the eighth embodiment. Further, the thirty-first embodiment also achieves the effects in the item [3] described above.

Thirty-Second Embodiment

Figure 40:
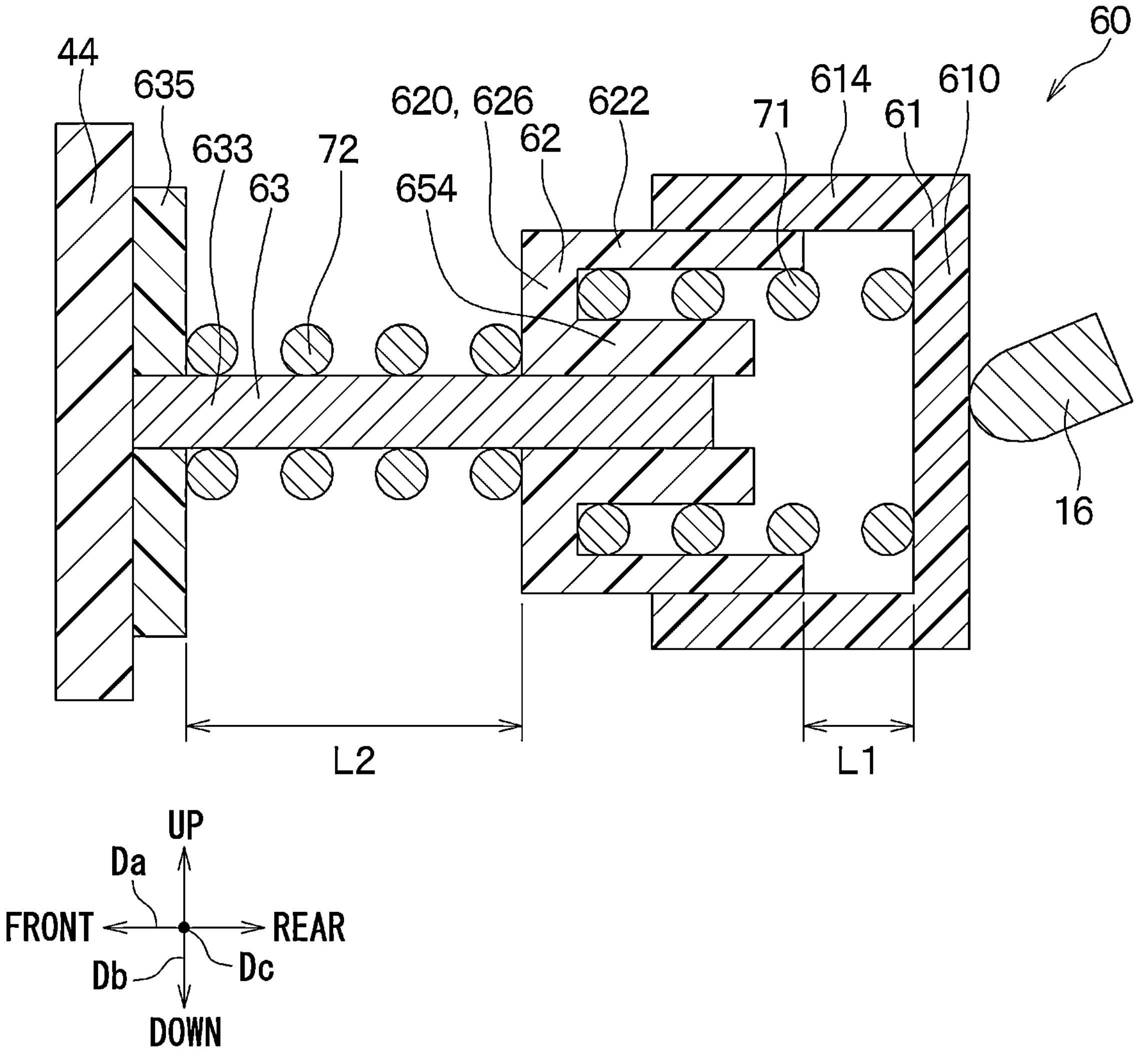
FIG. 40 is a sectional view of a reaction force generation mechanism of a pedal device according to a thirty-second embodiment.

In the thirty-second embodiment, as shown in FIG. 40, the shapes of the first guide 614, the second guide 622, the third guide 633, and the fourth guide 654 are different from the twelfth embodiment. Other than the above, the present embodiment is the same as the twelfth embodiment.

A fourth guide 654, instead of extending from a boundary with a second support 620 and a third support 626 in the vehicle front direction, extends from the boundary with the second support 620 and the third support 626 in the vehicle rear direction. Also, it is assumed that a sliding portion between a first guide 614 and a second guide 622 is projected in the vehicle vertical direction Db toward a sliding portion between the fourth guide 654 and a third guide 633. At such time, the sliding portion between the first guide 614 and the second guide 622 projected in the vehicle vertical direction Db overlaps the sliding portion between the fourth guide 654 and the third guide 633. Further, when a pedal part 12 is not stepped on by the driver or even when the pedal part 12 is stepped on by the driver, the projected sliding portion between the first guide 614 and the second guide 622 overlaps the sliding portion between the fourth guide 654 and the third guide 633. The sliding portion between the fourth guide 654 and the third guide 633 corresponds to a contact portion between the fourth guide 654 and the third guide 633.

A pedal device 1 of the thirty-second embodiment is configured in a manner described above. The thirty-second embodiment also achieves the same effects as the twelfth embodiment. Further, the thirty-second embodiment also achieves the effect in the item [4] described above.

Thirty-Third Embodiment

Figure 41:
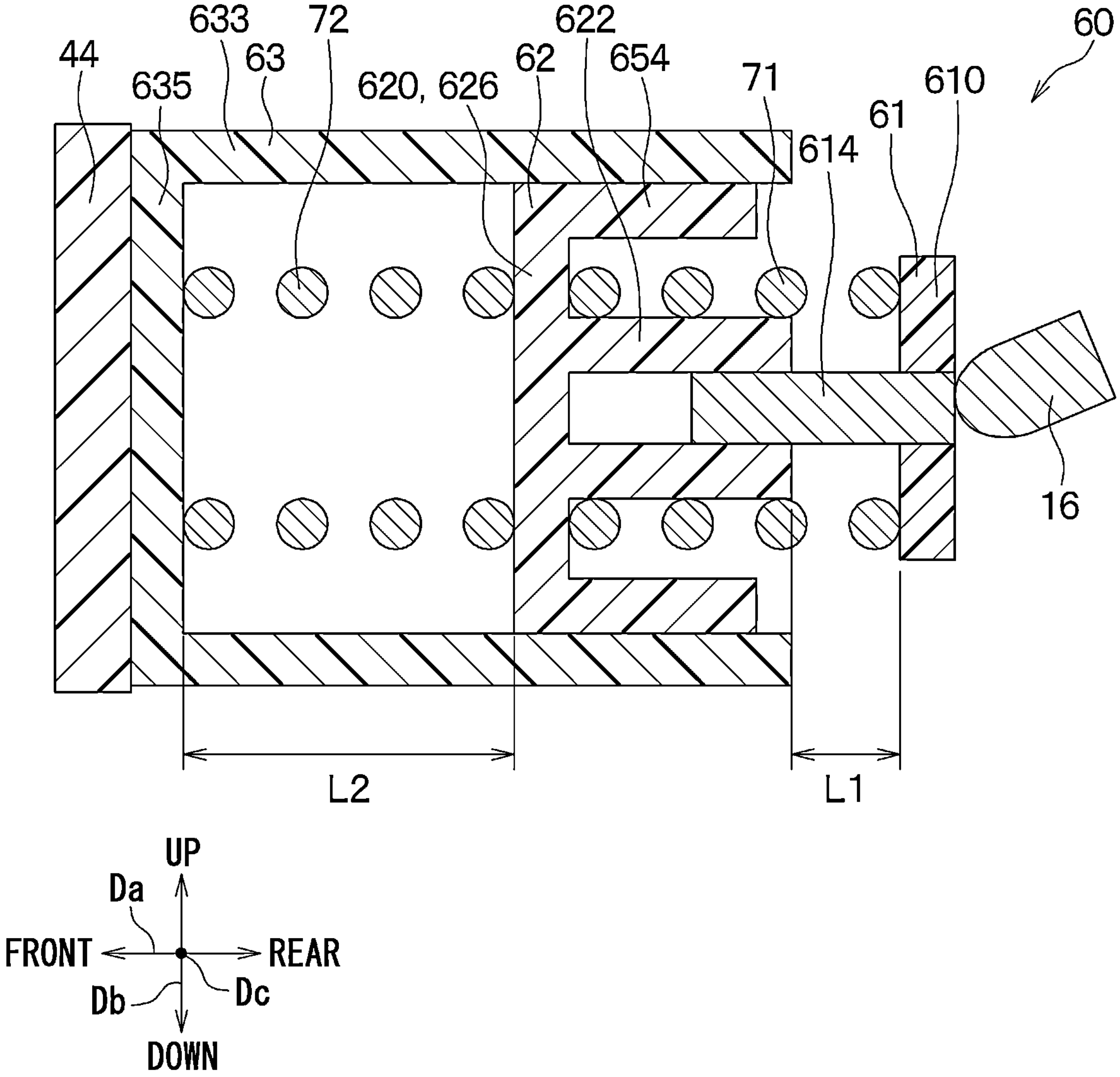
FIG. 41 is a sectional view of a reaction force generation mechanism of a pedal device according to a thirty-third embodiment.

In the thirty-third embodiment, as shown in FIG. 41, the shapes of the first guide 614, the second guide 622, the third guide 633, and the fourth guide 654 are different from those in the twenty-first embodiment. Other than the above, the thirty-third embodiment is the same as the twenty-first embodiment.

A fourth guide 654, instead of extending from a boundary with a second support 620 and a third support 626 in the vehicle front direction, extends from the boundary with the second support 620 and the third support 626 in the vehicle rear direction. Further, instead of an outer surface of a third guide 633 and an inner surface of the fourth guide 654 sliding with each other in the vehicle longitudinal direction Da, an inner surface of the third guide 633 and an outer surface of the fourth guide 654 slide with each other. Further, assuming that a sliding portion between a first guide 614 and a second guide 622 is projected in the vehicle vertical direction Db toward a sliding portion between the fourth guide 654 and the third guide 633. At such time, the sliding portion between the first guide 614 and the second guide 622 projected in the vehicle vertical direction Db overlaps the sliding portion between the fourth guide 654 and the third guide 633. Further, these sliding portions overlap (a) when a pedal part 12 is not stepped on by the driver or (b) even when the pedal part 12 is stepped on by the driver.

A pedal device 1 of the thirty-third embodiment is configured in a manner described above. The thirty-third embodiment also achieves the same effects as the twenty-first embodiment. Further, the thirty-third embodiment also achieves the effect in the item [4] described above.

Thirty-Fourth Embodiment

Figure 42:
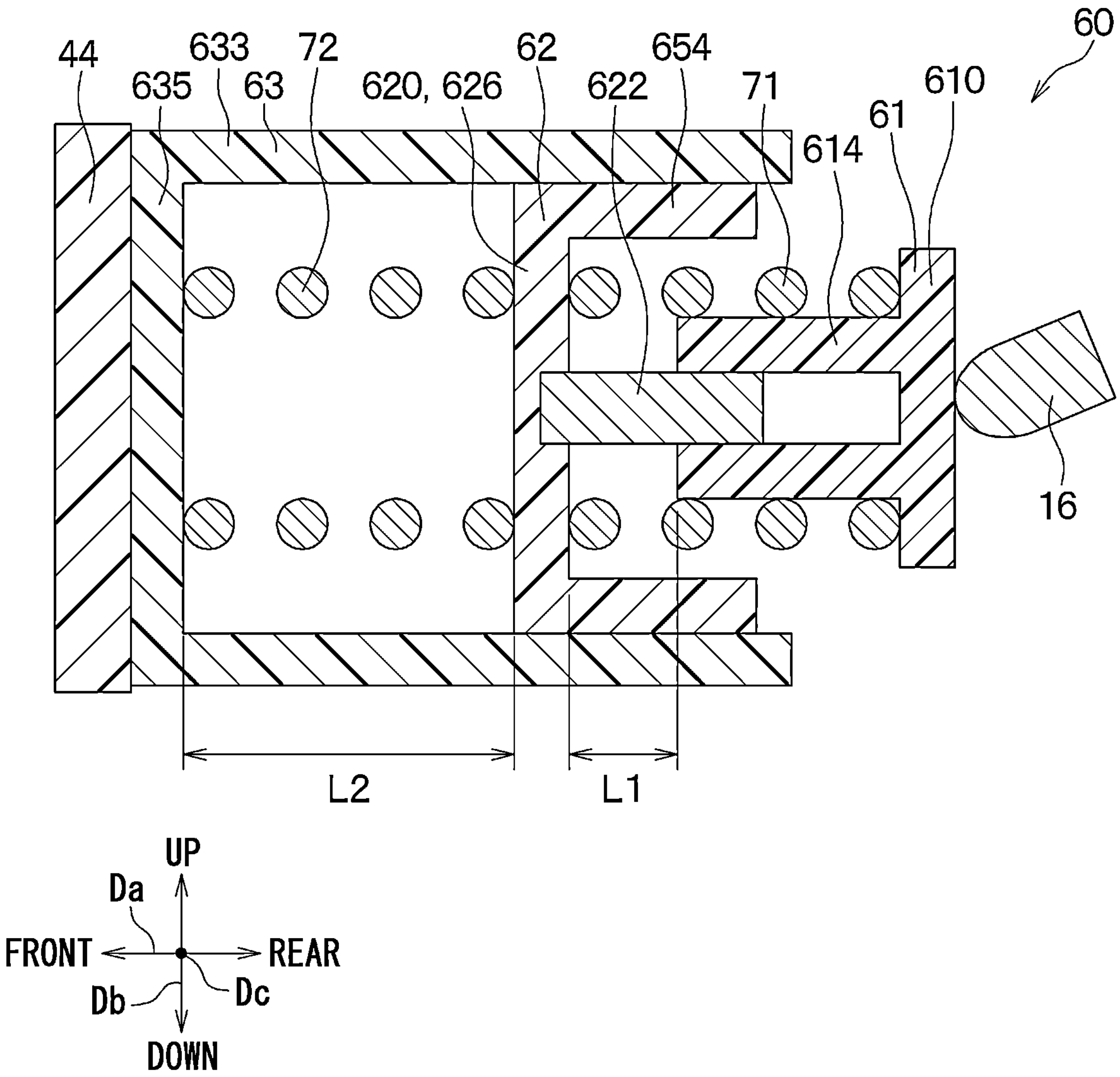
FIG. 42 is a sectional view of a reaction force generation mechanism of a pedal device according to a thirty-fourth embodiment.

In the thirty-fourth embodiment, as shown in FIG. 42, the shapes of the first guide 614, the second guide 622, the third guide 633, and the fourth guide 654 are different from those in the twenty-second embodiment. Other than the above, the present embodiment is the same as the twenty-second embodiment.

A fourth guide 654, instead of extending from a boundary with a second support 620 and a third support 626 in the vehicle front direction, extends from the boundary with the second support 620 and the third support 626 in the vehicle rear direction. Further, instead of an outer surface of a third guide 633 and an inner surface of the fourth guide 654 sliding with each other in the vehicle longitudinal direction Da, an inner surface of the third guide 633 and an outer surface of the fourth guide 654 slide with each other. Further, assuming that a sliding portion between a first guide 614 and a second guide 622 is projected in the vehicle vertical direction Db toward a sliding portion between the fourth guide 654 and the third guide 633. At such time, the sliding portion between the first guide 614 and the second guide 622 projected in the vehicle vertical direction Db overlaps the sliding portion between the fourth guide 654 and the third guide 633. Further, these sliding portions overlap (a) when a pedal part 12 is not stepped on by the driver or (b) even when the pedal part 12 is stepped on by the driver.

A pedal device 1 of the thirty-fourth embodiment is configured in a manner described above. The thirty-fourth embodiment also achieves the same effects as the twenty-second embodiment. Further, the thirty-fourth embodiment also achieves the effect in the item [4] described above.

Thirty-Fifth Embodiment

Figure 43:
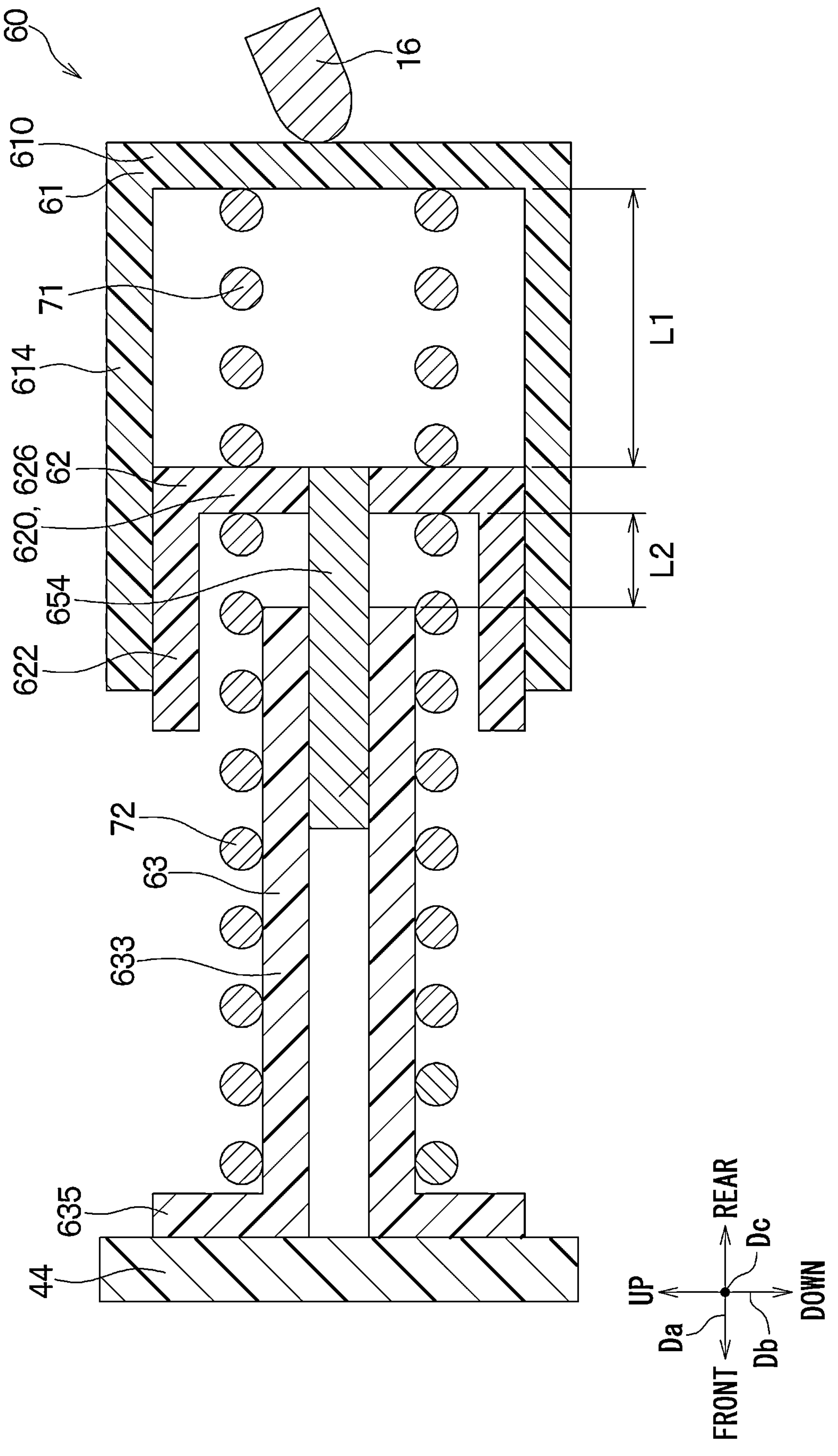
FIG. 43 is a sectional view of a reaction force generation mechanism of a pedal device according to a thirty-fifth embodiment.

In the thirty-fifth embodiment, as shown in FIG. 43, the forms of the first guide 614, the second guide 622, the third guide 633, and the fourth guide 654 are different from those in the twenty-third embodiment. Other than the above, the present embodiment is the same as the twenty-third embodiment.

A second guide 622 extends, instead of extending from a boundary between a second support 620 and a third support 626 in the vehicle rear direction, extends from a boundary between the second support 620 and a third support 626 in the vehicle front direction. Also, it is assumed that a sliding portion between a first guide 614 and the second guide 622 is projected in the vehicle vertical direction Db toward a sliding portion between a fourth guide 654 and a third guide 633. At such time, the sliding portion between the first guide 614 and the second guide 622 projected in the vehicle vertical direction Db overlaps the sliding portion between the fourth guide 654 and the third guide 633. Further, these sliding portions overlap (a) when a pedal part 12 is not stepped on by the driver or (b) even when the pedal part 12 is stepped on by the driver.

A pedal device 1 of the thirty-fifth embodiment is configured in a manner described above. The thirty-fifth embodiment also achieves the same effects as the twenty-third embodiment. Further, the thirty-fifth embodiment also achieves the effect in the item [4] described above.

Thirty-Sixth Embodiment

Figure 44:
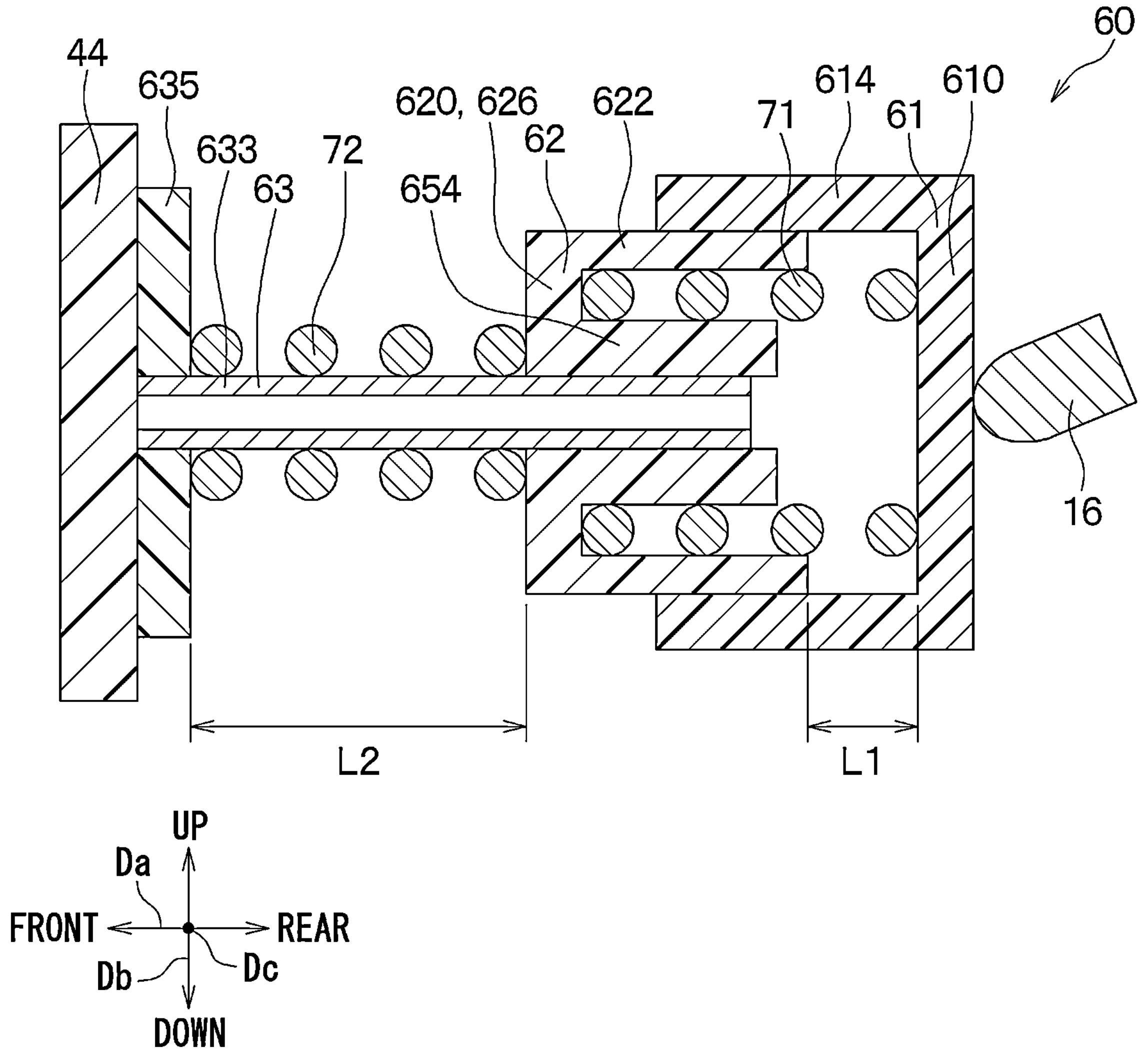
FIG. 44 is a sectional view of a reaction force generation mechanism of a pedal device according to a thirty-sixth embodiment.

In the thirty-sixth embodiment, as shown in FIG. 44, the shapes of the first guide 614, the second guide 622, the third guide 633, and the fourth guide 654 are different from those in the twenty-fourth embodiment. Other than the above, the present embodiment is the same as the twenty-fourth embodiment.

A fourth guide 654, instead of extending from a boundary with a second support 620 and a third support 626 in the vehicle front direction, extends from the boundary with the second support 620 and the third support 626 in the vehicle rear direction. Also, it is assumed that a sliding portion between a first guide 614 and a second guide 622 is projected in the vehicle vertical direction Db toward a sliding portion between a fourth guide 654 and a third guide 633. At such time, the sliding portion between the first guide 614 and the second guide 622 projected in the vehicle vertical direction Db overlaps the sliding portion between the fourth guide 654 and the third guide 633. Further, these sliding portions overlap (a) when a pedal part 12 is not stepped on by the driver or (b) even when the pedal part 12 is stepped on by the driver. In the thirty-sixth embodiment, an outer surface of the third guide 633 and an inner surface of the fourth guide 654 slide in the vehicle longitudinal direction Da, but the present disclosure is not limited thereto. For example, an inner surface of the third guide 633 and an outer surface of the fourth guide 654 may slide.

A pedal device 1 of the thirty-sixth embodiment is configured in a manner described above. The thirty-sixth embodiment also achieves the same effects as the twenty-fourth embodiment. Further, the thirty-sixth embodiment also achieves the effect in the item [4] described above.

Thirty-Seventh Embodiment

Figure 45:
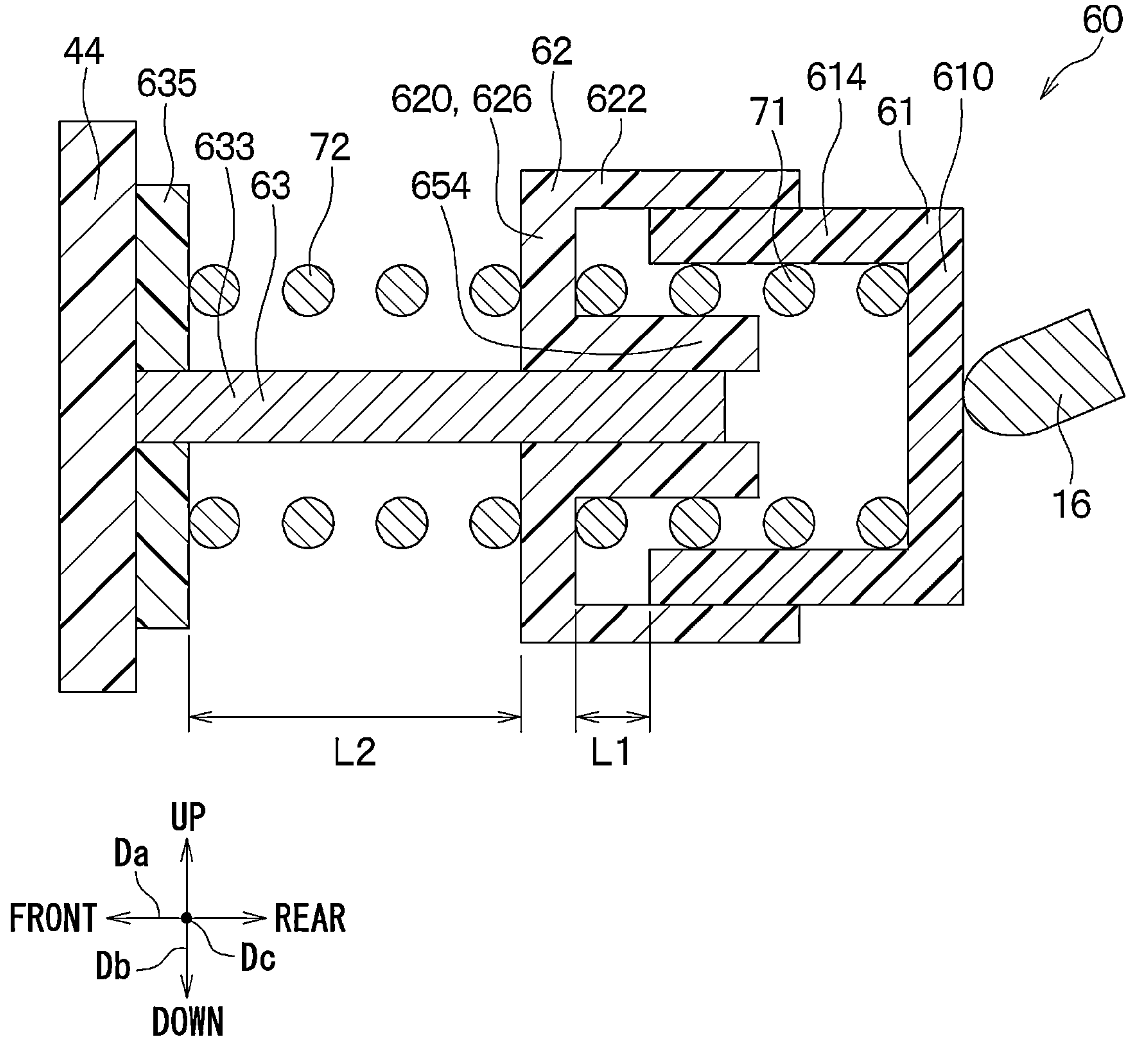
FIG. 45 is a sectional view of a reaction force generation mechanism of a pedal device according to a thirty-seventh embodiment.

In the thirty-seventh embodiment, as shown in FIG. 45, the shapes of the first guide 614, the second guide 622, the third guide 633, and the fourth guide 654 are different from the twenty-fifth embodiment. Other than the above, the present embodiment is the same as the twenty-fifth embodiment.

A fourth guide 654, instead of extending from a boundary with a second support 620 and a third support 626 in the vehicle front direction, extends from the boundary with the second support 620 and the third support 626 in the vehicle rear direction. Also, it is assumed that a sliding portion between a first guide 614 and a second guide 622 is projected in the vehicle vertical direction Db toward a sliding portion between a fourth guide 654 and a third guide 633. At such time, the sliding portion between the first guide 614 and the second guide 622 projected in the vehicle vertical direction Db overlaps the sliding portion between the fourth guide 654 and the third guide 633. Further, these sliding portions overlap (a) when a pedal part 12 is not stepped on by the driver or (b) even when the pedal part 12 is stepped on by the driver.

A pedal device 1 of the thirty-seventh embodiment is configured in a manner described above. The thirty-seventh embodiment also achieves the same effects as the twenty-fifth embodiment. Further, the thirty-seventh embodiment also achieves the effect in the item [4] described above.

Thirty-Eighth Embodiment

Figure 46:
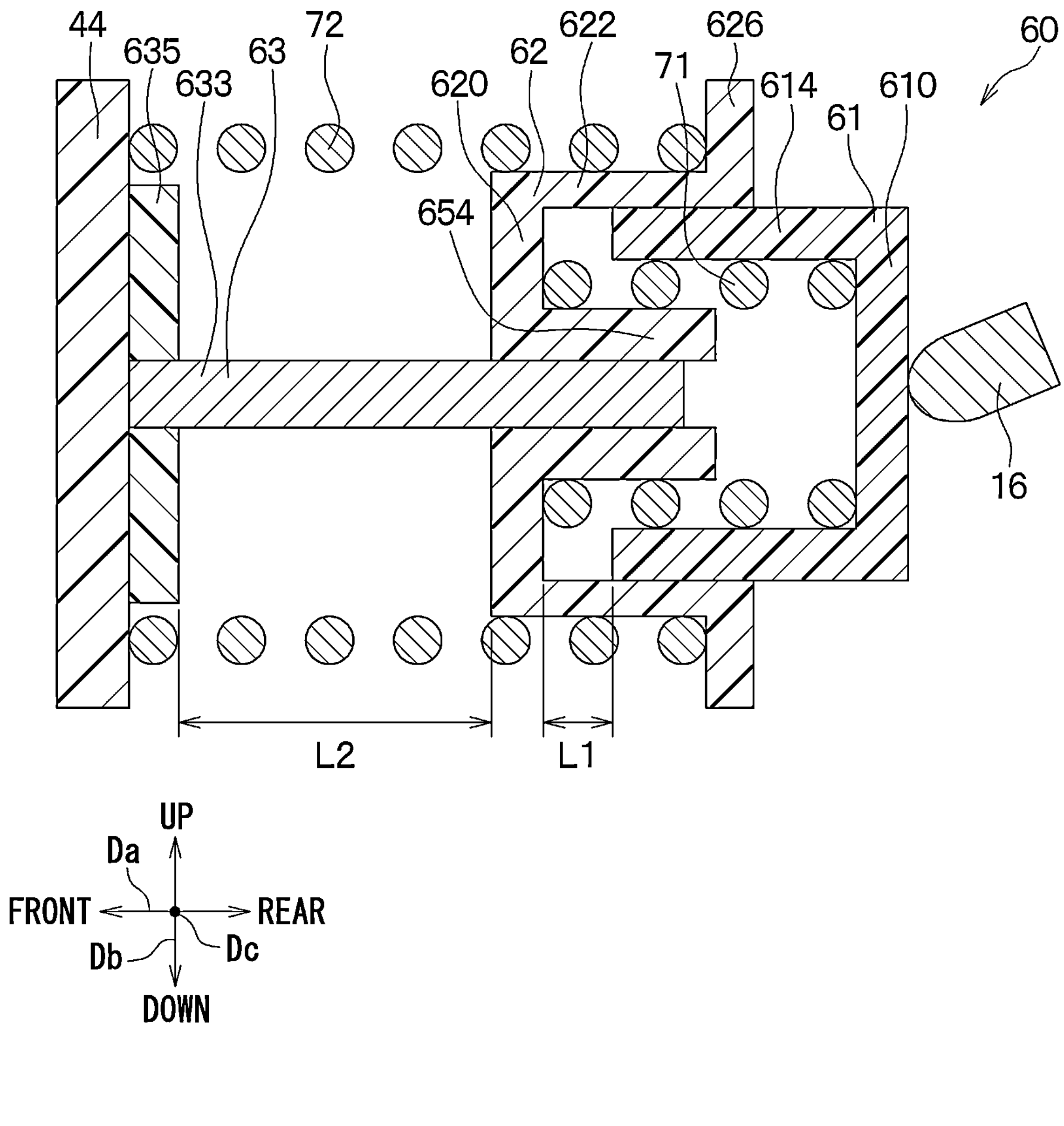
FIG. 46 is a sectional view of a reaction force generation mechanism of a pedal device according to a thirty-eighth embodiment.

In the thirty-eighth embodiment, as shown in FIG. 46, the forms of the second support 620, the third support 626, and the second elastic member 72 are different from those in the thirty-seventh embodiment. Other than the above, the present embodiment is the same as the thirty-seventh embodiment.

A third support 626 is connected to one side of a second guide 622 opposite to a second support 620, and is therefore disposed on the vehicle rear side with respect to the second support 620. Further, the third support 626 extends in the vehicle vertical direction Db from a part of the second guide 622 opposite to the second support 620, and is formed in an annular shape.

A second elastic member 72 is supported by a housing cylinder 44 and the third support 626, instead of being supported by a guide member bottom 635, the second support 620, and the third support 626.

A pedal device 1 of the thirty-eighth embodiment is configured in a manner described above. The thirty-eighth embodiment also achieves the same effects as the thirty-seventh embodiment.

Thirty-Ninth Embodiment

Figure 47:
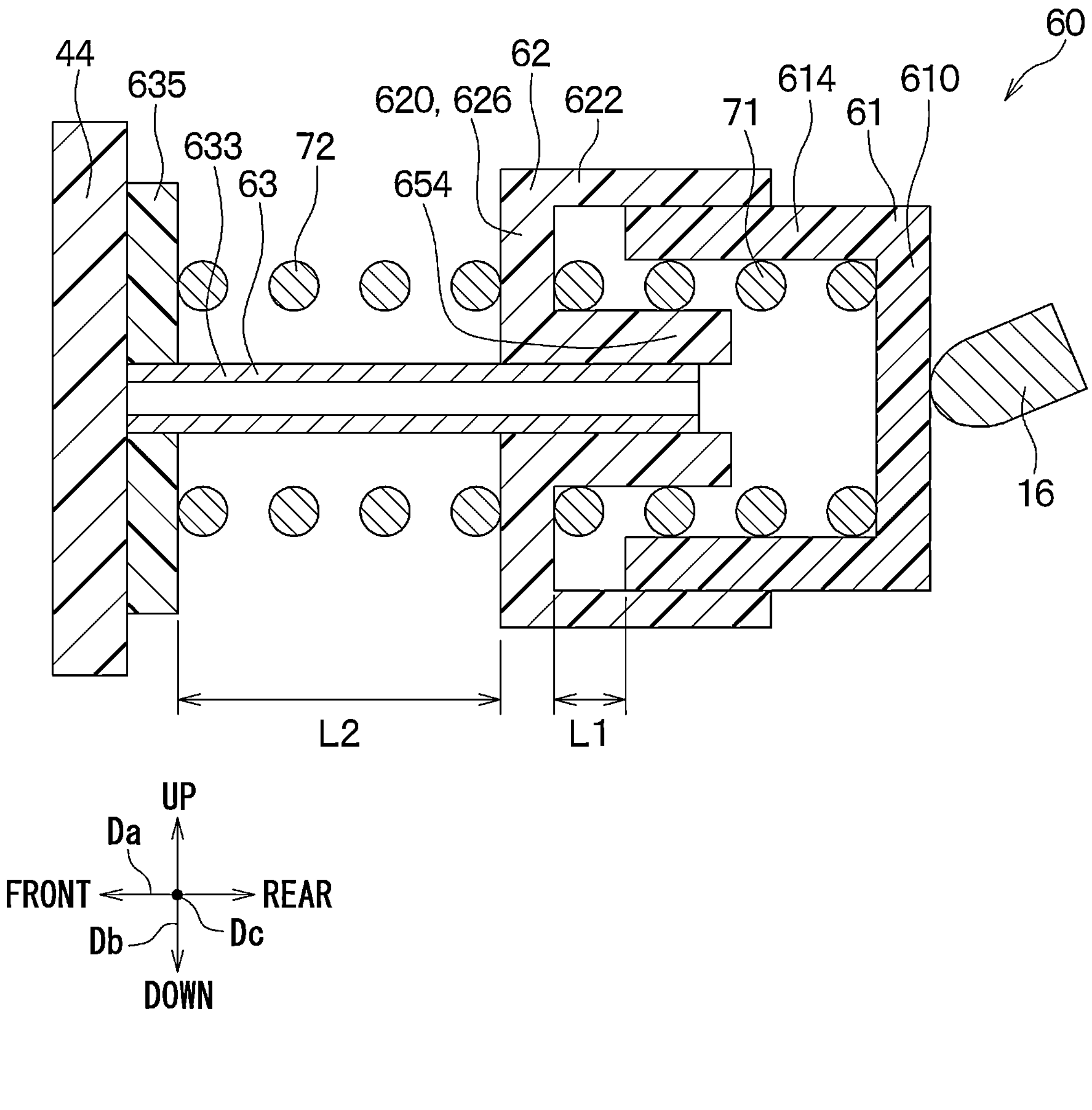
FIG. 47 is a sectional view of a reaction force generation mechanism of a pedal device according to a thirty-ninth embodiment.

In the thirty-ninth embodiment, as shown in FIG. 47, the shapes of the first guide 614, the second guide 622, the third guide 633, and the fourth guide 654 are different from the twenty-sixth embodiment. Other than the above, the present embodiment is the same as the twenty-sixth embodiment.

A fourth guide 654, instead of extending from a boundary with a second support 620 and a third support 626 in the vehicle front direction, extends from the boundary with the second support 620 and the third support 626 in the vehicle rear direction. Also, it is assumed that a sliding portion between a first guide 614 and a second guide 622 is projected in the vehicle vertical direction Db toward a sliding portion between a fourth guide 654 and a third guide 633. At such time, the sliding portion between the first guide 614 and the second guide 622 projected in the vehicle vertical direction Db overlaps the sliding portion between the fourth guide 654 and the third guide 633. Further, these sliding portions overlap (a) when a pedal part 12 is not stepped on by the driver or (b) even when the pedal part 12 is stepped on by the driver.

A pedal device 1 of the thirty-ninth embodiment is configured in a manner described above. The thirty-ninth embodiment also achieves the same effects as the twenty-sixth embodiment. Further, the thirty-ninth embodiment also achieves the effect in the item [4] described above.

Fortieth Embodiment

Figure 48:
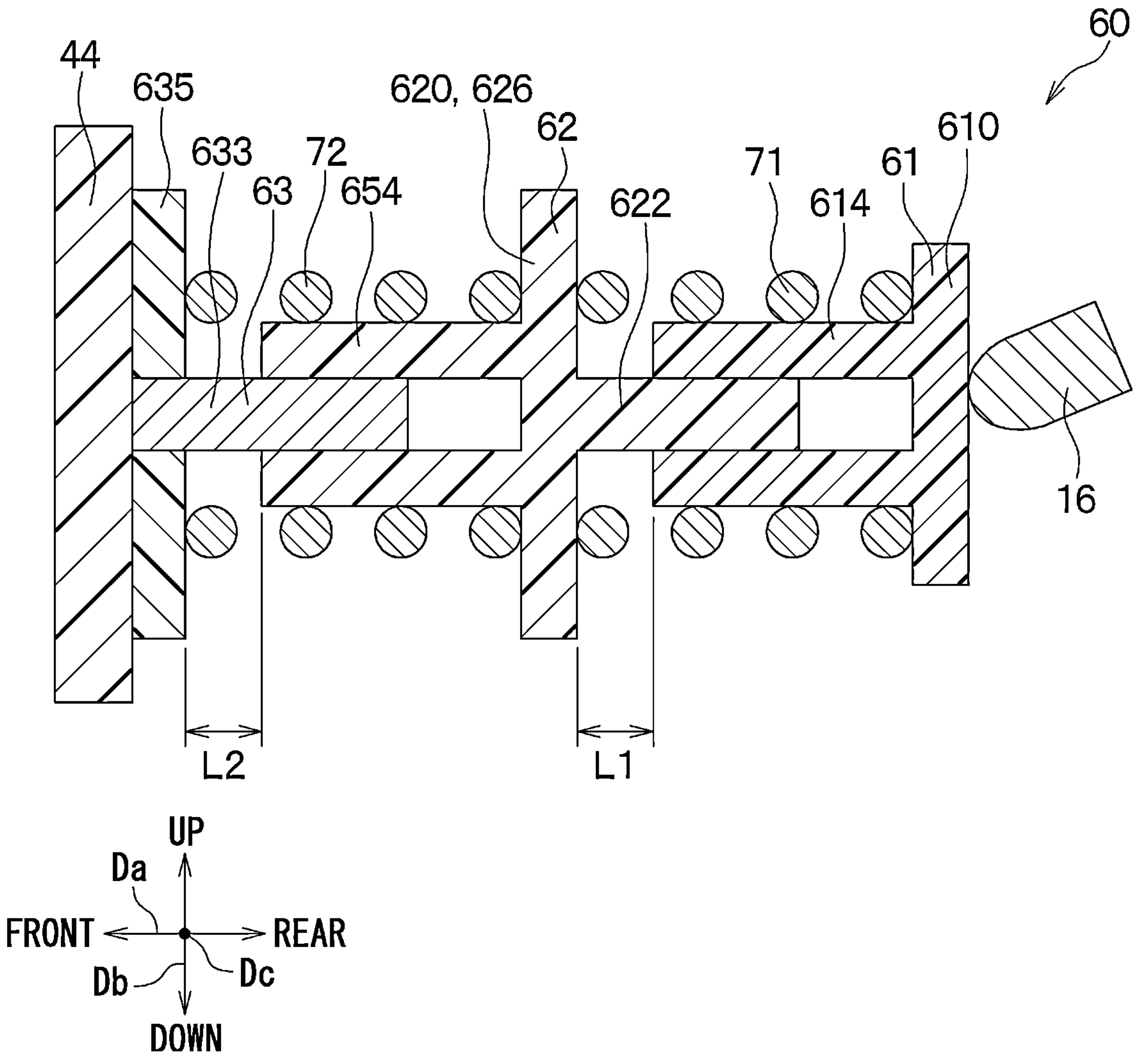
FIG. 48 is a sectional view of a reaction force generation mechanism of a pedal device according to a fortieth embodiment.

In the fortieth embodiment, as shown in FIG. 48, the form of the second holder 62 is different from that in the ninth embodiment. Other than the above, the present embodiment is the same as the ninth embodiment.

Specifically, instead of forming a second guide 622 with metal, a second support 620, a third support 626, the second guide 622 and a fourth guide 654 of a second holder 62 are integrally molded with resin.

A pedal device 1 of the fortieth embodiment is configured in a manner described above. The fortieth embodiment also achieves the same effects as the ninth embodiment.

Other Embodiments

The present disclosure is not limited to the above-described embodiments, i.e., is appropriately modifiable with respect to the above-described embodiments. Further, individual elements or features of a particular embodiment are not necessarily essential unless it is specifically stated that the elements or the features are essential in the foregoing description, or unless the elements or the features are obviously essential in principle.

In each of the embodiments described above, the pedal device 1 is used as a brake pedal in a brake-by-wire system 150 that controls the brakes of a vehicle. On the other hand, a pedal device 1 is not limited to bee used as the brake pedal. The pedal device 1 may be used, for example, as an accelerator pedal for accelerating a vehicle.

In each of the embodiments described above, the reaction force is generated by the restoring force generated when the first elastic member 71, the second elastic member 72, and the third elastic member 73 are compressed, but the present disclosure is not limited thereto in a situation described above. For example, by changing the arrangement of a reaction force generation mechanism 60, a reaction force may be generated by a restoring force generated when a first elastic member 71, a second elastic member 72, and a third elastic member 73 are pulled. Further, the coil springs of the first elastic member 71, the second elastic member 72, and the third elastic member 73 are coil springs at equal intervals, but the coil springs are not limited thereto, and may be a conical coil spring, a coil spring at unequal intervals, and the like.

In each of the embodiments described above, the pedal device 1 is a hanging type device, but is not limited thereto, and may be an organ type device. In case of using the organ type device, as the driver's pedaling force applied to the pedal 10 increases, a part of a pedal 10 on the vehicle front side relative to the rotation axis O rotates toward a dash panel 200.

In each of the embodiments described above, in the brake-by-wire system 150, hydraulic pressure is generated in the brake fluid flowing through a brake circuit 120 by a master cylinder 126. On the other hand, the present disclosure is not limited to the generation of hydraulic pressure in the brake fluid flowing through the brake circuit 120 by the master cylinder 126. For example, hydraulic pressure may be generated in a brake fluid flowing through the brake circuit 120 by a hydraulic pump.

In the first embodiment described above, the third guide 633 is formed in a columnar shape. On the other hand, a third guide 633 may be formed in a cylindrical shape. In such case, the third guide 633 may slide on a holder cylinder 624 or may slide on a third support 626. Further, the first guide 614, sliding on the second guide 622 in the first embodiment, may also slide on the holder cylinder 624 or the third support 626.

The individual embodiments described above may also be combined with each other as appropriate.

Various Aspects of The Present Disclosure

[Aspect 1]

A pedal device includes: a pedal (10) configured to rotate about a rotation axis (O) in accordance with a pedaling operation of an operator; a first elastic member (71) configured to be deformed by a pedaling force from the pedal as the pedal rotates, and to generate a reaction force against the pedaling force of the operator; a second elastic member (72) configured to be deformed by a pedaling force from the pedal as the pedal rotates, and to generate a reaction force against the pedaling force of the operator; a first holder (61) including a first support (610) that is arranged adjacent to the pedal and supports one end of the first elastic member, and a first guide (614) that extends from the first support in a deformation direction of the first elastic member; a second holder (62) including a second support (620) that supports an another end of the first elastic member, a second guide (622) that extends in the deformation direction of the first elastic member, and a third support (626) that supports one end of the second elastic member; a fourth support (44, 635) supporting an another end of the second elastic member; and a third guide (633) extending from the fourth support in a deformation direction of the second elastic member. In the pedal device, the first guide moves in the deformation direction of the first elastic member relative to the second guide and slides with the second guide in the deformation direction of the first elastic member, to deform the first elastic member, in accordance with the pedaling force from the pedal as the pedal rotates. The second holder moves in the deformation direction of the second elastic member relative to the third guide, and slides with the third guide in the deformation direction of the second elastic member, to deform the second elastic member, in accordance with the pedaling force from the pedal as the pedal rotates. In addition, the first guide and the second guide are disposed to be restricted with each other in a movement on a direction perpendicular to the deformation direction of the first elastic member, and the second holder and the third guide are disposed to be restricted with each other in a movement on a direction perpendicular to the deformation direction of the second elastic member.

[Aspect 2]

In the pedal device of aspect 1, the first guide and the second guide slide in the deformation direction of the first elastic member when the second holder and the third guide are fixed, and the second holder and the third guide slide in the deformation direction of the second elastic member when the first guide and the second guide are fixed.

[Aspect 3]

In the pedal device of aspect 1 or 2, the first guide is formed in a cylindrical shape, the second guide is formed in a cylindrical shape, and the third guide is formed in a columnar shape.

[Aspect 4]

In the pedal device of aspect 1 or 2, the first guide is formed in a cylindrical shape, the second guide is formed in a columnar shape, and the third guide is formed in a cylindrical shape.

[Aspect 5]

In the pedal device of aspect 1 or 2, the first guide is formed in a columnar shape, the second guide is formed in a cylindrical shape, and the third guide is formed in a cylindrical shape.

[Aspect 6]

In the pedal device of aspect 1 or 2, the first guide is formed in a columnar shape, the second guide is formed in a cylindrical shape, and the third guide is formed in a columnar shape.

[Aspect 7]

In the pedal device of aspect 1 or 2, the second holder further includes a fourth guide (654) extending in the deformation direction of the second elastic member, the first guide is formed in a cylindrical shape, the second guide is formed in a columnar shape, the fourth guide is formed in a cylindrical shape, and the third guide is formed in a columnar shape, and slides with the fourth guide in the deformation direction of the second elastic member.

[Aspect 8]

In the pedal device of aspect 1 or 2, the second holder further includes a fourth guide (654) extending in the deformation direction of the second elastic member, the first guide is formed in a columnar shape, the second guide is formed in a cylindrical shape, the fourth guide is formed in a columnar shape, and the third guide is formed in a cylindrical shape and slides with the fourth guide in the deformation direction of the second elastic member.

[Aspect 9]

In the pedal device of aspect 1 or 2, the second holder further includes a fourth guide (654) extending in the deformation direction of the second elastic member, the first guide is formed in a cylindrical shape, the second guide is formed in a cylindrical shape, the fourth guide is formed in a cylindrical shape, and the third guide is formed in a columnar shape, and slides with the fourth guide in the deformation direction of the second elastic member.

[Aspect 10]

In the pedal device of aspect 1 or 2, the second holder further includes a fourth guide (654) extending in the deformation direction of the second elastic member, the first guide is formed in a cylindrical shape, the second guide is formed in a columnar shape, the fourth guide is formed in a columnar shape, and the third guide is formed in a cylindrical shape and slides with the fourth guide in the deformation direction of the second elastic member.

[Aspect 11]

In the pedal device of aspect 1 or 2, the second holder further includes a fourth guide (654) extending in the deformation direction of the second elastic member, the first guide is formed in a columnar shape, the second guide is formed in a cylindrical shape, the fourth guide is formed in a cylindrical shape, and the third guide is formed in a columnar shape and slides with the fourth guide in the deformation direction of the second elastic member.

[Aspect 12]

In the pedal device of aspect 1 or 2, the second holder further includes a fourth guide (654) extending in the deformation direction of the second elastic member, the first guide is formed in a columnar shape, the second guide is formed in a cylindrical shape, the fourth guide is formed in a cylindrical shape, and the third guide is formed in a cylindrical shape and slides with the fourth guide in the deformation direction of the second elastic member.

[Aspect 13]

In the pedal device of aspect 1 or 2, the second holder further includes a fourth guide (654) extending in the deformation direction of the second elastic member, the first guide is formed in a cylindrical shape, the second guide is formed in a columnar shape, the fourth guide is formed in a cylindrical shape, and the third guide is formed in a cylindrical shape and slides with the fourth guide in the deformation direction of the second elastic member.

[Aspect 14]

In the pedal device of aspect 1 or 2, the second holder further includes a fourth guide (654) extending in the deformation direction of the second elastic member, the first guide is formed in a cylindrical shape, the second guide is formed in a cylindrical shape, the fourth guide is formed in a columnar shape, and the third guide is formed in a cylindrical shape and slides with the fourth guide in the deformation direction of the second elastic member.

[Aspect 15]

In the pedal device of aspect 1 or 2, the first guide is formed in a cylindrical shape, the second guide is formed in a cylindrical shape, the third guide is formed in a cylindrical shape, and the third guide slides with the second guide in the deformation direction of the second elastic member.

[Aspect 16]

In the pedal device of aspect 1 or 2, the second holder further includes a fourth guide (654) extending in the deformation direction of the second elastic member, the first guide is formed in a cylindrical shape, the second guide is formed in a cylindrical shape, the fourth guide is formed in a cylindrical shape, and the third guide is formed in a cylindrical shape and slides with the fourth guide in the deformation direction of the second elastic member.

[Aspect 17]

In the pedal device of any one of aspects 1 to 16, the first elastic member and the second elastic member are deformed respectively when the pedal is not stepped on by the operator.

[Aspect 18]

In the pedal device of any one of aspects 1 to 17, the deformation direction of the first elastic member and the deformation direction of the second elastic member are linear directions perpendicular to the rotation axis.

[Aspect 19]

In the pedal device of any one of aspects 1 to 17, the deformation direction of the first elastic member and the deformation direction of the second elastic member are respectively a rotation direction about an axis extending in the direction of the rotation axis.

[Aspect 20]

In the pedal device of any one of aspects 1 to 19, when the second elastic member is projected in a direction perpendicular to the deformation direction of the second elastic member, the projected second elastic member and the first elastic member overlap with each other.

[Aspect 21]

In the pedal device of aspect 3 or 15, when a sliding portion between the first guide and the second guide is projected in a direction perpendicular to the deformation direction of the first elastic member, the projected sliding portion between the first guide and the second guide does not overlap the sliding portion between the second holder and the third guide, and is separate therefrom.

[Aspect 22]

In the pedal device of aspect 4 or 5, when the sliding portion between the first guide and the second guide is projected in a direction perpendicular to the deformation direction of the first elastic member, the projected sliding portion between the first guide and the second guide overlaps with the sliding portion between the second holder and the third guide.

[Aspect 23]

In the pedal device of any one of aspects 9, 12, 13, 14, and 16, when the sliding portion between the first guide and the second guide is projected in a direction perpendicular to the deformation direction of the first elastic member, the projected sliding portion between the first guide and the second guide overlaps with the sliding portion between the fourth guide and the third guide.

What is claimed is:

1. A pedal device comprising:

a pedal configured to rotate about a rotation axis in accordance with a pedaling operation of an operator;

a first elastic member configured to be deformed by a pedaling force from the pedal as the pedal rotates, and to generate a reaction force against the pedaling force of the operator;

a second elastic member configured to be deformed by a pedaling force from the pedal as the pedal rotates, and to generate a reaction force against the pedaling force of the operator;

a first holder including a first support that is arranged adjacent to the pedal and supports one end of the first elastic member, and a first guide that extends from the first support in a deformation direction of the first elastic member;

a second holder including a second support that supports an another end of the first elastic member, a second guide that extends in the deformation direction of the first elastic member, and a third support that supports one end of the second elastic member;

a fourth support supporting an another end of the second elastic member; and a third guide extending from the fourth support in a deformation direction of the second elastic member, wherein the first guide moves in the deformation direction of the first elastic member relative to the second guide and slides with the second guide in the deformation direction of the first elastic member, to deform the first elastic member, in accordance with the pedaling force from the pedal as the pedal rotates, the second holder moves in the deformation direction of the second elastic member relative to the third guide, and slides with the third guide in the deformation direction of the second elastic member, to deform the second elastic member, in accordance with the pedaling force from the pedal as the pedal rotates, the first guide and the second guide are disposed to be restricted with each other in a movement on a direction perpendicular to the deformation direction of the first elastic member, the second holder and the third guide are disposed to be restricted with each other in a movement on a direction perpendicular to the deformation direction of the second elastic member, and the first elastic member is overlapped with a projected second elastic member in which the second elastic member is projected in a direction perpendicular to the deformation direction of the second elastic member.

2. The pedal device according to claim 1, wherein the first guide and the second guide slide in the deformation direction of the first elastic member when the second holder and the third guide are fixed, and the second holder and the third guide slide in the deformation direction of the second elastic member when the first guide and the second guide are fixed.

3. The pedal device according to claim 1, wherein the first elastic member and the second elastic member are made to be deformed when the pedal is not stepped on by the operator.

4. The pedal device according to claim 1, wherein the deformation direction of the first elastic member and the deformation direction of the second elastic member are linear directions perpendicular to the rotation axis.

5. A pedal device comprising:

a pedal configured to rotate about a rotation axis in accordance with a pedaling operation of an operator;

a first elastic member configured to be deformed by a pedaling force from the pedal as the pedal rotates, and to generate a reaction force against the pedaling force of the operator;

a second elastic member configured to be deformed by a pedaling force from the pedal as the pedal rotates, and to generate a reaction force against the pedaling force of the operator;

a first bolder including a first support that is arranged adjacent to the pedal and supports one end of the first elastic member, and a first guide that extends from the first support in a deformation direction of the first elastic member;

a second holder including a second support that supports an another end of the first elastic member, a second guide that extends in the deformation direction of the first elastic member, and a third support that supports one end of the second elastic member;

a fourth support supporting an another end of the second elastic member; and a third guide extending from the fourth support in a deformation direction of the second elastic member, wherein the first guide moves in the deformation direction of the first elastic member relative to the second guide and slides with the second guide in the deformation direction of the first elastic member, to deform the first elastic member, in accordance with the pedaling force from the pedal as the pedal rotates, the second holder moves in the deformation direction of the second elastic member relative to the third guide, and slides with the third guide in the deformation direction of the second elastic member, to deform the second elastic member, in accordance with the pedaling force from the pedal as the pedal rotates, the first guide and the second guide are disposed to be restricted with each other in a movement on a direction perpendicular to the deformation direction of the first elastic member, the second holder and the third guide are disposed to be restricted with each other in a movement on a direction perpendicular to the deformation direction of the second elastic member, the first guide is formed in a cylindrical shape, the second guide is formed in a cylindrical shape, the third guide is formed in a columnar shape, a part of the second guide is inserted into a hole of the first guide, and a part of the third guide is inserted into a hole of the second guide.

6. The pedal device according to claim 5, wherein when a sliding portion between the first guide and the second guide is projected in a direction perpendicular to the deformation direction of the first elastic member, the projected sliding portion between the first guide and the second guide does not overlap with the sliding portion between the second holder and the third guide, and is separate therefrom.

* * * * *